United States Patent
Fujimoto et al.

[11] Patent Number: 5,882,818
[45] Date of Patent: *Mar. 16, 1999

[54] LITHIUM SECONDARY BATTERY

[75] Inventors: Masahisa Fujimoto, Osaka; Noriyuki Yoshinaga, Sumoto; Koji Ueno, Hirakata; Nobuhiro Furukawa, Itano-gun; Toshiyuki Nohma, Kadoma; Masatoshi Takahashi, Souraku-gun, all of Japan

[73] Assignee: Sanyo Electric Co., Ltd., Osaka, Japan

[*] Notice: The term of this patent shall not extend beyond the expiration date of Pat. No. 5,686,138.

[21] Appl. No.: 902,337

[22] Filed: Jul. 29, 1997

Related U.S. Application Data

[60] Division of Ser. No. 188,609, Jan. 24, 1994, Pat. No. 5,686,138, which is a continuation-in-part of Ser. No. 048,063, Apr. 19, 1993, abandoned, which is a continuation of Ser. No. 850,486, Mar. 12, 1992, abandoned.

[30] Foreign Application Priority Data

| Nov. 12, 1991 | [JP] | Japan | 3-295835 |
| Dec. 3, 1991 | [JP] | Japan | 3-319200 |
| Dec. 10, 1991 | [JP] | Japan | 3-325778 |
| Dec. 27, 1991 | [JP] | Japan | 3-360254 |

[51] Int. Cl.$^6$ ............................................. H01M 10/40
[52] U.S. Cl. .................. 429/197; 429/218; 429/223; 429/224; 423/448
[58] Field of Search ............................ 429/197, 194, 429/218, 223, 224; 423/445 R, 448; 420/900

[56] References Cited

U.S. PATENT DOCUMENTS

| H1076 | 7/1992 | Slane | 429/194 |
| 4,423,125 | 12/1983 | Basu | 429/194 |
| 4,615,959 | 10/1986 | Hayashi | 429/194 |
| 4,725,422 | 2/1988 | Miyabayashi | 423/445 |
| 4,863,812 | 9/1989 | Mohri | 429/60 |
| 4,869,979 | 9/1989 | Ohtani | 429/191 |
| 4,945,014 | 7/1990 | Miyabayashi | 429/218 |
| 4,980,250 | 12/1990 | Takahashi | 429/194 |
| 5,130,211 | 7/1992 | Wilkinson | 429/198 |
| 5,192,629 | 3/1993 | Guyomard | 429/197 |
| 5,422,203 | 6/1995 | Guyomard | 429/194 |
| 5,521,027 | 5/1996 | Okuno et al. | 429/194 |
| 5,525,443 | 6/1996 | Okuno et al. | 429/194 |

FOREIGN PATENT DOCUMENTS

| 0 118 026 A1 | 9/1984 | European Pat. Off. |
| 0 165 589 A3 | 12/1985 | European Pat. Off. |
| 0 346 088 A1 | 12/1989 | European Pat. Off. |
| 0 474 183 A2 | 3/1992 | European Pat. Off. |

*Primary Examiner*—Anthony Skapars
*Attorney, Agent, or Firm*—Kubovcik & Kubovcik

[57] ABSTRACT

Provided is a novel lithium secondary battery including a positive electrode including a compound capable of occluding and discharging lithium, a negative electrode composed mainly of a carbon material which includes a graphite as an only or as a principal component, a separator between the positive electrode and the negative electrode; and an electrolyte solution of an electrolyte solute dissolved in a solvent including at least one specific cyclic compound.

The lithium secondary battery has a large capacity, small self-discharge rate and excellent cycle characteristics and high charge-discharge efficiency.

24 Claims, 37 Drawing Sheets

5,882,818

LITHIUM SECONDARY BATTERY

This application is a division of application Ser. No. 08/188,609, filed Jan. 24, 1994, now U.S. Pat. No. 5,686,138. Application Ser. No. 08/188,609 is a continuation-in-part application of prior application Ser. No. 08/048,063, filed Apr. 19, 1993, now abandoned, which is a continuation of application Ser. No. 07/850,486, filed Mar. 12, 1992, now abandoned.

BACKGROUND OF THE INVENTION

1. Field of the Invention

The present invention relates to a lithium secondary battery, and more specifically to improvement of a carbon material for a negative electrode of a lithium secondary battery, or to improvement of both a negative electrode and an electrolyte solution of a lithium secondary battery.

2. Description of the Prior Art

In recent years, carbon materials have been studied, instead of conventional lithium alloys, for the use of negative electrode material for lithium secondary batteries because ① they have high flexibility and ② they do not cause mossy-shaped lithium to precipitate by electrolysis.

The carbon material that has principally been studied for this purpose is coke (see U.S. Pat. No. 4,725,422), and graphite has hardly been studied. For instance, U.S. Pat. No. 4,725,422 discloses a secondary battery comprising for the negative electrode a carbon material having the spacing of (002) planes, $d_{002}$, of at least 3.37 Å and the crystallite size in the direction of c axis, Lc of not more than 220 Å. The above carbon material is a kind of coke.

Coke, however, hardly provides large-capacity batteries, since the amount of lithium introduced with coke negative electrode is not sufficiently large.

To the best of the knowledge of the present inventors, the literatures that propose a secondary battery having a negative electrode comprising graphite are only U.S. Pat. No. 4,423,125 and U.S. Pat. No. 5,130,211.

The above U.S. Pat. No. 4,423,125 discloses a secondary battery comprising for the negative electrode a carbon material having occluded lithium as an active material and as an electrolyte solution a solution of an electrolyte solute of $LiAsF_6$ dissolved in a solvent of 1,3-dioxolane. According to the USP, a secondary battery having excellent cycle characteristics can then be obtained.

The above known secondary battery is, however, inferior in many features such as capacity per unit weight of graphite (mAh/g), initial charge and discharge efficiency (%), battery capacity (mAh), self-discharge rate (%/month) and charge and discharge efficiency (%), not to mention cycle characteristics (cycle life), as shown by the data for the "conventional battery" in the later-described Examples. The battery therefore is not sufficiently satisfactory for practical purposes.

This is considered to be due to polymerization of 1,3-dioxolane in the negative electrode side (reduction side).

The above U.S. Pat. No. 5,130,211 discloses a secondary battery comprising for the negative electrode a carbon material having a degree of graphitization greater than about 0.40 Å, i.e. the spacing of (002) planes, $d_{002}$ smaller than about 3.412 Å. The above known secondary battery, however, is not necessarily excellent in the features mentioned above.

SUMMARY OF THE INVENTION

Accordingly, an object of the invention is to provide a lithium secondary battery having a negative electrode comprising specified graphite, having a large capacity, small self-discharge rate and excellent cycle characteristics and still having high initial charge and discharge efficiency.

The above object can be achieved by providing a lithium secondary battery comprising:

a negative electrode composed mainly of a carbon material which comprises, as an only or as a principal component, a graphite having:

(a) a d-value of the lattice plane (002) obtained by the X-ray diffraction method thereof of 3.354 to 3.370 and (b) a crystallite size in the c-axis direction obtained by the X-ray diffraction method thereof of at least 200 Å, a positive electrode composed mainly of a compound capable of occluding and discharging lithium and which is not the graphite used for the negative electrode;

a separator between said positive electrode and said negative electrode; and an electrolyte solution of an electrolyte solute dissolved in a solvent.

BRIEF DESCRIPTION OF THE DRAWINGS

A more complete appreciation of the invention and many of the attendant advantages thereof will be readily obtained as the same become better understood by reference to the following detailed description when considered in connection with the accompanying drawings, wherein.

DESCRIPTION OF THE PREFERRED EMBODIMENTS

Figure 1:
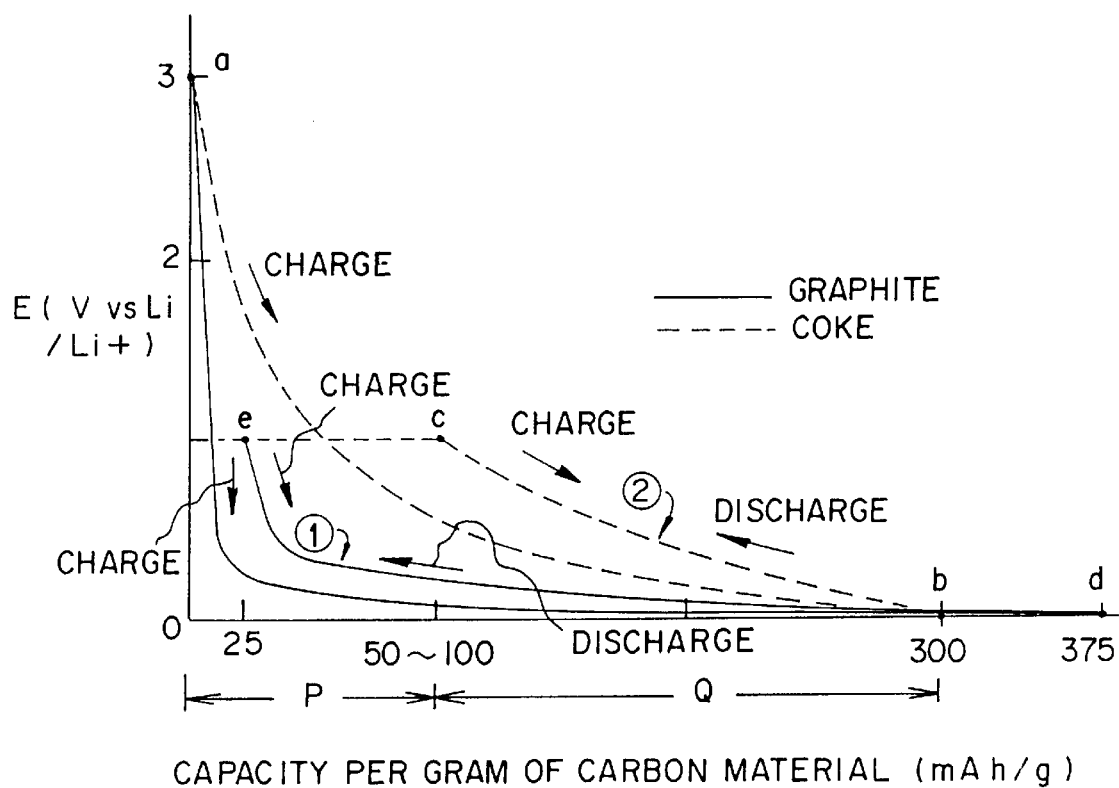
FIG. 1 is a graph showing the charge-discharge cycle characteristics of the battery of the present invention and a comparison battery (coke negative electrode)

Examples of the compound that constitutes the positive electrode material in the present invention and is capable of occluding and discharging lithium are, as inorganic compounds, oxides having what is known as tunnel-shaped pores, such as $MnO_2$, $TiO_2$ and $V_2O_5$, and metal chalcogenides such as $TiS_2$ and $MoS_2$ having laminar structure, among which preferred are composite oxides represented by the formula $Li_xMO_2$ or $Li_yM_2O_4$, wherein M is a transition element and $0 \leq x \leq 1$ and $0 \leq y \leq 2$. Concrete examples of the composite oxides are $LiCoO_2$, $LiMnO_2$, $LiNiO_2$, $LiCrO_2$ and $LiMn_2O_4$.

The positive electrode material is kneaded with a conductor such as acetylene black or carbon black and a binder such as polytetrafluoroethylene (PTFE) or polyvinylidene fluoride (PVdF), and the obtained mixture is used as a material for preparing the positive electrode.

At this time, among the above conductive polymers and dopant-containing conductive polymers, those having high conductivity may be kneaded only with a binder, without incorporation of any conductor.

The graphite used as an only or a principal component of the carbon material of the negative electrode of the lithium secondary battery in the present invention has the following properties ① and ②.

① a d-value ($d_{002}$) of the lattice plane (002) obtained by the X-ray diffraction method thereof of 3.354 to 3.370 (unit: Å); and ② a crystallite size (Lc) in the c-axis direction obtained by the X-ray diffraction method thereof of at least 200 Å.

The use of a graphite having the above properties ① and ② results in a lithium secondary battery having a large discharge capacity and high initial charge-discharge efficiency. If the graphite used as the principal component of the carbon material of the negative electrode of the lithium secondary battery of the present invention has a d-value and an Lc falling outside of the above range, the discharge capacity and initial charge-discharge efficiency will be significantly lower.

When a graphite further having one of the following properties ③-⑤ in addition to the above properties ① and ② is used, better battery characteristics are obtained, as shown in the later-described Examples.

③ an average particle diameter of 1 to 30 μm;

④ a specific surface area of 0.5 to 50 $m^2/g$; and

⑤ a true density of 1.9 to 2.25 $g/cm^3$.

Further desirable properties of the graphite used in the present invention are as follows. The crystallite size in the a-axis direction obtained by the X-ray diffraction method thereof is at least 200 Å; the atomic ratio of H/C is not more than 0.1 and the G-value ($1360\ cm^{-1}/1590\ cm^{-1}$) in Raman spectroscopic analysis is at least 0.05.

Any kind of graphite can be suitably used in the present invention, whether it be natural graphite, artificial graphite or kish as long as it has the properties required of the graphite as explained above. Here, kish is a carbon material having higher crystallinity than natural graphite and formed, when in iron mills iron is melted in the blast furnace at a temperature of at least 2,000° C., by sublimation and the succeeding deposition onto the furnace wall and recrystallization of the carbon contained in the iron. Further these graphites may as required be used in combination. The artificial graphite herein includes graphite-based substances formed by processing or modifying graphite, such as swollen graphite.

Examples of natural graphite are Sri Lanka graphite, Madagascar graphite, Korea flake-graphite, Korea earth-graphite and China graphite, and an example of artificial graphite is coke-origin-graphite.

Table 1 shows the d-values of the lattice plane (002) and Lc's obtained by the X-ray diffraction method of the above natural graphites and artificial coke-origin-graphite.

TABLE 1

|  | Lattice constant d(002) (Å) | Crystallite size, Lc(Å) |
|---|---|---|
| Natural graphite |  |  |
| Sri Lanka | 3.358 | >1,000 |
| Madagascar | 3.359 | >1,000 |
| Korea (flake) | 3.360 | >1,000 |
| Korea (earth) | 3.365 | 230 |
| China | 3.354 | >1,000 |
| Artificial coke-origin-graphite | 3.364 | 350 |

Examples of commercially available natural graphite used in the present invention are "NG-2", "NG-2L", "NG-4", "NG-4L", "NG-7", "NG-7L", "NG-10", "NG-10L", "NG-12", "NG-12L", "NG-14" and "NG-14L", which are high-purity graphite having a purity of at least 99% and made by The Kansai Coke and Chemicals Co., Ltd.; "CX-3000", "FBF", "BF", "CBR", "SSC-3000", "SSC-600", "SSC-3", "SSC", "CX-600", "CPF-8", "CPF-3", "CPB-6S", "CPB", "96E", "96L"), "96L-3", "90L-", "CPC", "S-87" and "K-3", (the foregoing are flake-graphites) and "S-3" and "AP-6", (the foregoing are earth-graphites) which are made by Chuetsu Graphite Works Co., Ltd.; "CSSP", "CSPE", "CSP" and "Super-CP", (the foregoing are flake-graphites), and "ACP-1000", "ACP", "ACB-150", "SP-5", "SP-5L", "SP-10", "SP-10L", "SP-20", "SP-20L" and "HOP" (the foregoing are high-purity graphite having a purity of at least 97.5%) which are made by Nippon Kokuen L.T.D.

Examples of commercially available artificial graphites usable in the present invention are "RA-3000", "RA-15", "RA-44", "GX-600" and "G-6S" which are made by Chuetsu Graphite Works Co., Ltd.; "HAG-15", "PAG-15", "SGS-25", "SGS-15", "SGS-5", "SGS-1", "SGP-25", "SGP-15", "SGP-5", "SGP-1", "SGO-25", "SGO-15", "SGO-5", "SGO-1", "SGX-25", "SGX-15", "SGX-5" and "SGX-1" made by Nippon Kokuen L.T.D., as well as high-purity graphite having a purity of at least 99.9% from the same manufacturer, including "QP-2", "QP-5", "QP-10" and "QP-20".

Examples of commercially available artificial graphites produced by further processing or modifying graphite are "APO-Pi5", "AOP-B5", "AOP-A5" and "AOP-T1" which are made by Nippon Kokuen L.T.D. and have increased dispersibility into resins by surface-treating natural graphite powder with pitch, an acrylic resin or a titanate.

Kish as described before and available from The Kansai Coke and Chemicals Co., Ltd., which does not fall into the category of the above natural and artificial graphites, is also usable as the carbon material of the present invention.

The carbon material used in the present invention may consist only of one of the above graphites or, may comprise it as a principal component while incorporating other carbon materials.

The electrolyte solution used in the present invention utilizes a solvent comprising a specific organic compound, that is, at least one cyclic compound selected from the group consisting of ethylene carbonate (EC), ethylene thiocarbonate, γ-thiobutyrolactone, α-pyrrolidone, γ-butyrolactone (γ-BL), propylene carbonate, 1,2-butylene carbonate, 2,3-butylene carbonate, γ-valerolactone, γ-ethyl-γ-butyrolactone, β-methyl-γ-butyrolactone, thiolane, pyrazolidine, pyrrolidine, tetrahydrofuran, 3-methyltetrahydrofuran, sulfolane, 3-methylsulfolane, 2-methylsulfolane, 3-ethylsulfolane and 2-ethylsulfolane.

Preferred among the above cyclic compounds are those having no readily-decomposable groups, i.e. ethylene carbonate, ethylene thiocarbonate, γ-thiobutyrolactone, α-pyrrolidone, γ-butyrolactone, thiolane, pyrazolidine, pyrrolidine, tetrahydrofuran and sulfolane. These preferred cyclic compounds are stable and do not generate gases under the oxidation-reduction atmosphere during charge and discharge of the battery and in this point differ from other cyclic compounds having readily decomposable methyl groups or the like, which are readily absorbed on active points of graphite, such as propylene carbonate, 1,2-butylene carbonate, 2,3-butylene carbonate, γ-valerolactone, γ-ethyl-γ-butyrolactone and β-methyl-γ-butyrolactone. Thus, with the preferred cyclic compounds insertion of lithium into graphite is not hindered during charge and there does not occur polarization due to gas overpotential during charge or discharge.

The electrolyte solution in the present invention may comprise only one of the above solvents or, as required, two or more.

Examples of preferred solvents are, those consisting of single solvent, such as ethylene carbonate, γ-butyrolactone and sulfolane, mixed solvents comprising ethylene carbonate and γ-butyrolactone and mixed solvents comprising ethylene carbonate, γ-butyrolactone and sulfolane, among which more preferred for the purpose of providing a large battery capacity and high initial charge-discharge efficiency are ethylene carbonate, γ-butyrolactone and sulfolane. Particularly preferred is ethylene carbonate.

Where a mixed solvent of ethylene carbonate with γ-butyrolactone or sulfolane is used, the use of a mixed solvent containing 20% to 80% by volume of ethylene carbonate results in remarkably large battery capacity in high-rate discharge.

Ethylene carbonate (m.p.: 39° to 40° C.) or sulfolane (m.p.: 28.9° C.), which is solid at room temperature, may be used after being dissolved in an ether-based low-boiling point solvent, such as 1,2-dimethoxyethane (DME), 1,2-diethoxy-ethane (DEE) or ethoxymethoxyethane (EME) or an ester-based low-boiling point solvent such as dimethyl carbonate (DMC) or diethyl carbonate (DEC). Even γ-butyrolactone, which is liquid at room temperature, is preferably used in the form of a mixed solvent comprising one of the above low-boiling point solvents, for the purpose of permitting the resulting battery to develop excellent low-temperature characteristics.

Among the mixed solvents used in the present invention and comprising a cyclic compound and a low-boiling point solvent, those comprising a cyclic carbonate and dimethyl carbonate are excellent in, particularly, high-rate discharge characteristics thanks to high conductivity of dimethyl carbonate, while those comprising a cyclic carbonate and diethyl carbonate are particularly excellent in low-temperature discharge characteristic thanks to the low viscosity and high ion conductivity at low temperatures of diethyl carbonate.

The term "low-boiling point solvents" herein means those having a boiling point of not more than 150° C.

Where mixed solvents comprising one of the above low-boiling point solvents and ethylene carbonate is used, the use of a mixed solvent containing 20% to 80% by volume of ethylene carbonate results in remarkably large battery capacity in high-rate discharge. When a mixed solvent containing at least 20% by volume of ethylene carbonate is used as an electrolyte solvent, the lithium secondary battery of the present invention will have a remarkably large discharge capacity.

The electrolyte solution in the present invention is prepared by dissolving, in the above-described solvent, an electrolyte solute such as $LiPF_6$, $LiBF_4$, $LiClO_4$, $LiCF_3SO_3$, $LiC_4F_9SO_3$, $LiN(CF_3SO_2)_2$ or $LiAsF_6$.

These solutes are dissolved in the solvent to a concentration of preferably 0.1 to 3 moles/liter, more preferably 0.5 to 1.5 moles/liter.

FIG. 1 is a graph showing the charge-discharge cycle characteristics of the battery of the present invention comprising graphite (Lc: 2000 Å; $d_{002}$: 3.354 Å; Average Particle Diameter: 12 μm; Specific Surface Area: 7.5 m²/g; True Density: 2.25 g/cm³) as a negative electrode material and a comparison battery comprising coke (Lc: 45 Å; $d_{002}$: 3.462 Å; Average Particle Diameter: 14 μm; Specific Surface Area: 4.2 m²/g; True Density: 2.04 g/cm³) as a negative electrode. The ordinate of the graph represents the potential of the negative electrode against Li/Li⁺ single electrode potential, and the abscissa represents the capacity (mAh/g) per gram of the carbon material (graphite or coke). In the FIGURE, the solid line shows the charge-discharge cycle characteristics of the battery of the present invention and the broken line that of the comparison battery, while the arrow marks indicate the direction of the negative electrode potential increasing or decreasing, during discharge or charge. The charge-discharge characteristics of the FIGURE were obtained with the batteries both utilizing an electrolyte solvent of a 1/1 by volume mixed solvent of ethylene carbonate and dimethyl carbonate containing 1M (mole/liter) $LiPF_6$.

The charge-discharge characteristic of the comparison battery are first explained with reference to FIG. 1. The negative electrode potential, which is about 3 (V) before initial charge (point a), gets closer to the Li/Li+ single electrode potential (this is the base, i.e. 0 V, for the negative electrode potential values of the ordinate), as the initial charge proceeds and Li is occluded in coke, and finally reaches the point b (negative electrode potential: 0 V, capacity: about 300 mAh/g). The color of coke turns light brown or red at this point. The first discharge is then conducted. The negative electrode potential increases with the proceeding of the discharge and finally reaches the point c (capacity: 50 to 100 mAh/g) that shows discharge termination potential (about 1 V). In the course of the first discharge the negative electrode potential does not retrace the route followed during the initial charge but reaches the point c, thus presenting hysteresis. This is due to the fact that an amount of Li corresponding to P in the FIGURE has been caught by the coke and that, in the electrode reaction during the succeeding charge-discharge cycles, only the remaining Li in an amount of Q can participate in the reaction. The negative electrode potential changes, when charge-discharge cycle is repeated thereafter, in cycles as c→b→c→b . . . .

The charge-discharge cycle of the battery of the present invention is next explained. In the same manner as with the comparison battery, the negative electrode potential, which is about 3 (V) before initial charge (point a), gets closer to the Li/Li⁺ single electrode potential, as the initial charge proceeds and Li is occluded in graphite, and finally reaches the point d where the potential against the single electrode potential is 0 V (capacity: 375 mAh/g). The color of graphite turns gold at the point d, which, as well as X-ray diffraction, indicates that $C_6Li$ has been formed. The first discharge is then conducted. The negative electrode potential increases with the proceeding of the discharge and finally reaches the point e (capacity: 25 mAh/g) that shows discharge termination potential (about 1 V). The negative electrode potential changes, when charge-discharge cycle is repeated thereafter, in cycles as e→d→e→d . . . .

The battery characteristics of the battery of the present invention and that of comparison are compared based on the charge-discharge characteristics shown in FIG. 1. The battery of the present invention has a large initial charge capacity per gram of graphite of about 375 mAh/g (point d) at the initial charge, while the comparison battery has a small charge capacity per gram of coke of about 300 mAh/g (point b). Furthermore, with the battery of the present invention the capacity per gram of graphite up to the discharge termination potential, 1 V, is as large as about 350 mAh/g (d–e), while that per gram of coke with the comparison battery is as small as 200 to 250 mAh/g (b–c).

This fact means that the battery of the present invention has higher charge-discharge efficiency than that of the comparison battery.

It is also noted that: while the charge-discharge curve of the battery of the present invention is almost flat during discharge of from the point d to e and shows a rapid increase of negative electrode potential when the discharge process comes close to the point e, the charge-discharge curve of the comparison battery gradually increases when proceeding from the point b to c.

This fact means that the battery of the present invention is superior to the comparison battery in the flatness of discharge voltage.

That the battery of the present invention has higher charge-discharge efficiency and flatter discharge voltage than those of the comparison battery further means that the battery of the present invention has larger discharge capacity than the comparison battery.

Other features of the invention will become apparent in the course of the following description of exemplary embodiments which are given for illustration of the invention and are not intended to be limiting thereof.

EXAMPLES

Example 1

(Example 1-1~1-3)

(Preparation of positive electrode)

Cobalt carbonate and lithium carbonate were mixed in a atom ratio of Co:Li of 1:1, and the mixture was heat treated at 900° C. in the air for 20 hours to give $LiCoO_2$.

The $LiCoO_2$ thus obtained as a positive electrode material was mixed with a conductor of acetylene black and a binder of fluororesin dispersion [0.1 g/cc of polytetrafloroethylene (PTFE) dispersed in water] in a ratio by weight of 90:6:4 to give a material for preparing a positive electrode. The material was rolled onto an aluminum foil (thickness: 20 μm) that served as a current collector and heat treated under vacuum at a temperature of 250° C. for 2 hours, to give a positive electrode.

(Preparation of negative electrode)

Materials for preparing a negative electrode were obtained by mixing each of China natural graphite (Lc>1000 Å; $d_{002}$=3.354 Å; Average Particle Diameter: 12 μm; Specific Surface Area: 7.5 m²/g; True Density: 2.25 g/cm³), artificial graphite (Lc=350 Å; $d_{002}$=3.364 Å; Average Particle Diameter: 10 μm; Specific Surface Area: 10 m²/g; True Density: 2.25 g/cm³), and Lonza graphite (Lc=260 Å; $d_{002}$=3.363 Å; Average Particle Diameter: 15 μm; Specific Surface Area: 14.0 m²/g; True Density: 2.25 g/cm³), all with a particle diameter of 2 μm to 14 μm (average particle diameter: 12 μm), with a binder of fluororesin dispersion [0.1 g/cc of PTFE dispersed in water] in a ratio by weight of 95:5. These materials were each rolled on a current collector of an aluminum foil (thickness: 20 μm) and heat treated under vacuum at 250° C. for 2 hours, to give negative electrodes each containing one of the above carbon materials. When a graphite having an average particle diameter of 1 to 30 μm is used for the negative electrode, the lithium secondary battery of the present invention will have a large discharge capacity and high initial charge-discharge efficiency.

(Preparation of electrolyte solution)

An electrolyte solution was prepared by dissolving LiPF6 in a 1/1 by volume mixed solvent of ethylene carbonate and dimethyl carbonate to a concentration of 1 mole/liter. The use of ethylene carbonate in an amount of 20% to 80% by volume based on the volume of the solvent results in remarkably large discharge capacity.

(Preparation of batteries BA 1 through 3)

Cylindrical nonaqueous electrolyte solution secondary batteries (battery size: 14.2 mm diameter, 50.0 mm height) were prepared from the above positive electrode, negative electrode and electrolyte. BA1, BA2 and BA3 denote those utilizing, as a carbon material, natural graphite (Example 1-1), artificial graphite (Example 1-2) and Lonza graphite (Example 1-3), respectively. An ion-permeable polypropylene sheet (CELGARD, made by Daicel Co.) was used as a separator.

Figure 2:
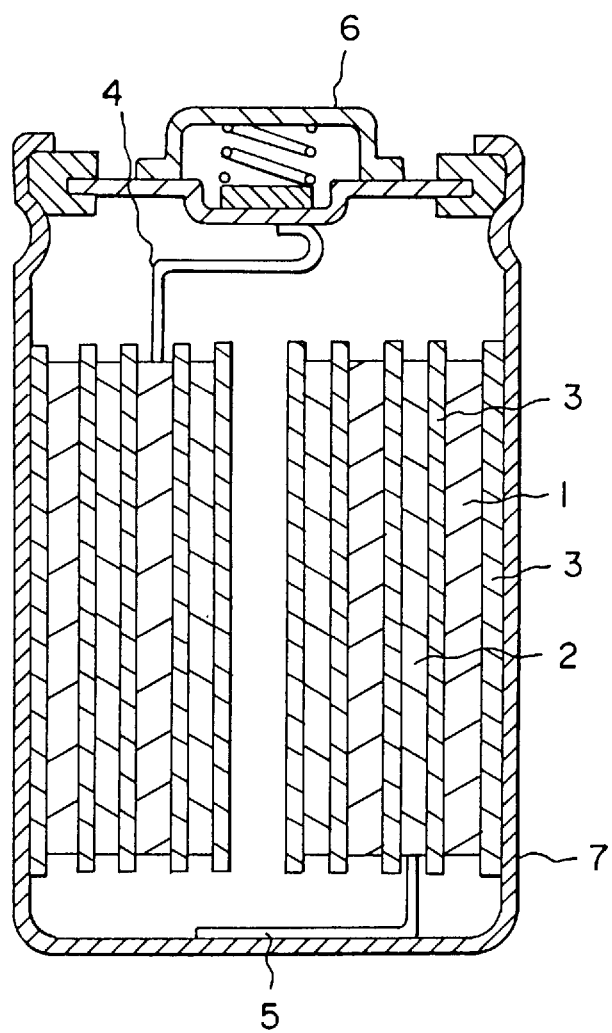
FIG. 2 is a sectional view of a cylindrical battery.

FIG. 2 is a sectional view of the thus prepared battery BA1 (or 2, or 3), which comprises a positive electrode 1, negative electrode 2, a separator 3 interposed between and separating these two electrodes, a positive electrode lead 4, a negative electrode lead 5, a positive electrode external terminal 6, a negative electrode can 7 and other parts. The positive electrode 1 and the negative electrode 2 are housed in the negative electrode can 7, while being spirally wound up with the separator 3 inter-posed between them, the separator containing an electrolyte solution injected thereinto. The positive electrode 1 is connected via the positive electrode lead 4 to the positive electrode external terminal 6 and the negative electrode 2 is connected via the negative electrode lead 5 to the negative electrode can 7. The battery is thus capable of permitting the chemical energy generated inside it to be taken out as electrical energy.

Comparison Example 1

Example 1-1 was repeated except for using coke (Lc=45 Å; $d_{002}$=3.462 Å; Average Particle Diameter: 14 μm; Specific Surface Area: 4.2 $m^2/g$; True Density: 2.04 $g/cm^3$) as a negative electrode material, to prepare a comparison battery BC1.

Charge-discharge characteristics of the batteries

Figure 3:
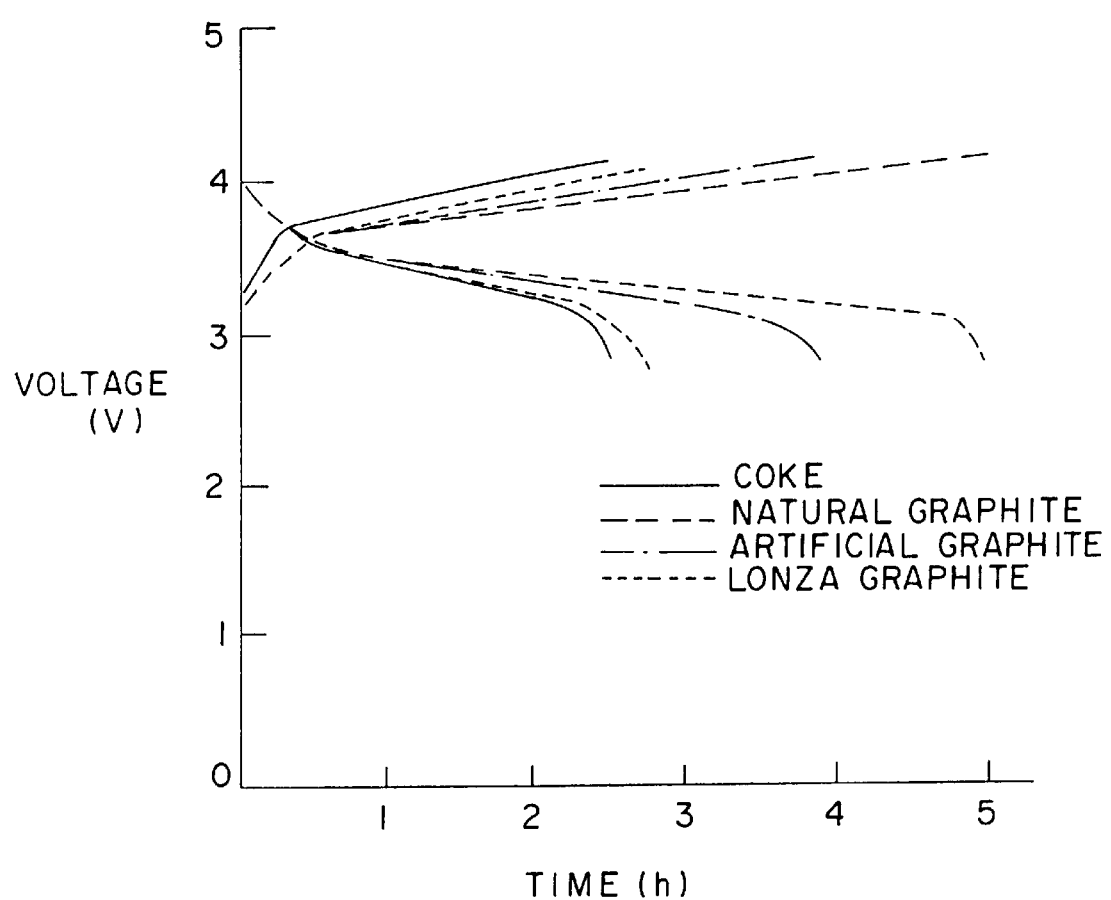
FIG. 3 is a graph showing the charge-discharge characteristics of the batteries BA1 through BA3 of the present invention and the comparison battery BC1.
Figure 4:
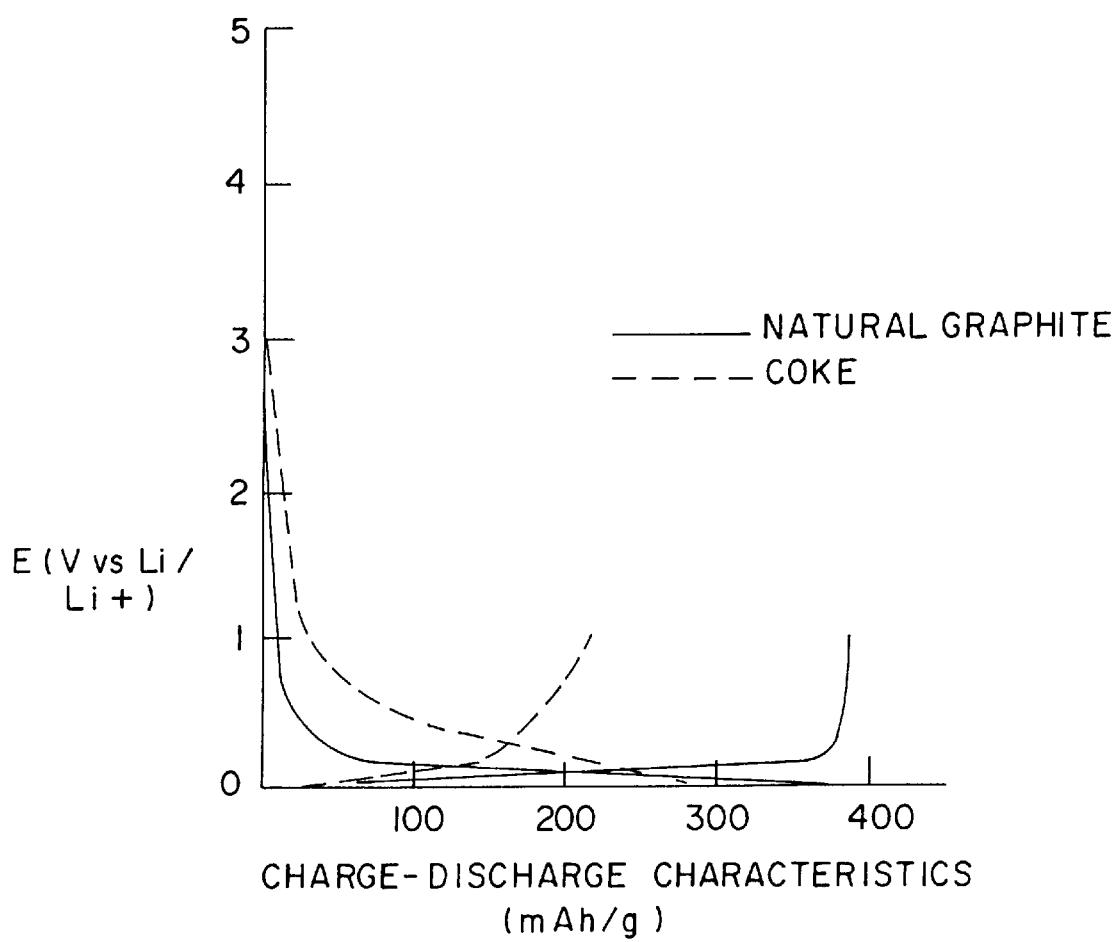
FIG. 4 is a graph showing the charge-discharge characteristics of the battery BA1 of the present invention.
Figure 5:
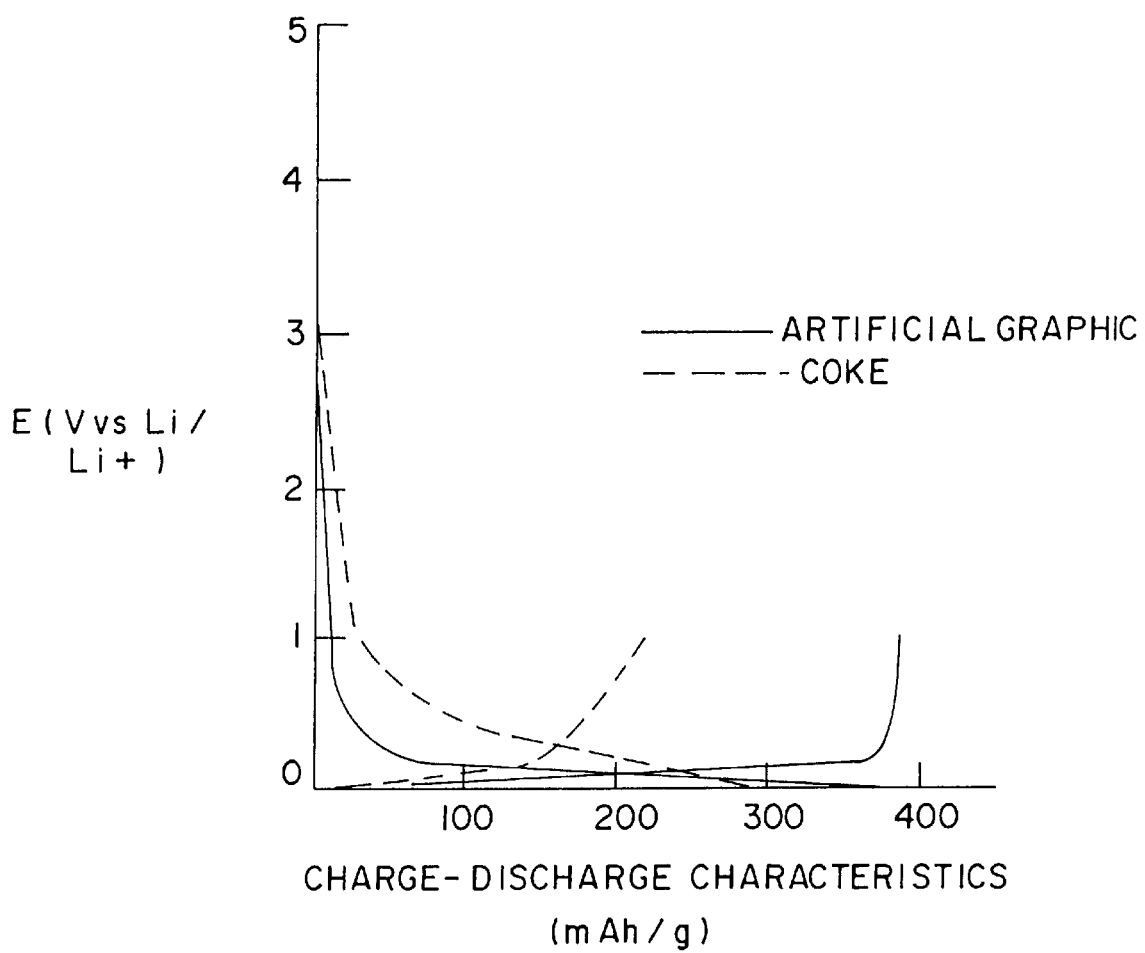
FIG. 5 is a graph showing the charge-discharge characteristics of the battery BA2 of the present invention.
Figure 6:
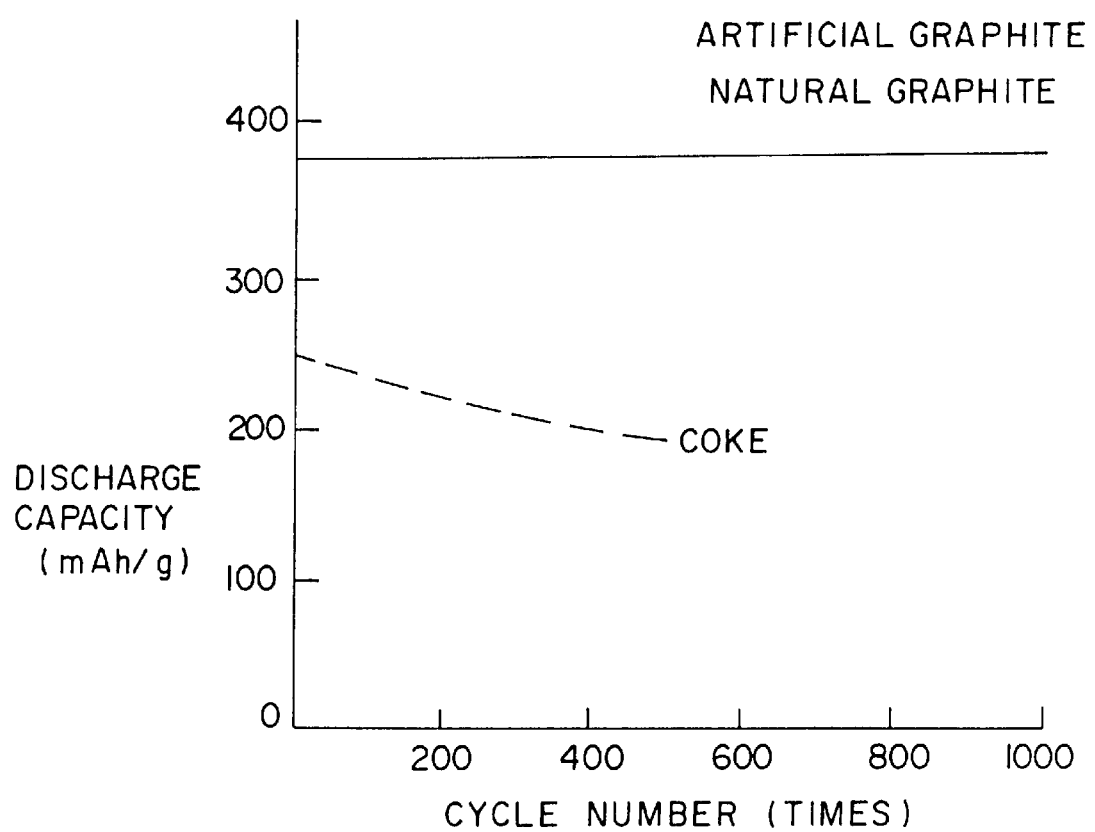
FIG. 6 is a graph showing the cycle characteristics of the batteries BA1 and BA2 of the present invention and the comparison battery BC1.

FIG. 3 is a graph showing the charge-discharge characteristics at 250 mA (constant-current discharge) from the second cycle on of the batteries BA1 through BA3 of the present invention and the comparison battery BC1, where the ordinate represents the voltage (V) and the abscissa represents the time (h). FIGS. 4 and 5 each show the charge-discharge characteristics of the battery BA1 or BA2 as compared with that of the comparison battery BC1, where the ordinate represents the negative electrode potential (V) against Li/Li+ single electrode potential and the abscissa represents the charge-discharge capacity (mAh/g). It is understood from these FIGURES that the batteries BA1 through BA3 of the present invention are superior to the comparison battery BC1 in charge-discharge characteristics. FIG. 6 is a graph showing the cycle characteristics of the batteries BA1 and BA2 of the present invention and the comparison battery BC1, with the ordinate representing the discharge capacity (mAh/g) and the abscissa the cycle number. As seen from the FIGURE, the batteries BA1 and BA2 of the present invention develop better cycle characteristics than the comparison battery BC1. These batteries were also, after being charged, kept at a room temperature for 1 month and tested for storage capability. Then, the self-discharge rate was 2 to 5%/month for the batteries BA1 through BA3 of the present invention and 15%/month for the comparison battery BC1.

Example 2

Example 1-1 was repeated except for using, instead of the China natural graphite, a mixture of 100 parts by weight of the natural graphite and 5 parts by weight of carbon black having an Lc of 8 Å, to obtain a battery; BA5, according to the present invention.

Figure 7:
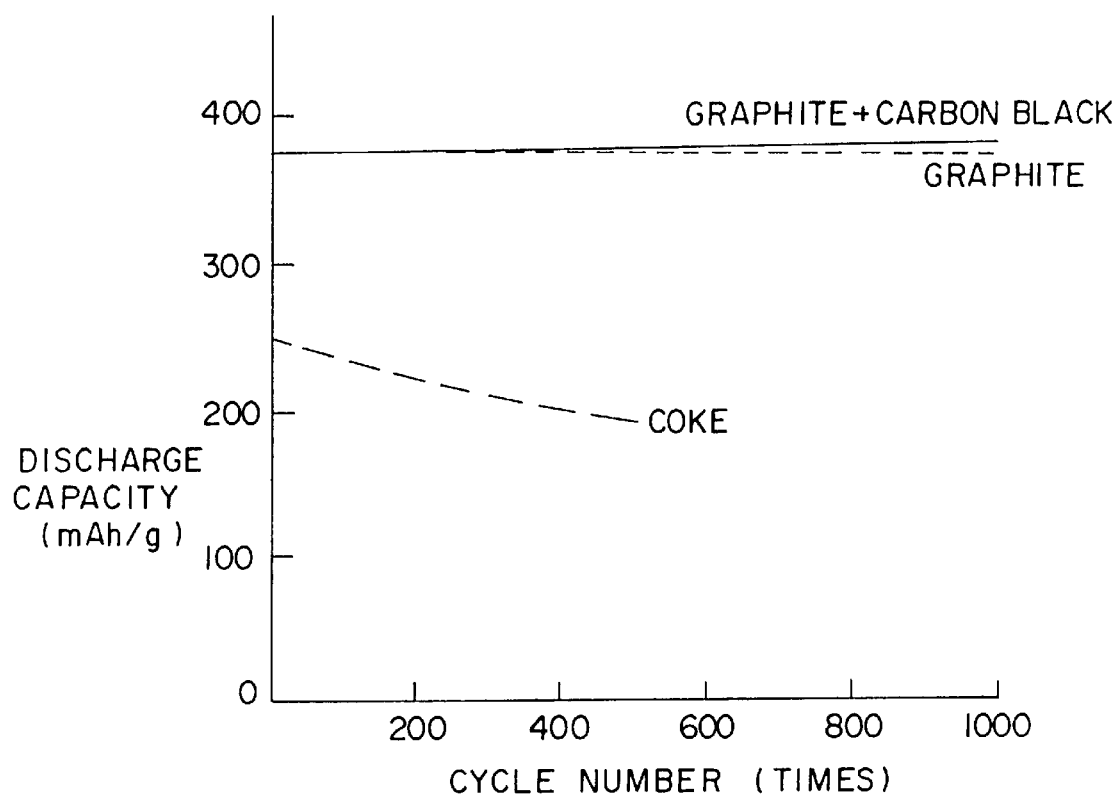
FIG. 7 is a graph showing the cycle characteristics of the battery BA5 of the present invention.

FIG. 7 is a graph showing the cycle characteristics of the thus prepared battery BA5, where the ordinate represents the discharge capacity of the battery (mAh/g) and the abscissa the cycle number. FIG. 7 also shows for comparison purposes the cycle characteristics of the battery BA1 utilizing as a carbon material graphite only and the battery BC1 utilizing coke.

As seen from the FIGURE, the battery BA5 develops, thanks to little dropping off of the carbon material from the electrode, better cycle characteristics than that utilizing graphite only, to say nothing of that utilizing coke.

Example 3

Example 1-1 was repeated except for using, instead of the 1/1 by volume mixed solvent of ethylene carbonate (EC) and dimethyl carbonate (DMC) as an electrolyte solvent, a 1/1 by volume mixed solvent of ethylene carbonate and diethyl carbonate (DEC) , a 1/1 by volume mixed solvent of ethylene carbonate and dipropyl carbonate (DPC) and 1,3-dioxolane (1,3-DOL), respectively, to prepare a battery BA6 according to the present invention, a comparison battery BC2 and a conventional battery.

Figure 8:
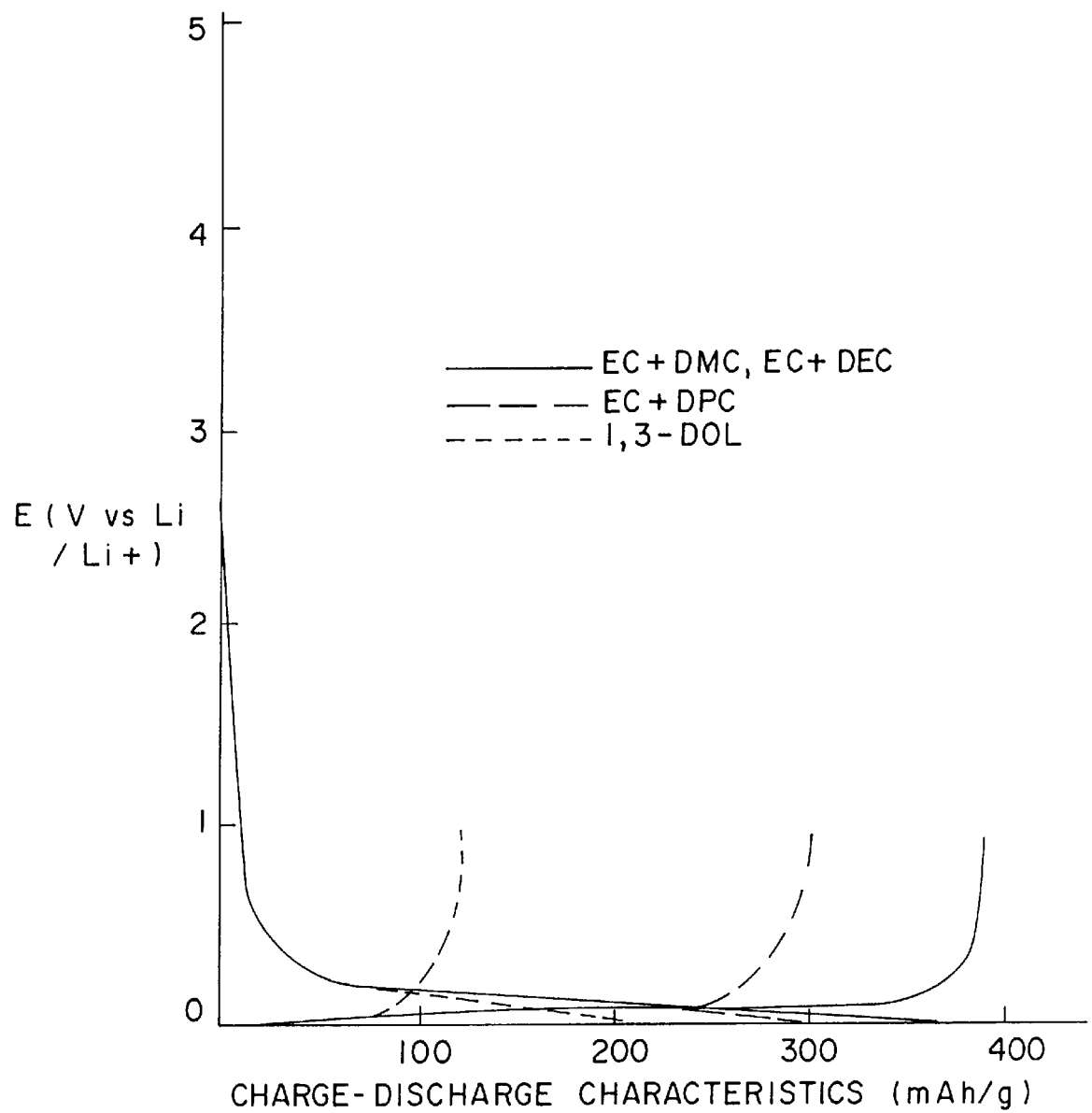
FIG. 8 is a graph showing the charge-discharge characteristics of the batteries BA6 of the present invention, a comparison battery BC2 and a conventional battery.

FIG. 8 is a graph showing the charge-discharge characteristics of these batteries, with the ordinate representing the negative electrode potential (V) and the abscissa representing the charge-discharge capacity.

As seen from the FIGURE, the battery BA6 develops, like that of BA1, better charge-discharge characteristics than the comparison battery BC2 and the conventional battery.

Example 4

Negative electrodes were prepared from 13 types of carbon materials having different d-values ($d_{002}$) of the lattice plane (002) obtained by the X-ray diffraction method thereof. The properties of the carbon materials are shown in Table 2. The X-ray diffraction method was conducted under the following measuring conditions (hereinafter the same will apply).

Radiation source: CuK α

Slit conditions: divergence slit 1°, scattering slit 1° and receiving slit 0.3 mm.

Gonioradius: 180 mm

Graphite curved crystalline monochromator.

Using the 13 negative electrodes thus prepared 13 batteries were obtained in the same manner as in Example 1.

Figure 9:
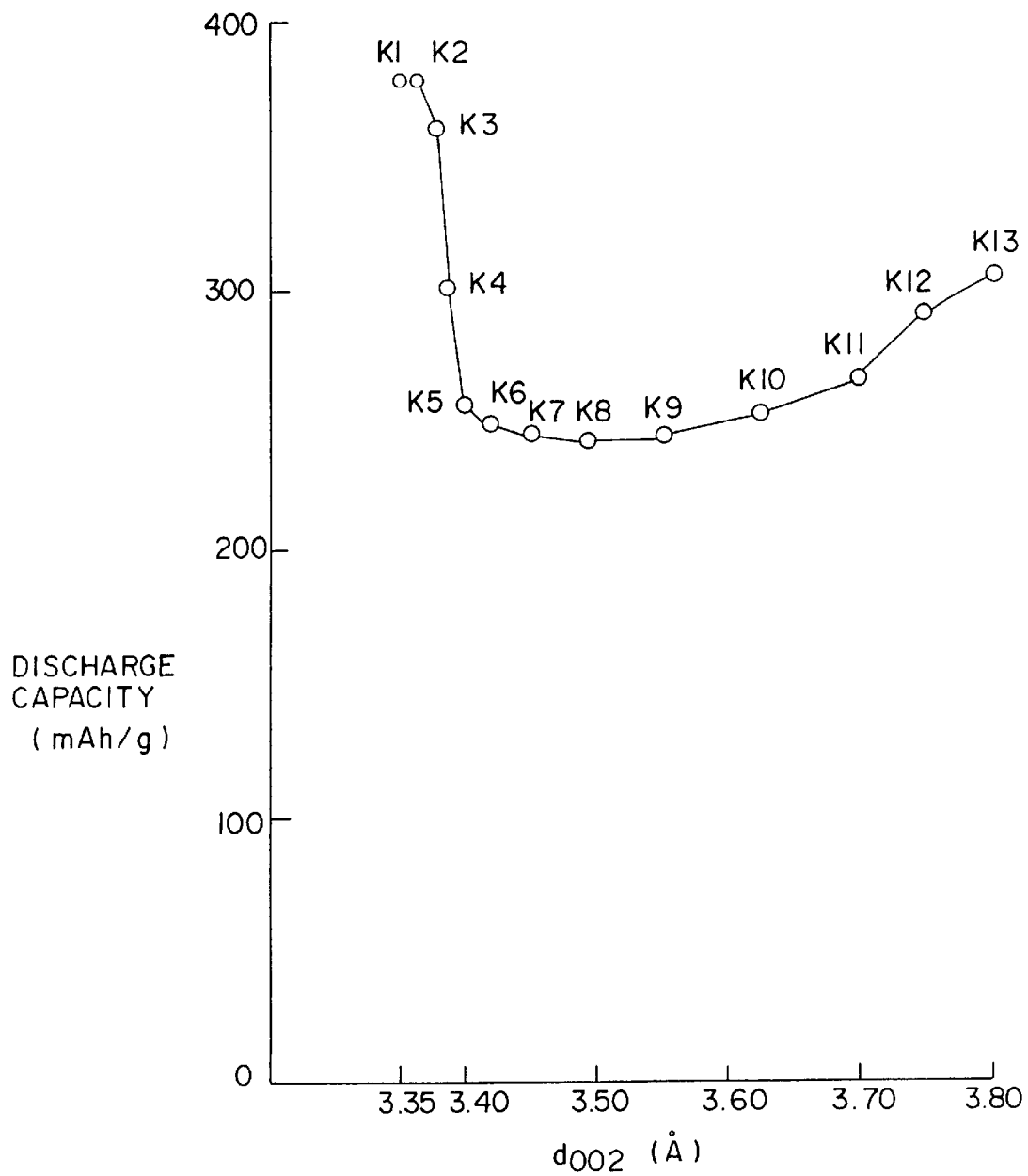
FIG. 9 is a graph showing the relationship between the $d_{002}$ value of a carbon material and the discharge capacity of the battery utilizing a negative electrode of the carbon material.

FIG. 9 is a graph showing the relationship between the $d_{002}$ value of a carbon material and the discharge capacity of the battery utilizing it, with the ordinate representing the discharge capacity (mAh/g) of the battery and the abscissa the $d_{002}$ value of the carbon material used.

As seen from the FIGURE, batteries utilizing a graphite having a $d_{002}$ of 3.354 to 3.370 have large discharge capacities.

TABLE 2

|  | K1 | K2 | K3 | K4 | K5 | K6 | K7 | K8 | K9 | K10 | K11 | K12 | K13 |
|---|---|---|---|---|---|---|---|---|---|---|---|---|---|
| $d_{002}$ (Å) | 3.354 | 3.368 | 3.378 | 3.385 | 3.401 | 3.440 | 3.469 | 3.495 | 3.556 | 3.630 | 3.710 | 3.742 | 3.781 |
| Lc (Å) | 2000 | 2000 | 810 | 620 | 43 | 30 | 25 | 11 | 9 | 12 | 15 | 17 | 8 |
| True Density (g/cm$^3$) | 2.25 | 2.25 | 2.13 | 2.10 | 1.98 | 1.92 | 1.86 | 1.72 | 1.61 | 1.45 | 1.31 | 1.13 | 1.02 |
| Specific Surface Area (m$^2$/g) | 7.5 | 6.3 | 6.9 | 7.0 | 6.9 | 7.2 | 8.9 | 9.3 | 7.1 | 6.8 | 7.5 | 8.1 | 6.9 |
| Average Particle Diameter (μm) | 12 | 14 | 12 | 12 | 12 | 10 | 15 | 12 | 14 | 16 | 11 | 12 | 12 |

Example 5

Negative electrodes were prepared from 12 types of carbon materials having different true densities. The properties of the carbon materials are shown in Table 3. Using the 12 negative electrodes thus prepared 12 batteries were obtained in the same manner as in Example 1.

Figure 10:
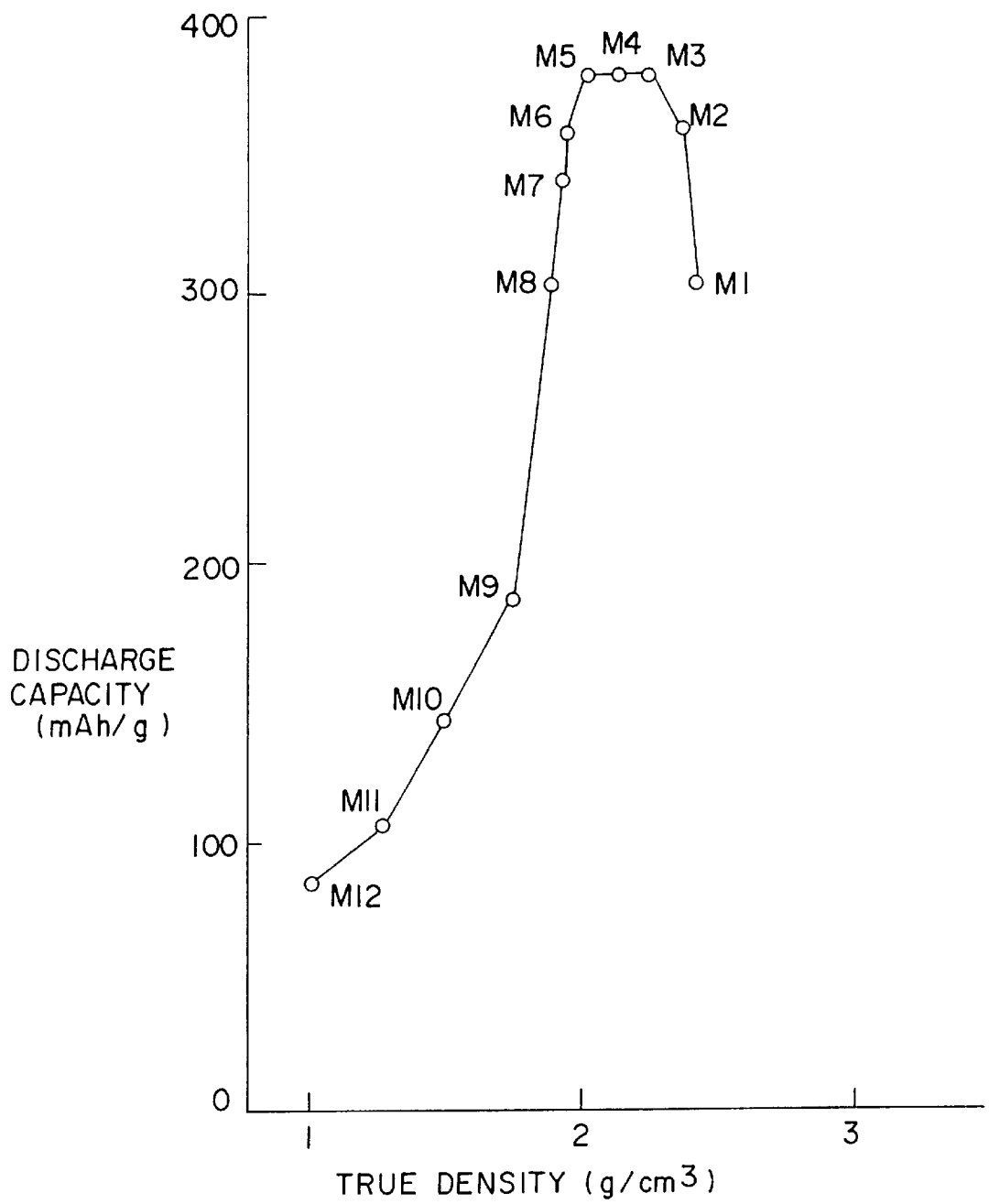
FIG. 10 is a graph showing the relationship between the true density of a carbon material and the discharge capacity of the battery.

FIG. 10 is a graph showing the relationship between the true density of a carbon material and the discharge capacity of the battery utilizing it, with the ordinate representing the discharge capacity (mAh/g) of the battery and the abscissa the true density (g/cm$^3$) of the carbon material used.

As seen from the FIGURE, batteries utilizing a graphite having a true density of 1.9 to 2.25 g/cm$^3$ have large discharge capacities.

As seen from the FIGURE, batteries utilizing a graphite having an average particle diameter of 1 to 30 μm have large discharge capacities.

TABLE 3

|  | M2 | M3 | M4 | M5 | M6 | M7 | M8 | M9 | M10 | M11 | M12 |
|---|---|---|---|---|---|---|---|---|---|---|---|
| $d_{002}$ (Å) | 3.3514 | 3.354 | 3.354 | 3.370 | 3.363 | 3.377 | 3.359 | 3.363 | 3.398 | 3.440 | 3.490 | 3.601 |
| Lc (Å) | 790 | 440 | 2000 | 410 | 220 | 205 | 190 | 175 | 8.5 | 18 | 12 | 11 |
| True Density (g/cm$^3$) | 2.30 | 2.29 | 2.25 | 2.15 | 2.00 | 1.91 | 1.87 | 1.80 | 1.68 | 1.52 | 1.30 | 1.03 |
| Specific Surface Area (m$^2$/g) | 6.9 | 7.2 | 7.5 | 7.0 | 6.1 | 7.1 | 7.0 | 6.0 | 7.0 | 7.8 | 9.9 | 12 |
| Average Particle Diameter (μm) | 12 | 12 | 12 | 12 | 16 | 12 | 10 | 16 | 12 | 14 | 12 | 14 |

Example 6

Negative electrodes were prepared from 9 types of carbon materials having different average particle diameter. The properties of the carbon materials are shown in Table 4.

TABLE 4

|  | N1 | N2 | N3 | N4 | N5 | N6 | N7 | N8 | N9 |
|---|---|---|---|---|---|---|---|---|---|
| $d_{002}$ (Å) | 3.354 | 3.354 | 3.354 | 3.354 | 3.354 | 3.354 | 3.354 | 3.354 | 3.354 |
| Lc (Å) | 2000 | 2000 | 2000 | 2000 | 2000 | 2000 | 2000 | 2000 | 2000 |
| True Density (g/cm$^3$) | 2.23 | 2.23 | 2.23 | 2.23 | 2.23 | 2.23 | 2.23 | 2.23 | 2.23 |
| Specific Surface Area (m$^2$/g) | 75 | 30 | 18 | 15 | 8.5 | 2.0 | 1.0 | 0.3 | 0.2 |
| Average Particle Diameter (μm) | 0.25 | 0.5 | 1 | 3 | 10 | 20 | 30 | 40 | 50 |

Using the 9 negative electrodes thus prepared 9 batteries were obtained in the same manner as in Example 1.

Figure 11:
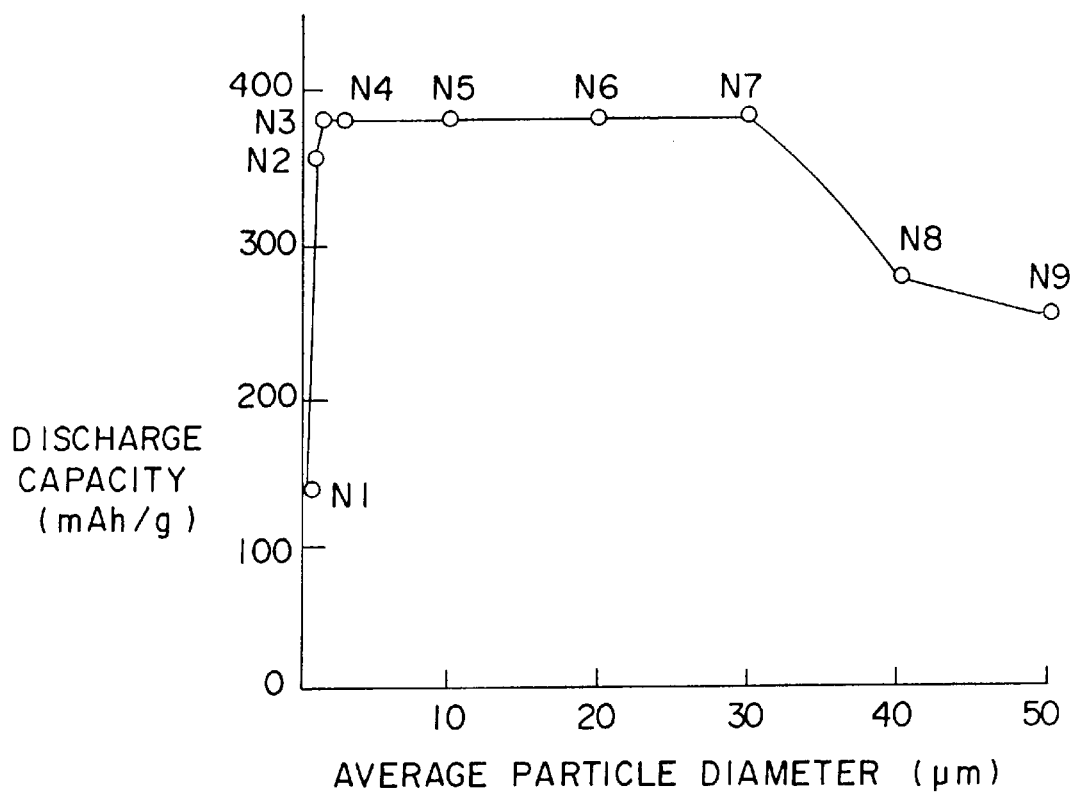
FIG. 11 is a graph showing the relationship between the average particle diameter of a carbon material and the discharge capacity of the battery.

FIG. 11 is a graph showing the relationship between the average particle diameter (wherein the cumulative volume is 50% in particle size distribution) of a carbon material and the discharge capacity of the battery utilizing it, with the ordinate representing the discharge capacity (mAh/g) of the battery and the abscissa the average particle diameter (μm) of the carbon material used.

Example 7

Negative electrodes were prepared from 13 types of carbon materials having different specific surface areas. The properties of the carbon materials are shown in Table 5. Using the 13 negative electrodes thus prepared 13 batteries were obtained in the same manner as in Example 1.

Figure 12:
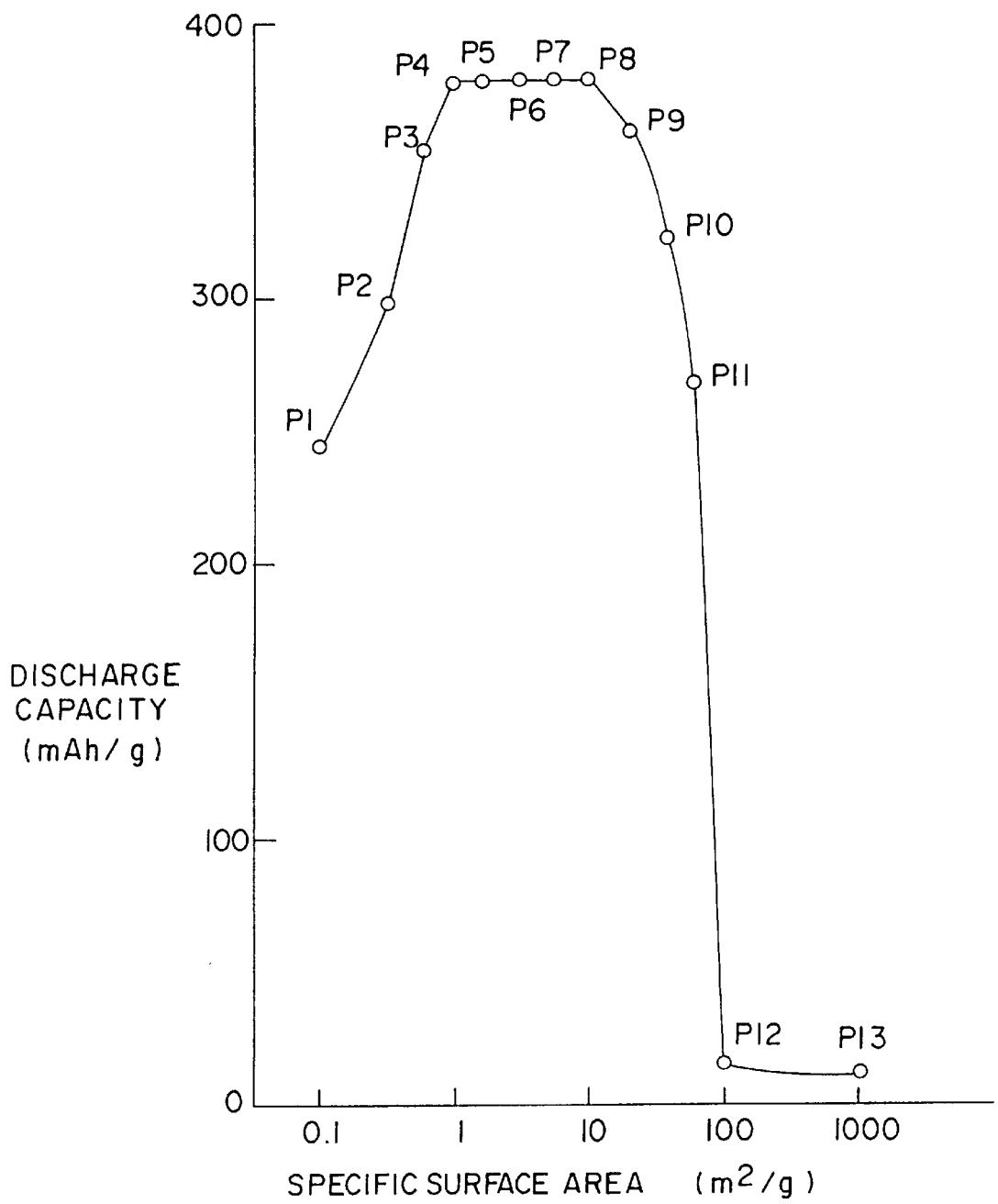
FIG. 12 is a graph showing the relationship between the specific surface area of a carbon material and the discharge capacity of the battery.

FIG. 12 is a graph showing the relationship between the specific surface area (obtained a BET method employing $N_2$ gas) of a carbon material and the discharge capacity of the battery utilizing it, with the ordinate representing the discharge capacity (mAh/g) of the battery and the abscissa the specific surface area (m²/g) of the carbon material used.

As seen from the FIGURE, batteries utilizing a graphite having a specific surface area of 0.5 to 50 m²/g have large discharge capacities.

7, to prepare 21 types of batteries according to the present invention. The batteries thus prepared were discharged at 100 mA and tested for their graphite characteristics [capacity per unit weight (mAh/g) and initial charge-discharge efficiency (%)], battery characteristics [battery capacity (mAh), self-discharge rate (%/month), cycle life (times) and charge-discharge efficiency (%)]. The results are shown in Table 7.

TABLE 5

|  | P1 | P2 | P3 | P4 | P5 | P6 | P7 |
|---|---|---|---|---|---|---|---|
| $d_{002}$ (Å) | 3.354 | 3.354 | 3.354 | 3.354 | 3.354 | 3.354 | 3.354 |
| Lc (Å) | 2000 | 2000 | 2000 | 2000 | 2000 | 2000 | 2000 |
| True Density (g/cm³) | 2.23 | 2.23 | 2.23 | 2.23 | 2.23 | 2.23 | 2.23 |
| Specific Surface Area (m²/g) | 0.1 | 0.4 | 0.6 | 1.0 | 2.0 | 3.3 | 6.2 |
| Average Particle Diameter (μm) | 80 | 38 | 35 | 30 | 20 | 16 | 14 |

|  | P8 | P9 | P10 | P11 | P12 | P13 |
|---|---|---|---|---|---|---|
| $d_{002}$ (Å) | 3.354 | 3.354 | 3.354 | 3.354 | 3.354 | 3.354 |
| Lc (Å) | 2000 | 2000 | 2000 | 2000 | 2000 | 2000 |
| True Density (g/cm³) | 2.23 | 2.23 | 2.23 | 2.23 | 2.23 | 2.23 |
| Specific Surface Area (m²/g) | 12 | 20 | 40 | 60 | 100 | 1000 |
| Average Particle Diameter (μm) | 5 | 0.6 | 0.4 | 0.3 | 0.15 | 0.05 |

Example 8

Negative electrodes were prepared from 11 types of carbon materials having different Lc's. The properties of the carbon materials are shown in Table 6. Using the 11 negative electrodes thus prepared 11 batteries were obtained in the same manner as in Example 1.

Figure 13:
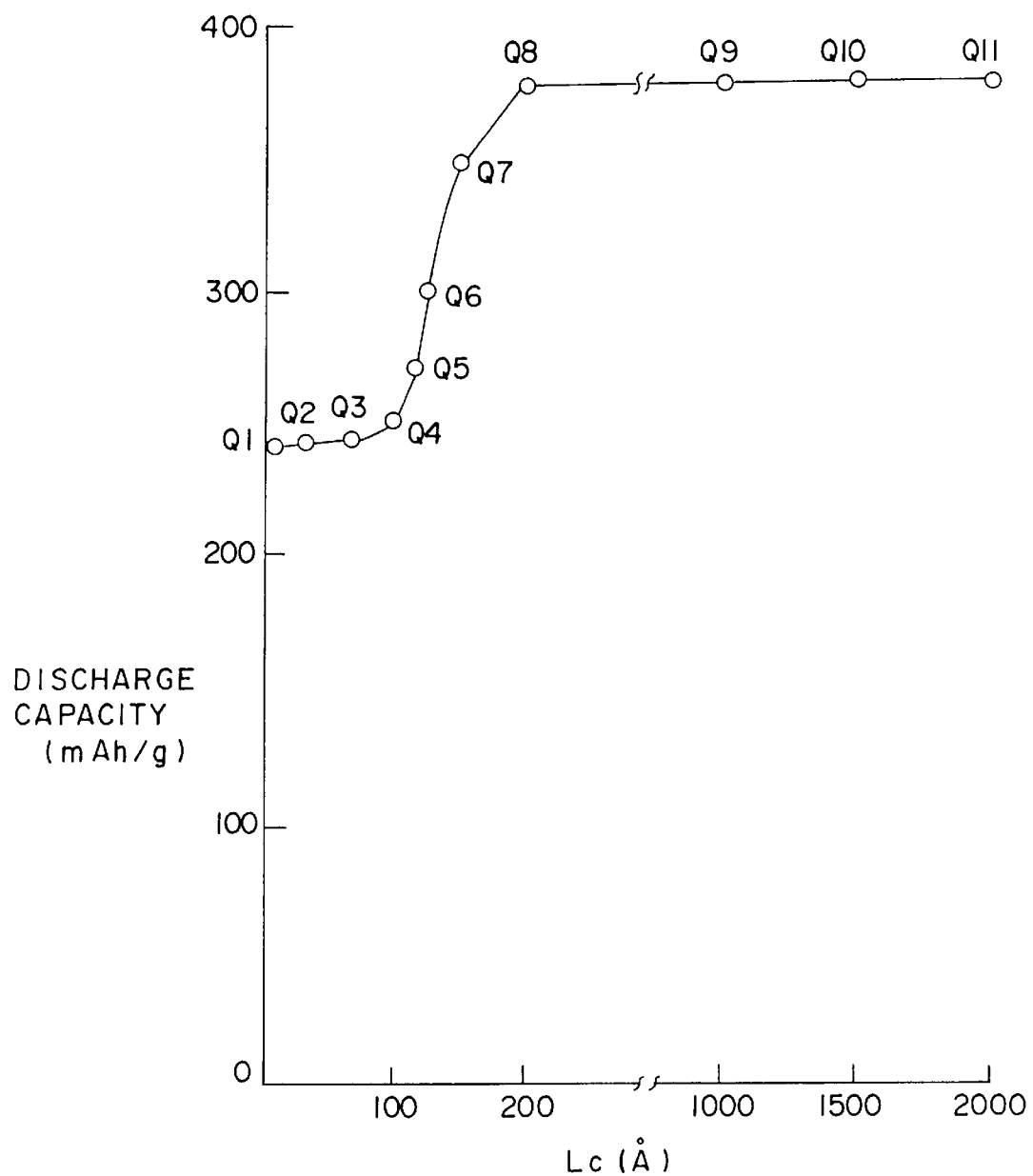
FIG. 13 is a graph showing the relationship between the Lc value of a carbon material and the discharge capacity of the battery.

FIG. 13 is a graph showing the relationship between the Lc of a carbon material and the discharge capacity of the battery utilizing it, with the ordinate representing the discharge capacity (mAh/g) of the battery and the abscissa the Lc (Å) of the carbon material used.

As seen from the FIGURE, batteries utilizing a graphite having an Lc of at least 200 Å have large discharge capacities.

Comparative Example 2

Example 1-1 was repeated except for using an electrolyte solution of a 1 mole/liter $LiPF_6$ solution in 1,3-dioxolane, to prepare a conventional battery. The battery thus prepared was discharged at 100 mA and then tested for the same items as those in Example 9. The results are also shown in Table 7.

TABLE 6

|  | Q1 | Q2 | Q3 | Q4 | Q5 | Q6 | Q7 | Q8 | Q9 | Q10 | Q11 |
|---|---|---|---|---|---|---|---|---|---|---|---|
| $d_{002}$ (Å) | 3.49 | 3.46 | 3.47 | 3.47 | 3.48 | 3.376 | 3.377 | 3.367 | 3.359 | 3.359 | 3.354 |
| Lc (Å) | 10 | 30 | 70 | 100 | 115 | 120 | 150 | 210 | 1000 | 1500 | 2000 |
| True Density (g/cm³) | 1.90 | 1.89 | 1.89 | 1.97 | 1.99 | 1.70 | 1.80 | 2.03 | 2.24 | 2.25 | 2.25 |
| Specific Surface Area (m²/g) | 6.5 | 7.2 | 8.1 | 6.3 | 7.2 | 6.9 | 7.0 | 6.3 | 6.7 | 7.0 | 7.5 |
| Average Particle Diameter (μm) | 16 | 14 | 18 | 11 | 12 | 12 | 12 | 14 | 11 | 9 | 12 |

Example 9

Example 1-1 was repeated except for using 1 mole/liter electrolyte solutions of $LiPF_6$ in solvents as shown in Table

TABLE 7

| (+) LiCoO$_2$/(−) graphite Single solvent shown below | Graphite characteristics | | Battery characteristics | | | |
|---|---|---|---|---|---|---|
| | Capacity per unit weight | Initial charge-discharge efficiency | Capacity | Self-discharge rate | Cycle life | Charge-discharge efficieny |
| Ethylene carbonate | 350 | 95 | 600 | 5 | >1,000 | 100 |
| Propylene carbonate | 230 | 60 | 420 | 25 | >500 | 97 |
| 1,2-Butylene carbonate | 270 | 65 | 360 | 20 | >300 | 95 |
| 2,3-Butylene carbonate | 200 | 60 | 400 | 25 | >300 | 95 |
| Ethylene thiocarbonate | 190 | 80 | 350 | 10 | >300 | 95 |
| γ-Thiobutyrolactone | 200 | 85 | 400 | 10 | >300 | 95 |
| α-pyrrolidone | 180 | 75 | 380 | 10 | >300 | 95 |
| γ-butyrolactone | 320 | 95 | 500 | 5 | >1,000 | 100 |
| γ-valerolactone | 230 | 90 | 360 | 10 | >500 | 97 |
| γ-ethyl-γ-butyrolactone | 190 | 85 | 380 | 10 | >500 | 97 |
| β-methyl-γ-butyrolactone | 170 | 80 | 380 | 10 | >300 | 95 |
| Thiolane | 200 | 80 | 400 | 15 | >300 | 95 |
| Pyrazolidine | 190 | 80 | 380 | 15 | >500 | 97 |
| Pyrrolidine | 180 | 85 | 380 | 10 | >300 | 95 |
| Tetrahydrofuran | 230 | 90 | 420 | 10 | >500 | 97 |
| 3-Methyltetrahydrofuran | 220 | 80 | 420 | 15 | >300 | 95 |
| Sulfolane | 300 | 95 | 480 | 5 | >1,000 | 100 |
| 3-Methylsulfolane | 280 | 85 | 450 | 10 | >500 | 97 |
| 2-Methylsulfolane | 260 | 80 | 450 | 10 | >500 | 97 |
| 3-Ethylsulfolane | 250 | 85 | 440 | 15 | >300 | 95 |
| 2-Ethylsulfolane | 250 | 85 | 440 | 15 | >300 | 95 |
| 1,3-dioxolane | 100 | 60 | 150 | 50 | <50 | 70 |

Example 10

Example 1-1 was repeated except for using electrolyte solutions of a 1 mole/liter LiPF$_6$ solution in each of the mixed solvents as shown in Table 8, to prepare 21 types of batteries according to the present invention. The batteries thus prepared were discharged at 100 mA and then tested for the same items as those in Example 9. The results are also shown in Table 8.

thus prepared were discharged at 100 mA and then tested for the same items as those in Example 9. The results are also shown in Table 9.

TABLE 8

| (+) LiCoO$_2$/(−) graphite Dimethyl carbonate:solvent shown below = 1:1 | Graphite characteristics | | Battery characteristics | | | |
|---|---|---|---|---|---|---|
| | Capacity per unit weight | Initial charge-discharge efficiency | Capacity | Self-discharge rate | Cycle life | Charge-discharge efficieny |
| Ethylene carbonate | 355 | 95 | 610 | 5 | >1,000 | 100 |
| Propylene carbonate | 235 | 60 | 425 | 25 | >500 | 97 |
| 1,2-Butylene carbonate | 270 | 65 | 360 | 20 | >300 | 95 |
| 2,3-Butylene carbonate | 200 | 60 | 400 | 25 | >300 | 95 |
| Ethylene thiocarbonate | 190 | 80 | 350 | 10 | >300 | 95 |
| γ-Thiobutyrolactone | 200 | 85 | 400 | 25 | >300 | 95 |
| α-pyrrolidone | 185 | 75 | 385 | 10 | >300 | 95 |
| γ-butyrolactone | 310 | 95 | 520 | 5 | >1,000 | 100 |
| γ-valerolactone | 235 | 90 | 370 | 10 | >500 | 97 |
| γ-ethyl-γ-butyrolactone | 195 | 85 | 385 | 10 | >300 | 97 |
| β-methyl-γ-butyrolactone | 175 | 80 | 385 | 10 | >300 | 95 |
| Thiolane | 205 | 80 | 410 | 15 | >300 | 95 |
| Pyrazolidine | 195 | 80 | 380 | 15 | >500 | 97 |
| Pyrrolidine | 185 | 85 | 380 | 10 | >300 | 95 |
| Tetrahydrofuran | 235 | 90 | 425 | 10 | >500 | 97 |
| 3-Methyltetrahydrofuran | 230 | 80 | 420 | 15 | >300 | 95 |
| Sulfolane | 305 | 95 | 485 | 5 | >1,000 | 100 |
| 3-Methylsulfolane | 285 | 85 | 460 | 10 | >500 | 97 |
| 2-Methylsulfolane | 265 | 80 | 450 | 10 | >500 | 97 |
| 3-Ethylsulfolane | 250 | 85 | 440 | 15 | >300 | 95 |
| 2-Ethylsulfolane | 250 | 85 | 440 | 15 | >300 | 95 |

Example 11

Example 1-1 was repeated except for using electrolyte solutions of a 1 mole/liter LiPF$_6$ solution in each of the mixed solvents as shown in Table 9, to prepare 21 types of batteries according to the present invention. The batteries

TABLE 9

| (+) LiCoO$_2$/(−) graphite | Graphite characteristics | | Battery characteristics | | | |
|---|---|---|---|---|---|---|
| Dimethyl carbonate:solvent shown below = 1:1 | Capacity per unit weight | Initial charge-discharge efficiency | Capacity | Self-discharge rate | Cycle life | Charge-discharge efficieny |
| Ethylene carbonate | 350 | 95 | 600 | 5 | >1,000 | 100 |
| Propylene carbonate | 230 | 60 | 420 | 25 | >500 | 97 |
| 1,2-Butylene carbonate | 260 | 65 | 350 | 20 | >300 | 95 |
| 2,3-Butylene carbonate | 200 | 60 | 400 | 25 | >300 | 95 |
| Ethylene thiocarbonate | 185 | 80 | 345 | 10 | >300 | 95 |
| γ-Thiobutyrolactone | 195 | 85 | 395 | 10 | >300 | 95 |
| α-pyrrolidone | 180 | 75 | 380 | 10 | >300 | 95 |
| γ-butyrolactone | 300 | 95 | 500 | 5 | >1,000 | 100 |
| γ-valerolactone | 230 | 90 | 360 | 10 | >500 | 97 |
| γ-ethyl-γ-butyrolactone | 190 | 85 | 380 | 10 | >500 | 97 |
| β-methyl-γ-butyrolactone | 170 | 80 | 370 | 10 | >300 | 95 |
| Thiolane | 200 | 80 | 400 | 15 | >300 | 95 |
| Pyrazolidine | 190 | 80 | 380 | 15 | >500 | 97 |
| Pyrrolidine | 180 | 85 | 380 | 10 | >300 | 95 |
| Tetrahydrofuran | 230 | 90 | 420 | 10 | >500 | 97 |
| 3-Methyltetrahydrofuran | 225 | 80 | 420 | 15 | >300 | 95 |
| Sulfolane | 300 | 95 | 475 | 5 | >1,000 | 100 |
| 3-Methylsulfolane | 280 | 85 | 455 | 10 | >500 | 97 |
| 2-Methylsulfolane | 260 | 80 | 450 | 10 | >500 | 97 |
| 3-Ethylsulfolane | 250 | 85 | 445 | 15 | >300 | 95 |
| 2-Ethylsulfolane | 250 | 85 | 440 | 15 | >300 | 95 |

Example 12

Example 1-1 was repeated except for using electrolyte solutions of a 1 mole/liter LiPF$_6$ solution in each of the mixed solvents as shown in Table 10, to prepare 21 types of batteries according to the present invention. The batteries thus prepared were discharged at 100 mA and then tested for the same items as those in Example 9. The results are also shown in Table 10.

types of batteries according to the present invention. The batteries thus prepared were discharged at 100 mA and then tested for the same items as those in Example 9. The results are also shown in Table 11.

TABLE 10

| (+) LiCoO$_2$/(−) graphite | Graphite characteristics | | Battery characteristics | | | |
|---|---|---|---|---|---|---|
| 1,2-Dimethoxyethane:solvent shown below = 1:1 | Capacity per unit weight | Initial charge-discharge efficiency | Capacity | Self-discharge rate | Cycle life | Charge-discharge efficieny |
| Ethylene carbonate | 360 | 95 | 620 | 10 | >300 | 95 |
| Propylene carbonate | 240 | 60 | 440 | 50 | >50 | 70 |
| 1,2-Butylene carbonate | 280 | 65 | 380 | 40 | >100 | 80 |
| 2,3-Butylene carbonate | 210 | 60 | 420 | 50 | >50 | 70 |
| Ethylene thiocarbonate | 200 | 80 | 370 | 20 | >200 | 90 |
| γ-Thiobutyrolactone | 210 | 85 | 420 | 20 | >200 | 90 |
| α-pyrrolidone | 190 | 75 | 400 | 20 | >200 | 90 |
| γ-butyrolactone | 330 | 95 | 520 | 10 | >300 | 95 |
| γ-valerolactone | 240 | 90 | 380 | 20 | >200 | 90 |
| γ-ethyl-γ-butyrolactone | 200 | 85 | 400 | 20 | >200 | 90 |
| β-methyl-γ-butyrolactone | 180 | 80 | 400 | 20 | >200 | 90 |
| Thiolane | 210 | 80 | 420 | 30 | >150 | 85 |
| Pyrazolidine | 200 | 80 | 400 | 30 | >150 | 85 |
| Pyrrolidine | 190 | 85 | 400 | 20 | >200 | 90 |
| Tetrahydrofuran | 240 | 90 | 440 | 20 | >200 | 90 |
| 3-Methyltetrahydrofuran | 230 | 80 | 440 | 30 | >150 | 85 |
| Sulfolane | 310 | 95 | 500 | 10 | >300 | 95 |
| 3-Methylsulfolane | 290 | 85 | 470 | 20 | >200 | 90 |
| 2-Methylsulfolane | 270 | 80 | 470 | 20 | >200 | 90 |
| 3-Ethylsulfolane | 260 | 85 | 460 | 30 | >150 | 85 |
| 2-Ethylsulfolane | 260 | 85 | 460 | 30 | >150 | 85 |

Example 13

Example 9 was repeated except for using LiNiO$_2$ instead of LiCoO$_2$ as a positive electrode material, to prepare 21

TABLE 11

| (+) $LiNiO_2$/(−) graphite | Graphite characteristics | | Battery characteristics | | | |
|---|---|---|---|---|---|---|
| Single solvent shown below shown below = 1:1 | Capacity per unit weight | Initial charge-discharge efficiency | Capacity | Self-discharge rate | Cycle life | Charge-discharge efficieny |
| Ethylene carbonate | 350 | 95 | 550 | 5 | >1,000 | 100 |
| Propylene carbonate | 230 | 60 | 370 | 25 | >500 | 97 |
| 1,2-Butylene carbonate | 270 | 65 | 310 | 20 | >300 | 95 |
| 2,3-Butylene carbonate | 200 | 60 | 350 | 25 | >300 | 95 |
| Ethylene thiocarbonate | 190 | 80 | 300 | 10 | >300 | 95 |
| γ-Thiobutyrolactone | 200 | 85 | 350 | 10 | >300 | 95 |
| α-pyrrolidone | 180 | 75 | 330 | 10 | >300 | 95 |
| γ-butyrolactone | 320 | 95 | 450 | 5 | >1,000 | 100 |
| γ-valerolactone | 230 | 90 | 310 | 10 | >500 | 97 |
| γ-ethyl-γ-butyrolactone | 190 | 85 | 330 | 10 | >500 | 97 |
| β-methyl-γ-butyrolactone | 170 | 80 | 330 | 10 | >300 | 95 |
| Thiolane | 200 | 80 | 350 | 15 | >300 | 95 |
| Pyrazolidine | 190 | 80 | 330 | 15 | >500 | 97 |
| Pyrrolidine | 180 | 85 | 330 | 10 | >300 | 95 |
| Tetrahydrofuran | 230 | 90 | 370 | 10 | >500 | 97 |
| 3-Methyltetrahydrofuran | 220 | 80 | 370 | 15 | >300 | 95 |
| Sulfolane | 300 | 95 | 430 | 5 | >1,000 | 100 |
| 3-Methylsulfolane | 280 | 85 | 400 | 10 | >500 | 97 |
| 2-Methylsulfolane | 260 | 80 | 400 | 10 | >500 | 97 |
| 3-Ethylsulfolane | 250 | 85 | 390 | 15 | >300 | 95 |
| 2-Ethylsulfolane | 250 | 85 | 390 | 15 | >300 | 95 |

Example 14

Example 9 was repeated except for using $LiMn_2O_4$ instead of $LiCoO_2$ as a positive electrode material, to prepare 21 types of batteries according to the present invention. The batteries thus prepared were discharged at 100 mA and then tested for the same items as those in Example 9. The results are also shown in Table 12.

TABLE 12

| (+) $LiMn_2O_2$/(−) graphite | Graphite characteristics | | Battery characteristics | | | |
|---|---|---|---|---|---|---|
| Single solvent shown below shown below = 1:1 | Capacity per unit weight | Initial charge-discharge efficiency | Capacity | Self-discharge rate | Cycle life | Charge-discharge efficieny |
| Ethylene carbonate | 350 | 95 | 580 | 5 | >1,000 | 100 |
| Propylene carbonate | 230 | 60 | 400 | 25 | >500 | 97 |
| 1,2-Butylene carbonate | 270 | 65 | 340 | 20 | >300 | 95 |
| 2,3-Butylene carbonate | 200 | 60 | 380 | 25 | >300 | 95 |
| Ethylene thiocarbonate | 190 | 80 | 330 | 10 | >300 | 95 |
| γ-Thiobutyrolactone | 200 | 85 | 380 | 10 | >300 | 95 |
| α-pyrrolidone | 180 | 75 | 360 | 10 | >300 | 95 |
| γ-butyrolactone | 320 | 95 | 480 | 5 | >1,000 | 100 |
| γ-valerolactone | 230 | 90 | 340 | 10 | >500 | 97 |
| γ-ethyl-γ-butyrolactone | 190 | 85 | 360 | 10 | >500 | 97 |
| β-methyl-γ-butyrolactone | 170 | 80 | 360 | 10 | >300 | 95 |
| Thiolane | 200 | 80 | 380 | 15 | >300 | 95 |
| Pyrazolidine | 190 | 80 | 360 | 15 | >50Q | 97 |
| Pyrrolidine | 180 | 85 | 360 | 10 | >300 | 95 |
| Tetrahydrofuran | 230 | 90 | 400 | 10 | >500 | 97 |
| 3-Methyltetrahydrofuran | 220 | 80 | 400 | 15 | >300 | 95 |
| Sulfolane | 300 | 95 | 460 | 5 | >1,000 | 100 |
| 3-Methylsulfolane | 280 | 85 | 420 | 10 | >500 | 97 |
| 2-Methylsulfolane | 260 | 80 | 430 | 10 | >500 | 97 |
| 3-Ethylsulfolane | 250 | 85 | 425 | 15 | >300 | 95 |
| 2-Ethylsulfolane | 250 | 85 | 425 | 15 | >300 | 95 |

Example 15

Example 1-1 was repeated except for using electrolyte solutions of a 1 mole/liter $LiPF_6$ solution in each of mixed solvents as shown in Table 13, to prepare 5 types of batteries according to the present invention. The batteries thus prepared were discharged at 1 A and then tested for the same

TABLE 13

| (+) LiCoO$_2$/(−) graphite | Graphite characteristics | | Battery characteristics | | | |
|---|---|---|---|---|---|---|
| Ethylene carbonate:solvent shown below = 1:1 | Capacity per unit weight | Initial charge-discharge efficiency | Capacity | Self-discharge rate | Cycle life | Charge-discharge efficieny |
| Dimethyl carbonate | 330 | 95 | 550 | 5 | >1,000 | 100 |
| Diethyl carbonate | 310 | 95 | 530 | 5 | >1,000 | 100 |
| 1,2-Dimethoxyethane | 330 | 95 | 550 | 10 | >300 | 95 |
| 1,2-Diethoxyethane | 310 | 95 | 530 | 10 | >300 | 95 |
| Ethoxymethdxyethane | 310 | 95 | 530 | 10 | >300 | 95 |

Example 16

Example 1-1 was repeated except for using electrolyte solutions of a 1 mole/liter LiPF$_6$ solution in each of the mixed solvents as shown in Table 14, to prepare 5 types of batteries according to the present invention. The batteries thus prepared were discharged at 1 A and then tested for the same items as those in Example 9. The results are also shown in Table 14.

TABLE 14

| (+) LiCoO$_2$/(−) graphite | Graphite characteristics | | Battery characteristics | | | |
|---|---|---|---|---|---|---|
| Sulfolane:solvent shown below = 1:1 | Capacity per unit weight | Initial charge-discharge efficiency | Capacity | Self-discharge rate | Cycle life | Charge-discharge efficieny |
| Dimethyl carbonate | 240 | 95 | 430 | 5 | >1,000 | 100 |
| Diethyl carbonate | 200 | 95 | 400 | 5 | >1,000 | 100 |
| 1,2-Dimethoxyethane | 240 | 95 | 430 | 10 | >300 | 95 |
| 1,2-Diethoxyethane | 200 | 95 | 400 | 10 | >300 | 95 |
| Ethoxymethoxyethane | 200 | 95 | 400 | 10 | >300 | 95 |

Example 17

Example 1-1 was repeated except for using, instead of LiPF$_6$, each of the electrolyte solutes as shown in Table 15, to prepare 6 types of batteries according to the present invention. The batteries thus prepared were discharged at 100 mA and then tested for the same items as those in Example 9. The results are also shown in Table 15.

Tables 7 through 15 shows that the batteries of the present invention develop better battery characteristics over all the items tested than those of the conventional battery.

TABLE 15

| (+) LiCoO$_2$/(−) graphite | Graphite characteristics | | Battery characteristics | | | |
|---|---|---|---|---|---|---|
| Ethylene carbonate: dimethyl carbonate = 1:1; Solute: shown below | Capacity per unit weight | Initial charge-discharge efficiency | Capacity | Self-discharge rate | Cycle life | Charge-discharge efficiency |
| LiPF$_6$ | 350 | 95 | 600 | 5 | >1,000 | 100 |
| LiBF$_4$ | 350 | 95 | 600 | 5 | >1,000 | 100 |
| LiClO$_4$ | 350 | 95 | 660 | 5 | >1,000 | 100 |
| LiCF$_3$SO$_3$ | 350 | 95 | 66o | 5 | >1,000 | 100 |
| LiC$_4$F$_9$SO$_3$ | 350 | 95 | 600 | 5 | >1,000 | 100 |
| LiN(CF$_3$SO$_2$)$_2$ | 350 | 95 | 600 | 5 | >1,000 | 100 |
| LiAsF$_6$ | 350 | 95 | 600 | 5 | >1,000 | 100 |

Example 18

Example 1-1 was repeated except for using 11 electrolyte solutions of 1 mole/liter of LiPF$_6$ in each of mixed solvents of ethylene carbonate and γ-butyrolactone in mixing ratios by volume of 100:0, 90:10, 80:20, 70:30, 60:40, 50:50, 40:60, 30:70, 20:80, 10:90 and 0:100, respectively, to prepare 11 batteries. The batteries thus prepared were discharged at 100 mA and then tested for the relationship between the battery capacity and the mixing ratio by volume.

Figure 14:
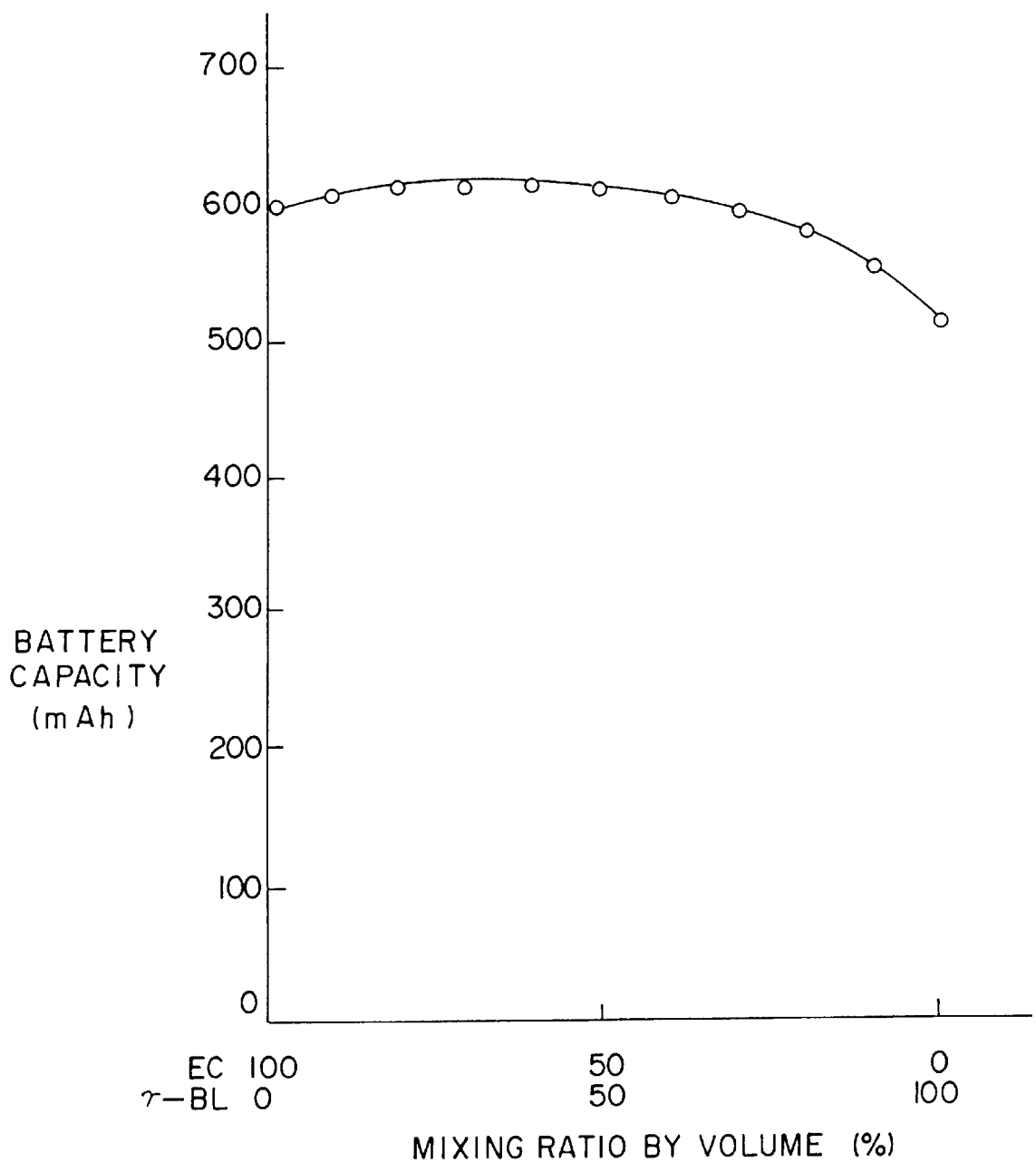
FIGS. 14 through 22 are graphs showing the relationships between the mixing ratio by volume of components in various mixed solvents and the battery capacity.

FIG. 14 is a graph with the coordinate representing the battery capacity (mAh) and the abscissa the mixing ratio by volume (% by volume). As is understood from the FIGURE, with discharge at 100 mA the use of a solvent containing at least 20% by volume of ethylene carbonate results in large battery capacity.

Example 19

Example 1-1 was repeated except for using 11 electrolyte solutions of 1 mole/liter of LiPF$_6$ in each of mixed solvents of ethylene carbonate, γ-butyrolactone and sulfolane in various mixing ratios by volume (% by volume) with the latter two being always mixed in the same amounts, to prepare 11 batteries. The batteries thus prepared were discharged at 100 mA and then tested for the relationship between the battery capacity and the mixing ratio by volume.

Figure 15:
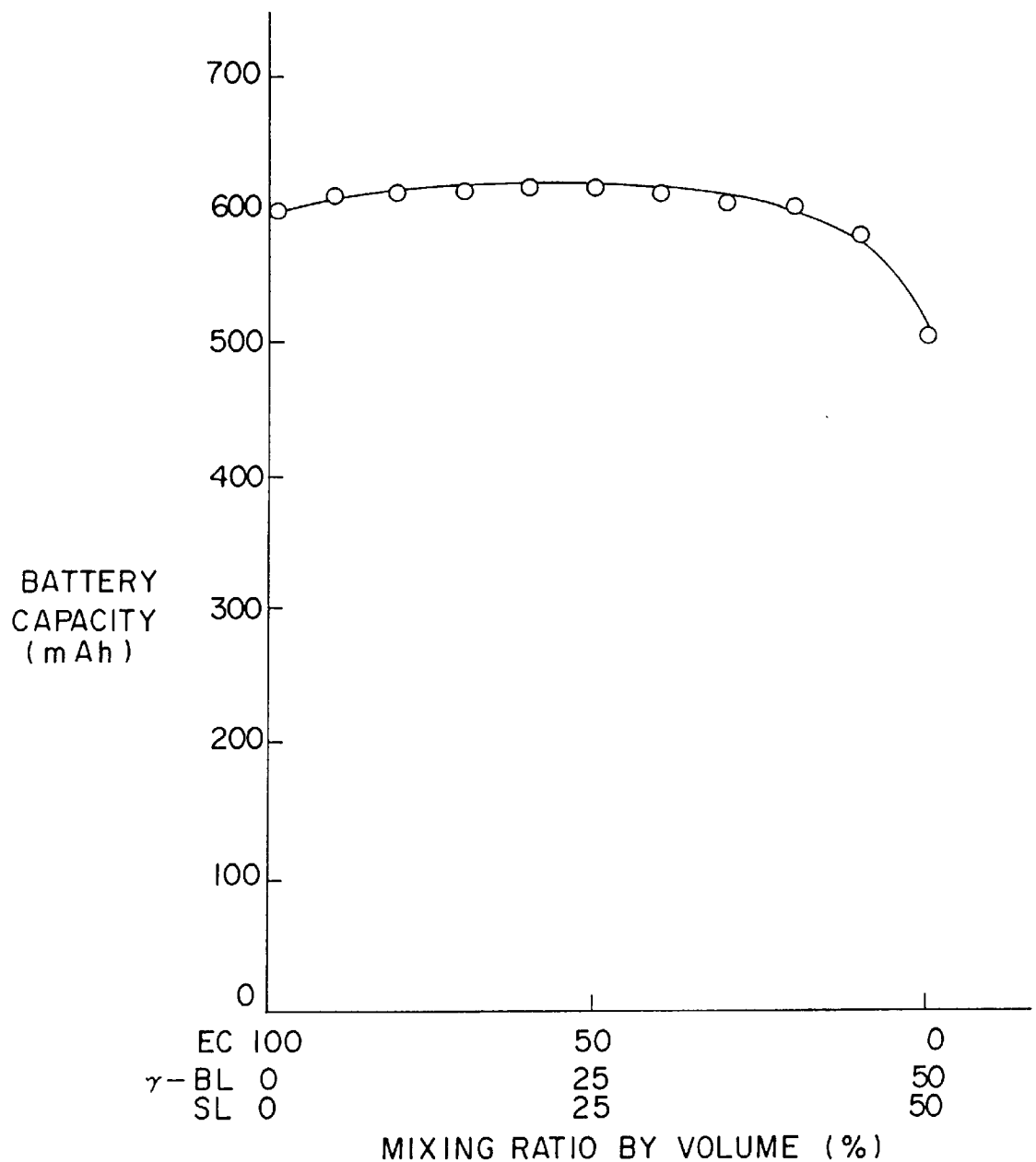

FIG. 15 is a graph with the coordinate representing the battery capacity (mAh) and the abscissa the mixing ratio by volume (% by volume). The FIGURE shows that, with discharge at 100 mA, the use of a solvent containing at least 20% by volume of ethylene carbonate results in large battery capacity.

Example 20

Example 1-1 was repeated except for using mixed solvents of tetrahydrofuran and dimethyl carbonate in various mixing ratios by volume (% by volume) and using $LiNiO_2$ instead of $LiCoO_2$ for the positive electrode, to prepare 11 batteries. The batteries thus prepared were discharged at 1 A and then tested for the relationship between the battery capacity and the mixing ratio by volume.

Figure 16:
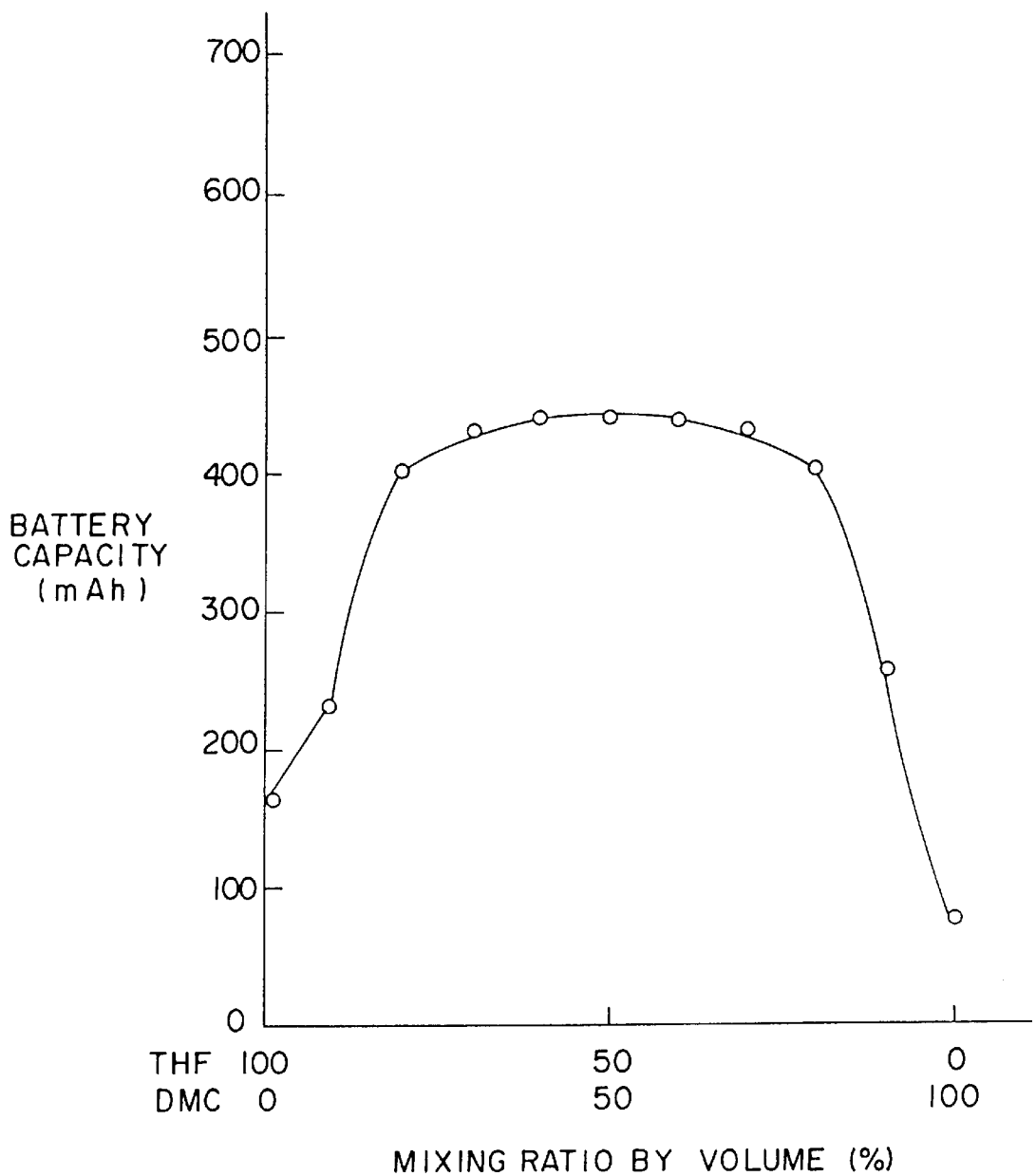

FIG. 16 is a graph with the coordinate representing the battery capacity (mAh) and the abscissa the mixing ratio by volume (% by volume). The FIGURE shows that, with discharge at 1 A, the use of a mixed solvent containing 20 to 80% by volume of tetrahydrofuran results in remarkably large discharge capacity.

Example 21

Example 1-1 was repeated except for using mixed solvents of sulfolane and diethyl carbonate in various mixing ratios (% by volume) and using $LiMn_2O_2$ instead of $LiCoO_2$ for the positive electrode, to prepare 11 batteries. The batteries thus prepared were discharged at 1 A and then tested for the relationship between the battery capacity and the mixing ratio by volume.

Figure 17:
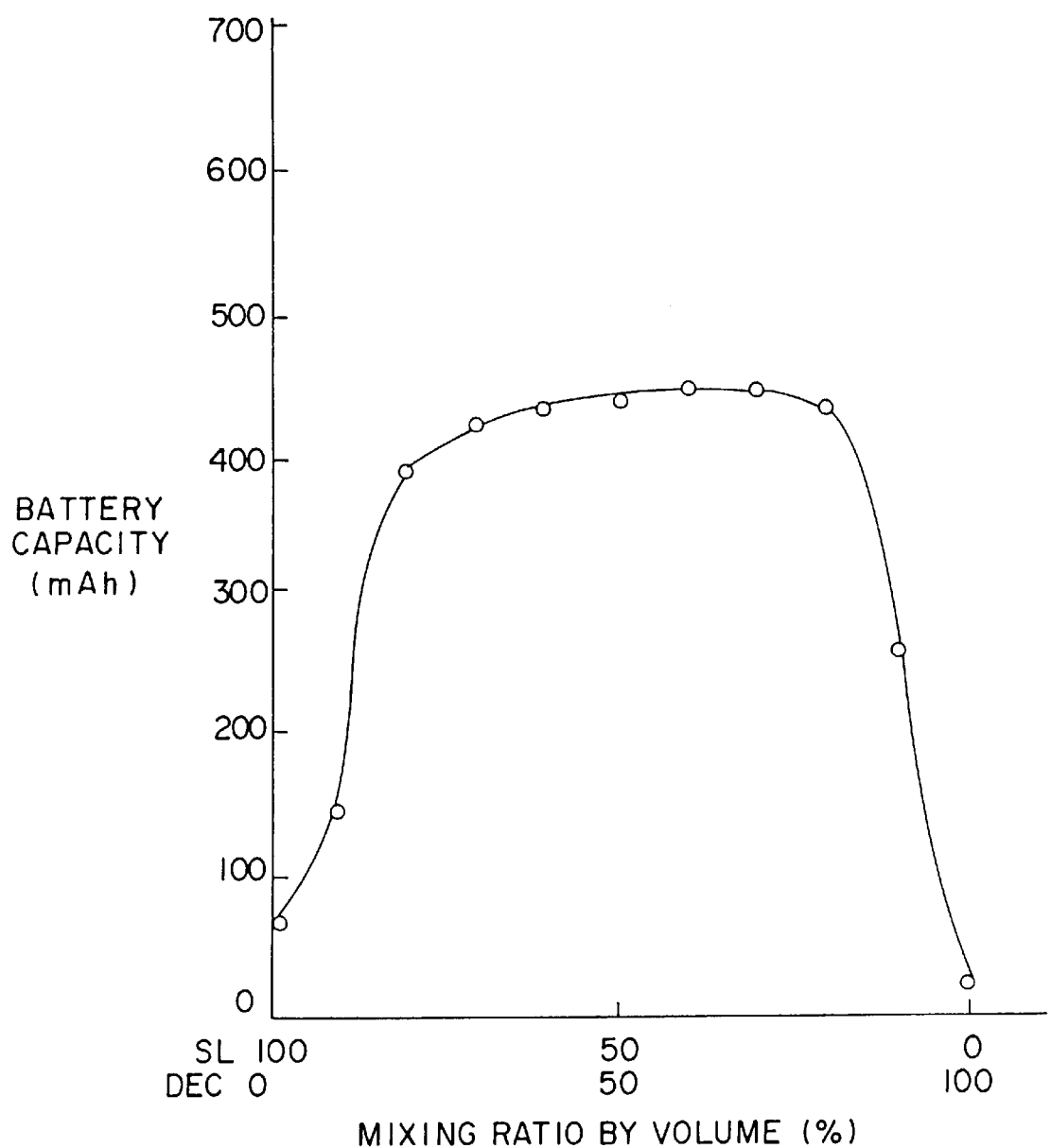

FIG. 17 is a graph with the coordinate representing the battery capacity (mAh) and the abscissa the mixing ratio by volume (% by volume). The FIGURE shows that, with discharge at 1 A, the use of a mixed solvent containing 20% to 80% by volume of sulfolane based on the volume of the solvent results in remarkably large discharge capacity.

Example 22

Example 1-1 was repeated except for using mixed solvents of ethylene carbonate, γ-butyrolactone and dimethyl carbonate in various mixing ratios by volume (% by volume) with the former two always being mixed in the same amounts, to prepare 11 batteries. The batteries thus prepared were discharged at 100 mA and then tested for the relationship between the battery capacity and the mixing ratio by volume.

Figure 18:
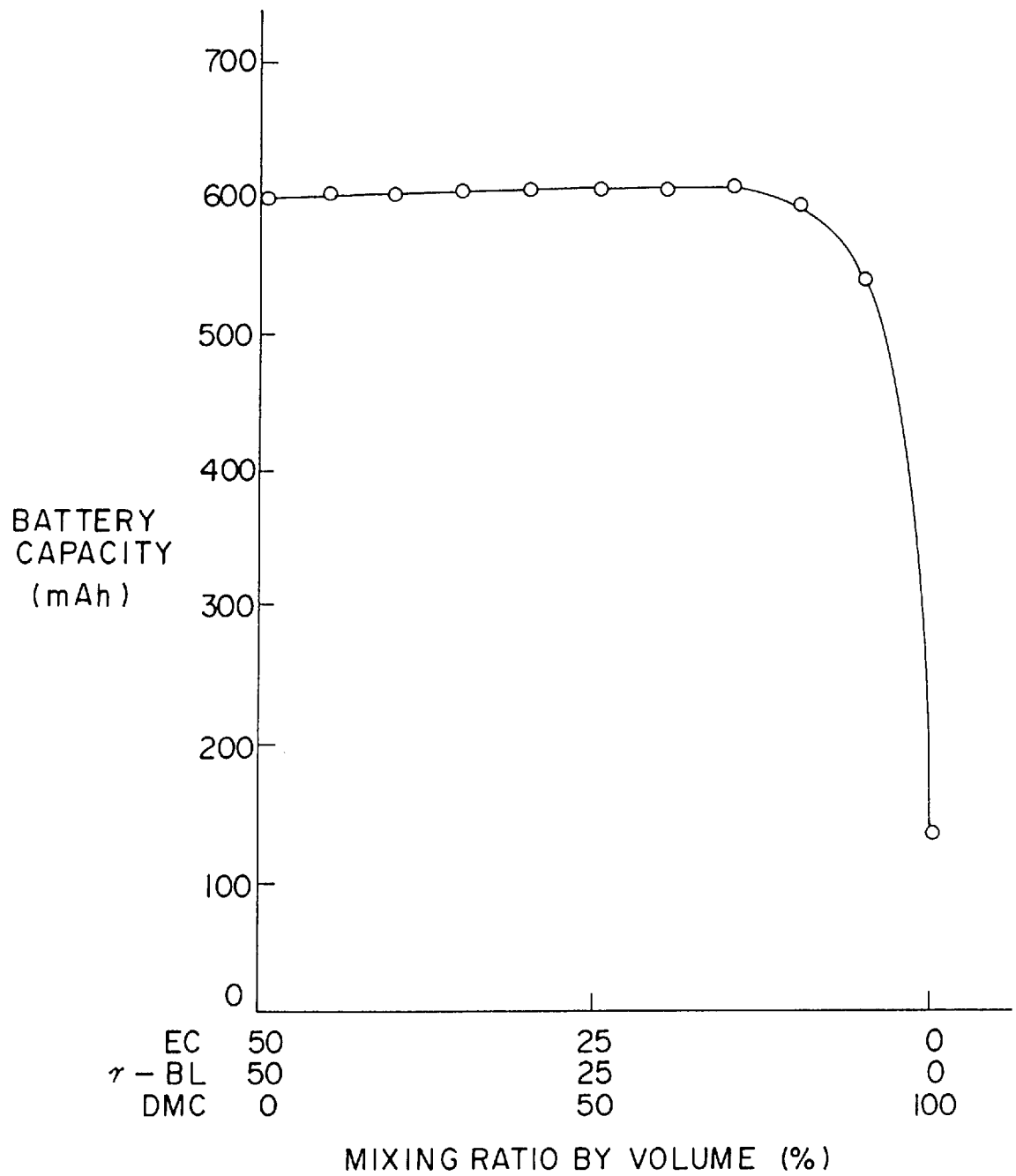

FIG. 18 is a graph with the coordinate representing the battery capacity (mAh) and the abscissa the mixing ratio by volume (% by volume). The FIGURE shows that, with discharge at 100 mA, the use of a solvent containing ethylene carbonate results in large battery capacity.

Example 23

Example 1-1 was repeated except for using mixed solvents of ethylene carbonate, γ-butyrolactone and diethyl carbonate in various mixing ratios by volume (% by volume based on the volume of the solvent) with the former two always being mixed in the same amounts, to prepare 11 batteries. The batteries thus prepared were discharged at 100 mA and then tested for the relationship between the battery capacity and the mixing ratio by volume.

Figure 19:
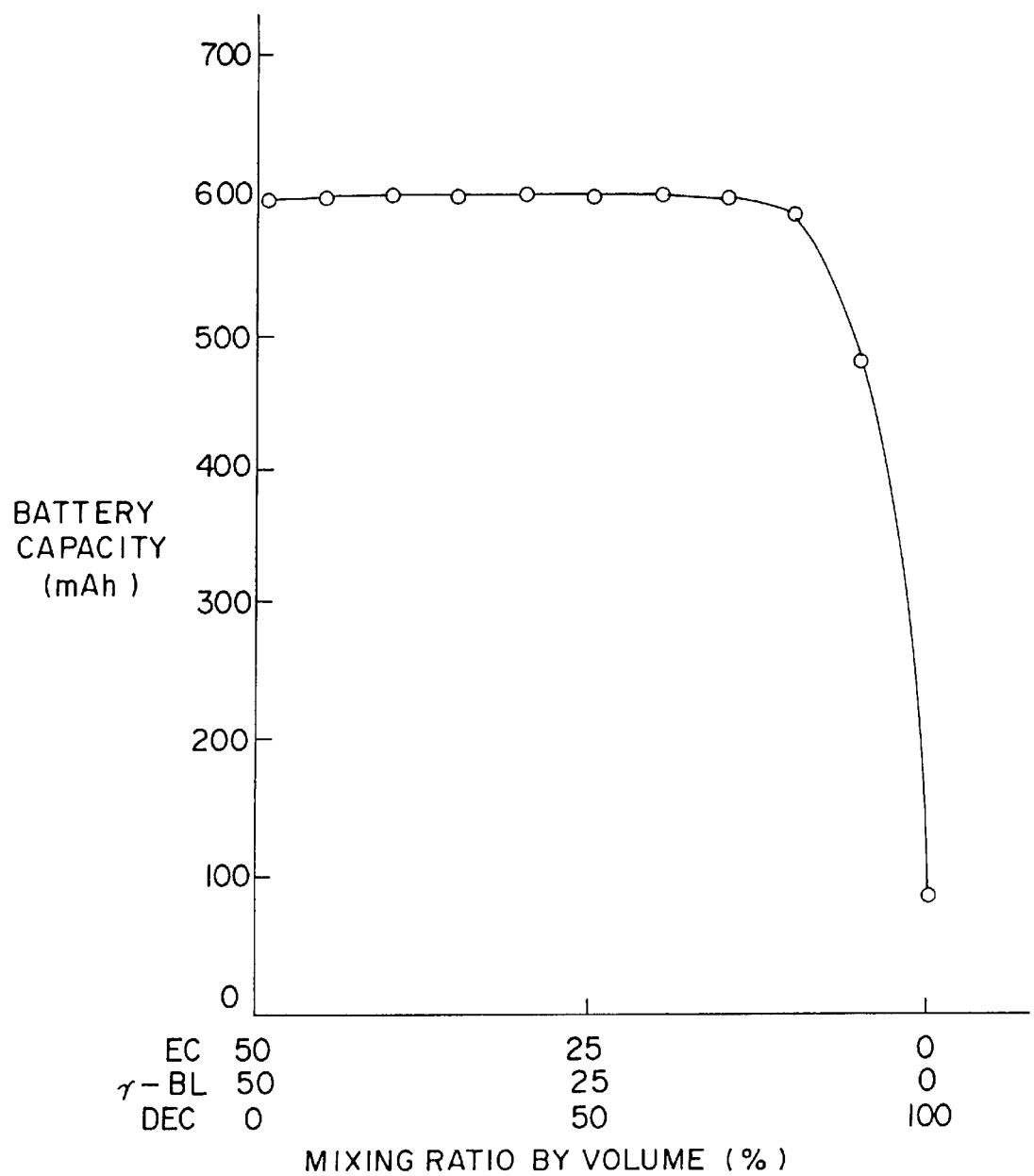

FIG. 19 is a graph with the coordinate representing the battery capacity (mAh) and the abscissa the mixing ratio by volume (% by volume). The FIGURE shows that, with discharge at 100 mA, the use of a solvent containing ethylene carbonate results in large battery capacity.

Example 24

Example 1-1 was repeated except for using mixed solvents of ethylene carbonate and dimethyl carbonate in various mixing ratios by volume (% by volume) and using $LiNiO_2$ instead of $LiCoO_2$ for the positive electrode, to prepare 11 batteries. The batteries thus prepared were discharged at 1 A and then tested for the relationship between the battery capacity and the mixing ratio by volume.

Figure 20:
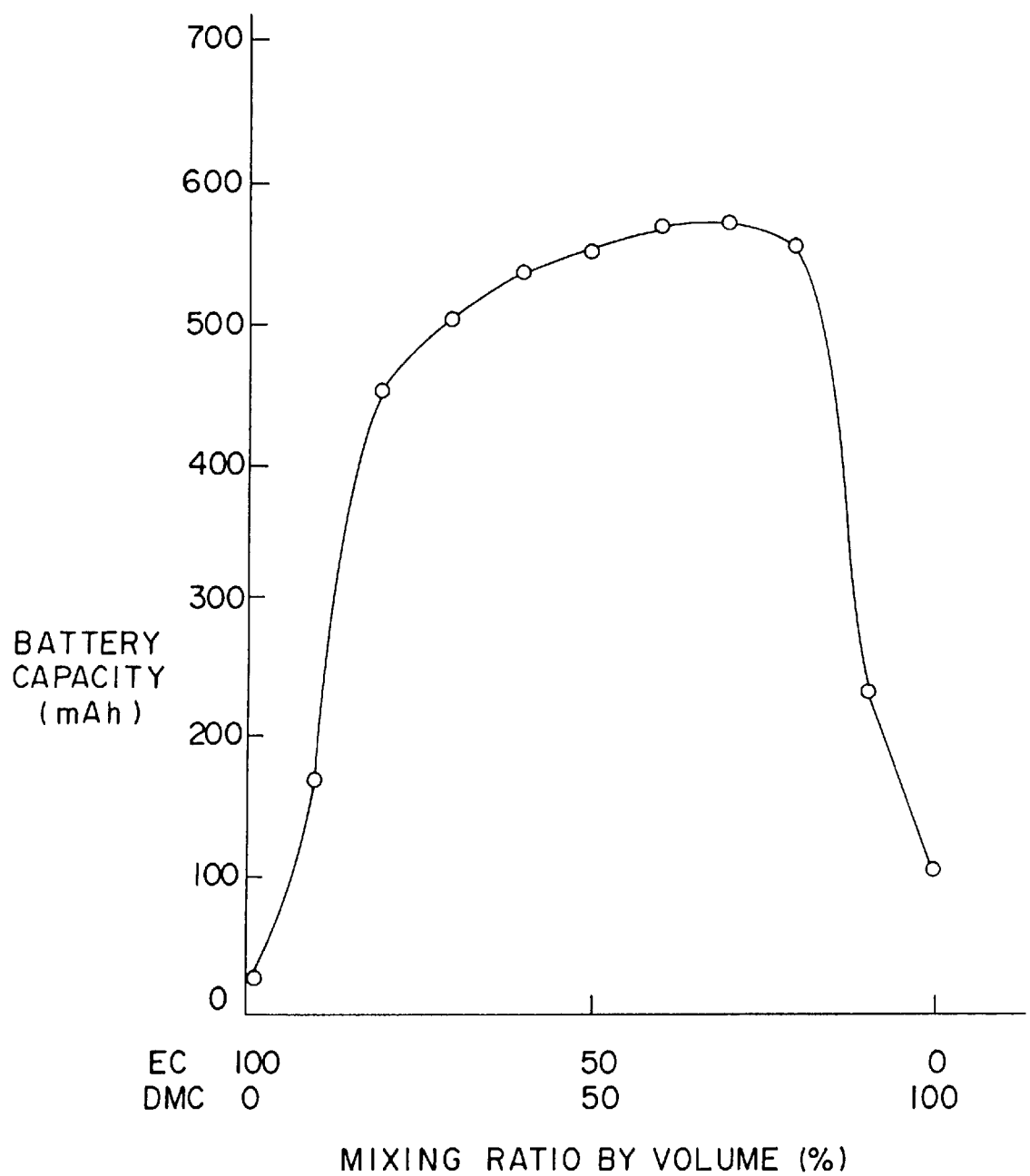

FIG. 20 is a graph with the coordinate representing the battery capacity (mAh) and the abscissa the mixing ratio by volume (% by volume). The FIGURE shows that, with discharge at 1 A, the use of a solvent containing 20 to 80% by volume of ethylene carbonate results in remarkably large battery capacity.

Example 25

Example 1-1 was repeated except for changing the mixing ratio by volume (% by volume) of ethylene carbonate and diethyl carbonate, to prepare 11 batteries. The batteries thus prepared were discharged at 1 A and then tested for the relationship between the battery capacity and the mixing ratio by volume.

Figure 21:
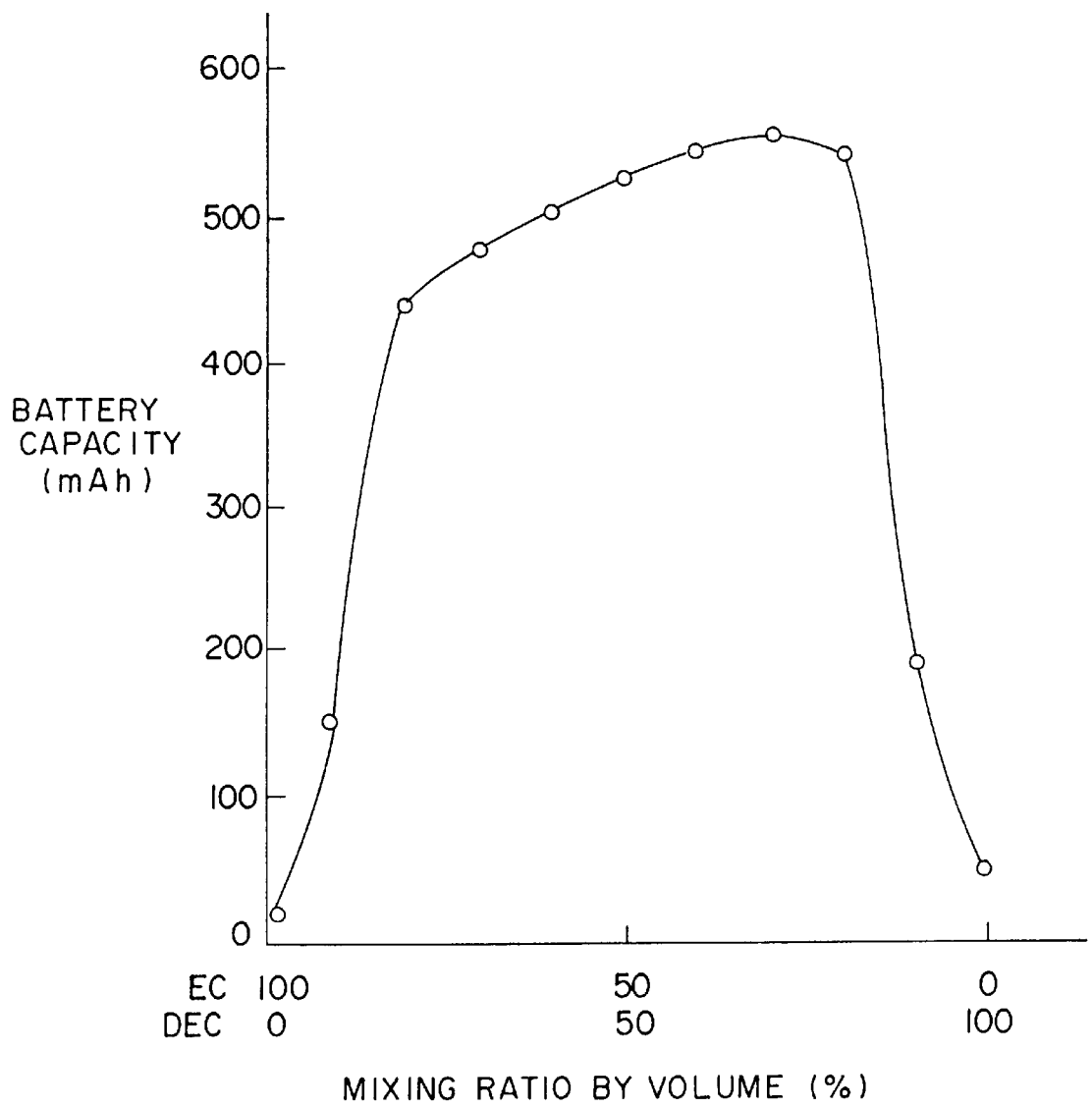

FIG. 21 is a graph with the coordinate representing the battery capacity (mAh) and the abscissa the mixing ratio by volume (% by volume). The FIGURE shows that, with discharge at 1 A, the use of a solvent containing 20 to 80% by volume of ethylene carbonate results in remarkably large battery capacity.

Example 26

Example 1-1 was repeated except for using mixed solvents of ethylene carbonate, dimethyl carbonate and diethyl carbonate in various mixing ratios (% by volume) with the latter two always being mixed in the same amounts and using $LiMn_2O_4$ instead of $LiCoO_2$ for the positive electrode, to prepare 11 batteries. The batteries thus prepared were discharged at 1 A and then tested for the relationship between the battery capacity and the mixing ratio by volume.

Figure 22:
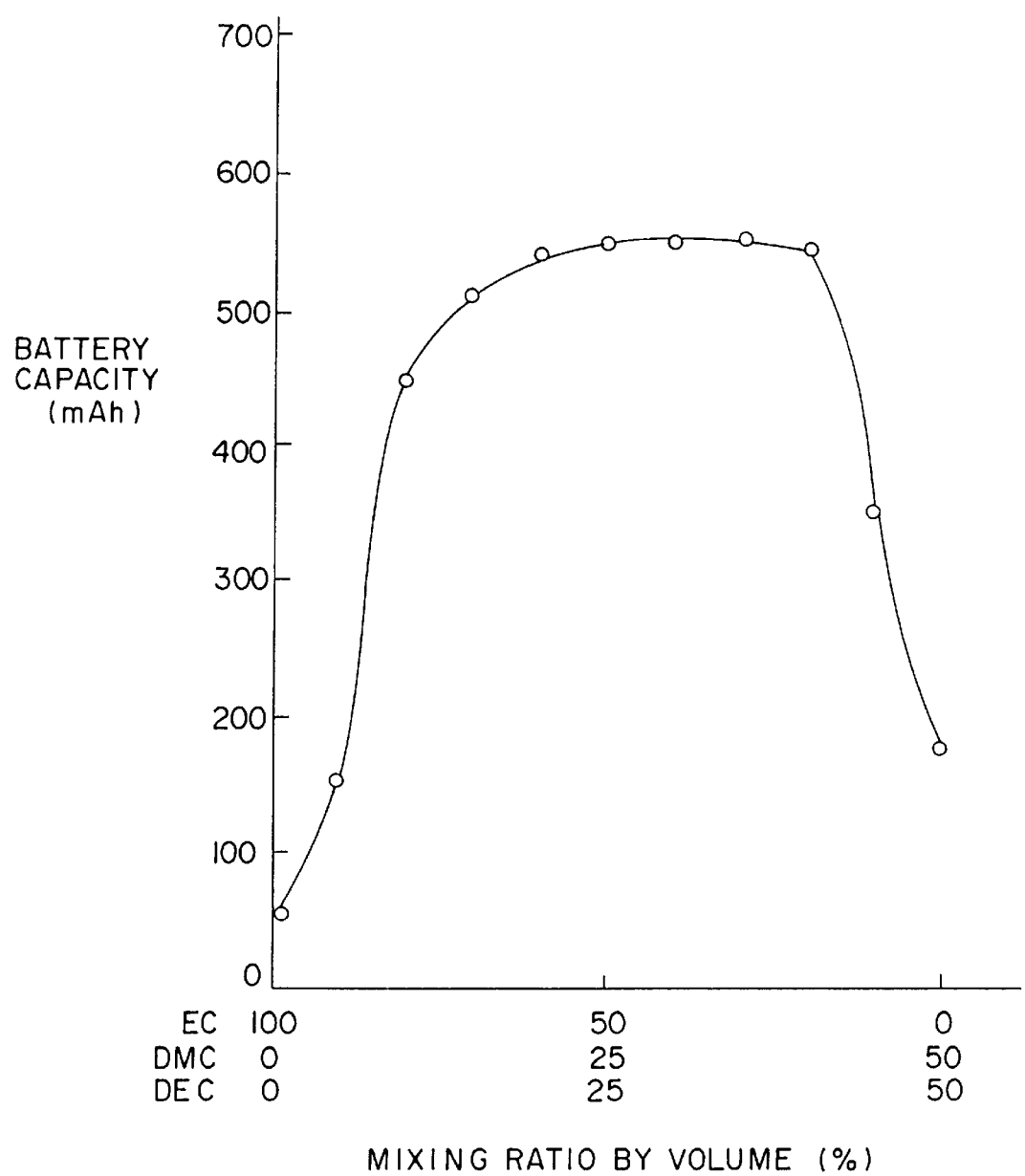
Figure 23:
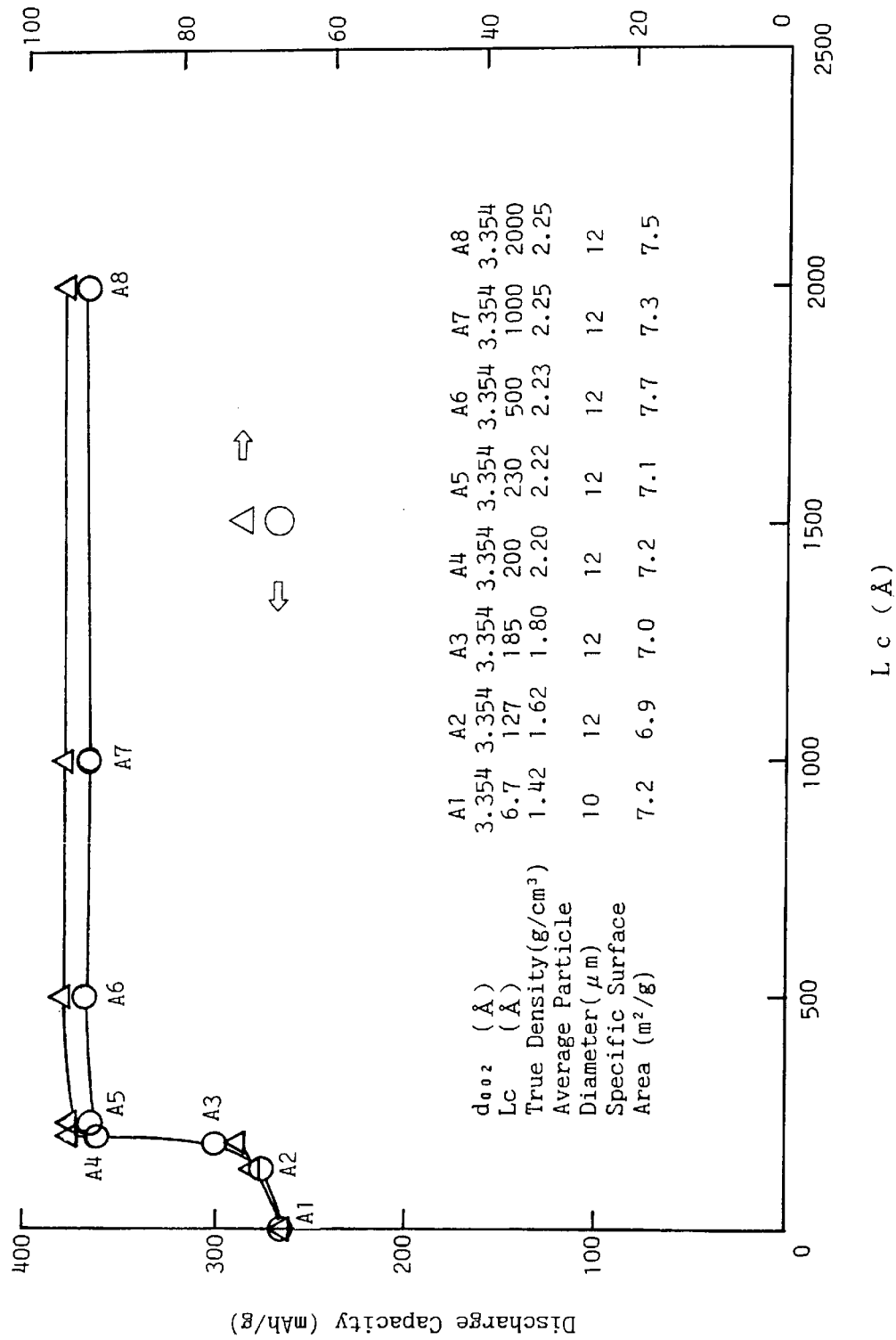
FIG. 23 is a graph showing the relationship between the Lc value of each of the graphites having a d-value of less than 3.355 and the discharge capacity and initial charge-discharge efficiency.
Figure 24:
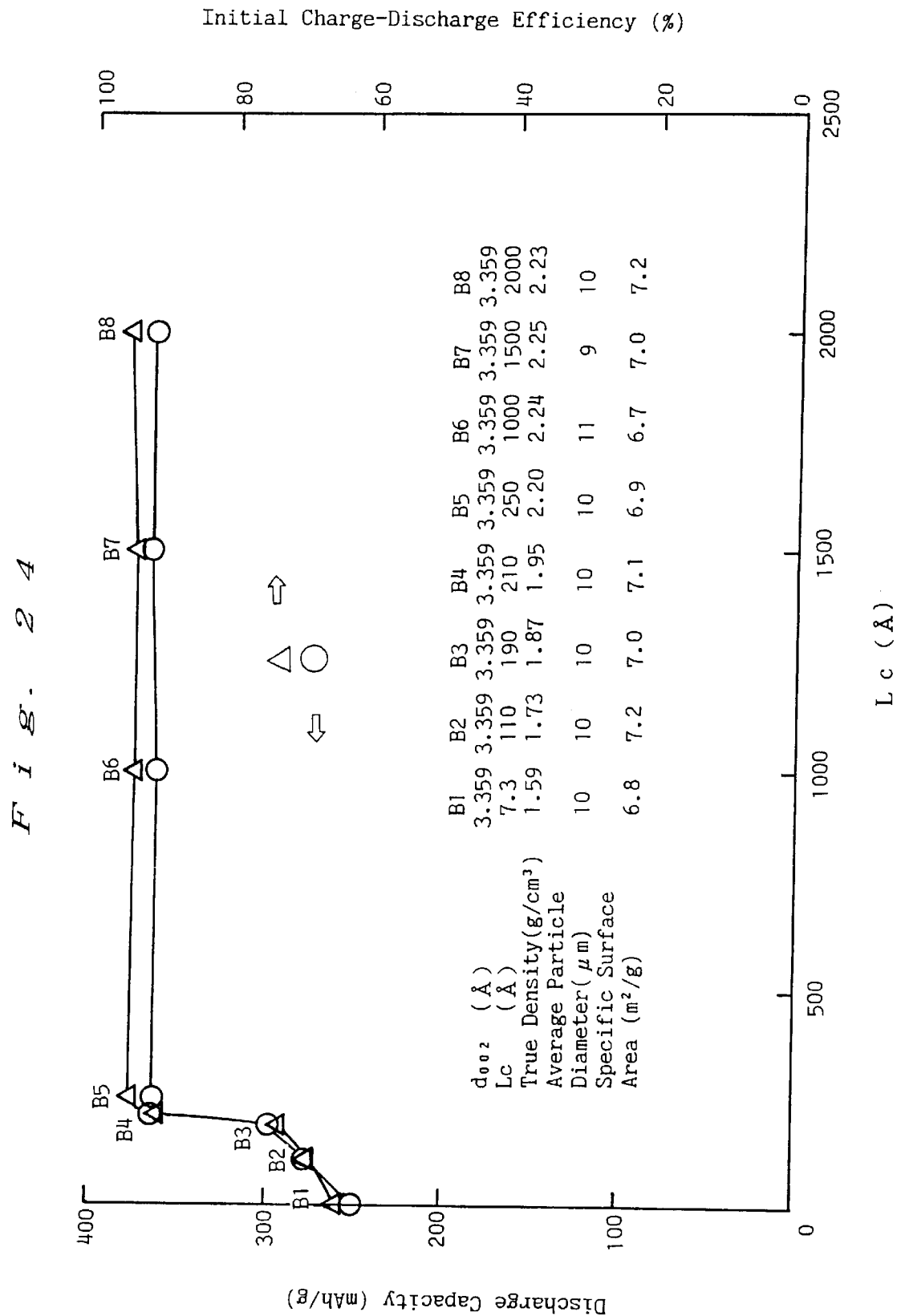
FIG. 24 is a graph showing the relationship between the Lc value of each of the graphites having a d-value of 3.355 or more and less than 3.360 and the discharge capacity and initial charge-discharge efficiency.
Figure 25:
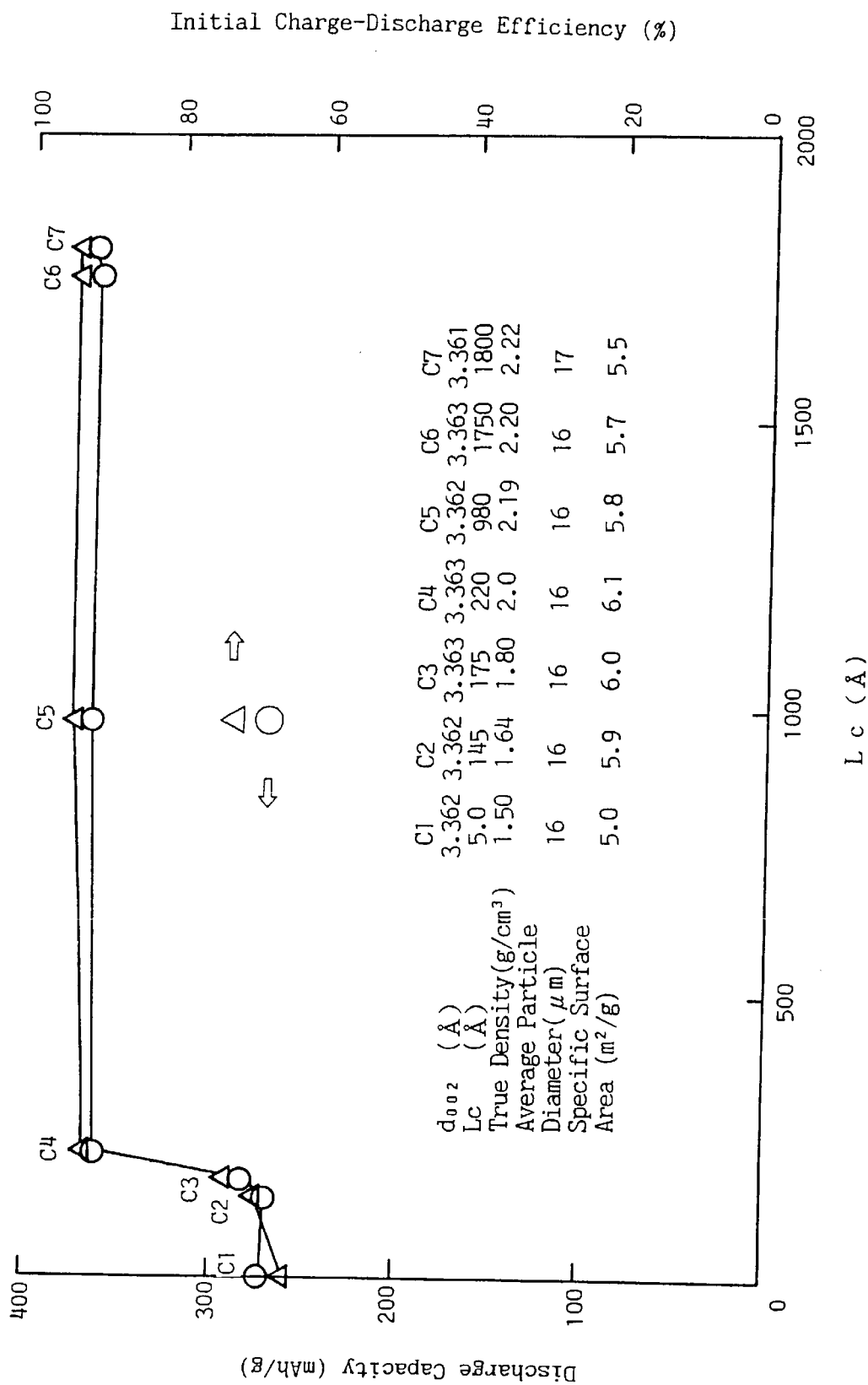
FIG. 25 is a graph showing the relationship between the Lc value of each of the graphites having a d-value of 3.360 or more and less than 3.365 and the discharge capacity and initial charge-discharge efficiency.
Figure 26:
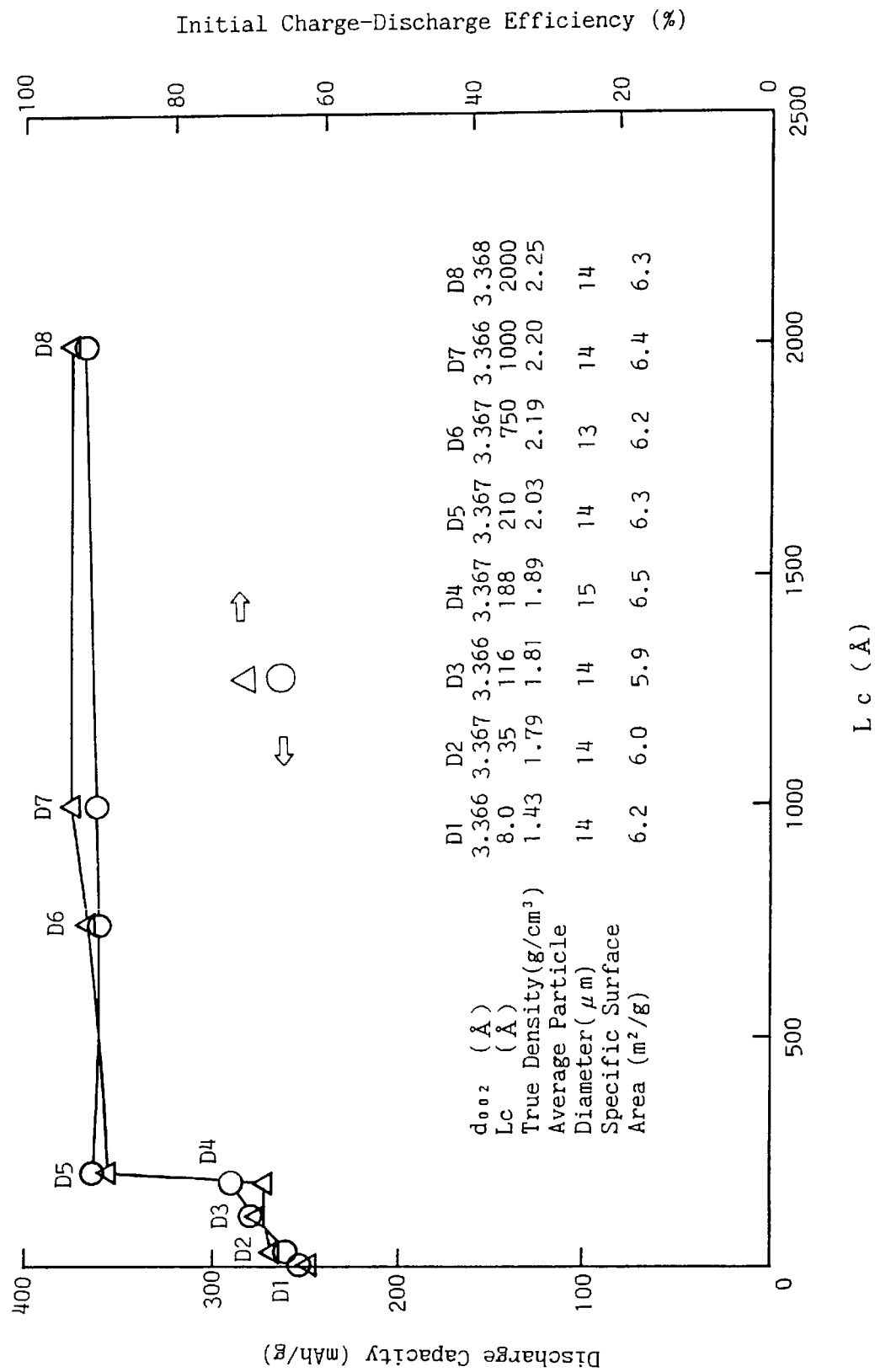
FIG. 26 is a graph showing the relationship between the Lc value of each of the graphites having a d-value of 3.365 or more and less than 3.370 and the discharge capacity and initial charge-discharge efficiency.
Figure 27:
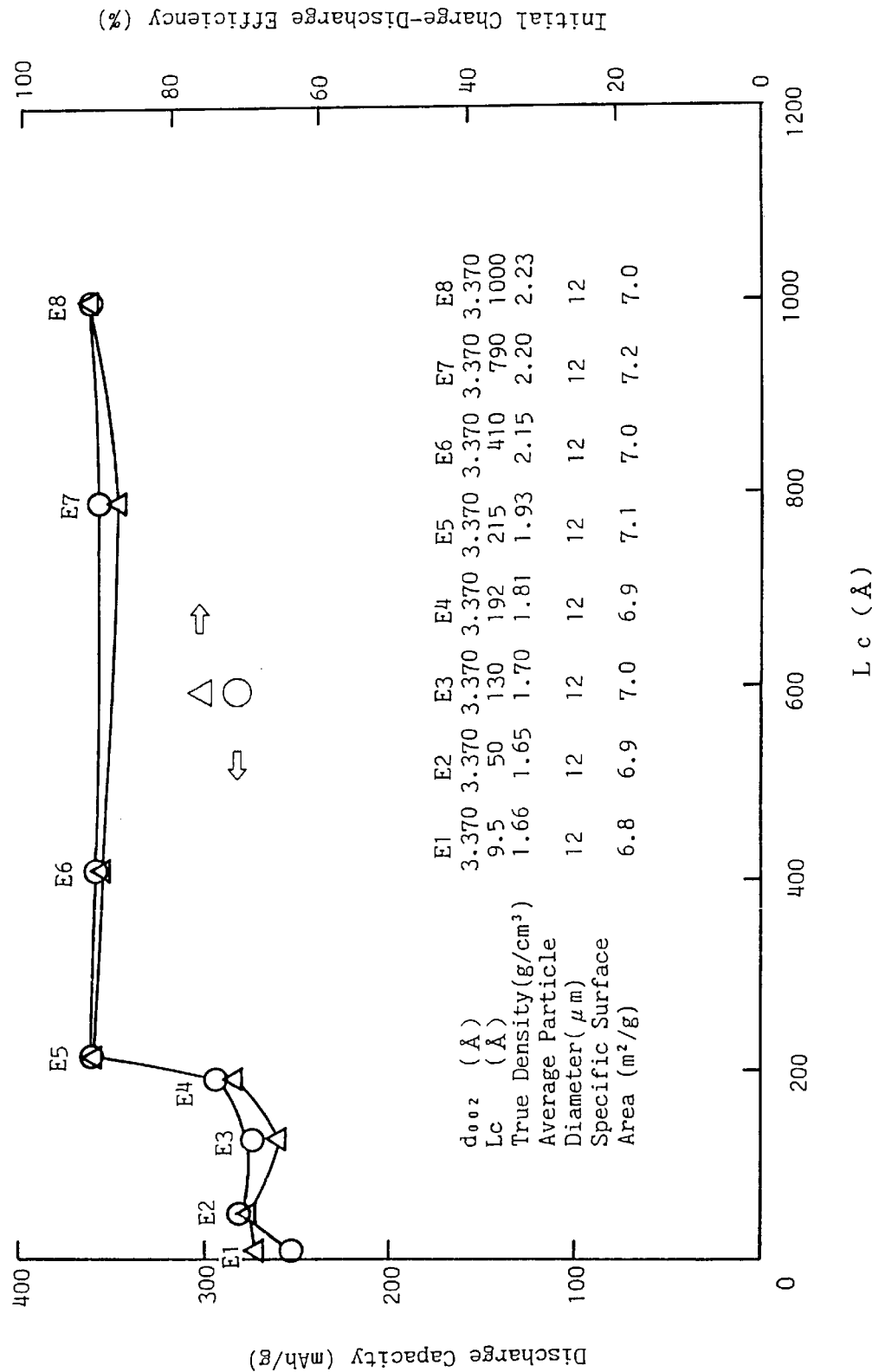
FIG. 27 is a graph showing the relationship between the Lc value of each of the graphites having a d-value of 3.370 and the discharge capacity and initial charge-discharge efficiency.
Figure 28:
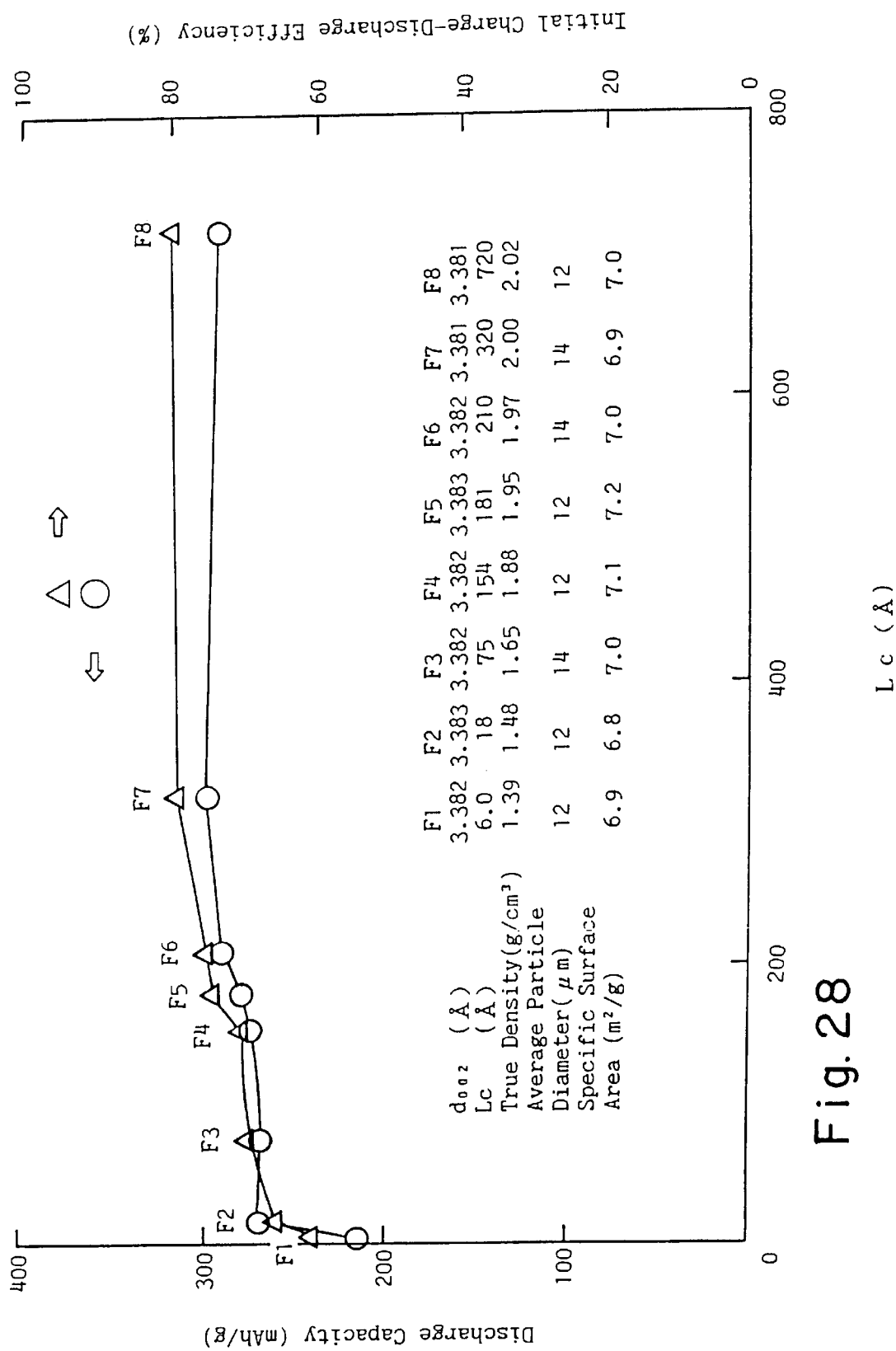
FIG. 28 is a graph showing the relationship between the Lc value of each of the graphites having a d-value of 3.380 or more and less than 3.385 and the discharge capacity and initial charge-discharge efficiency.
Figure 29:
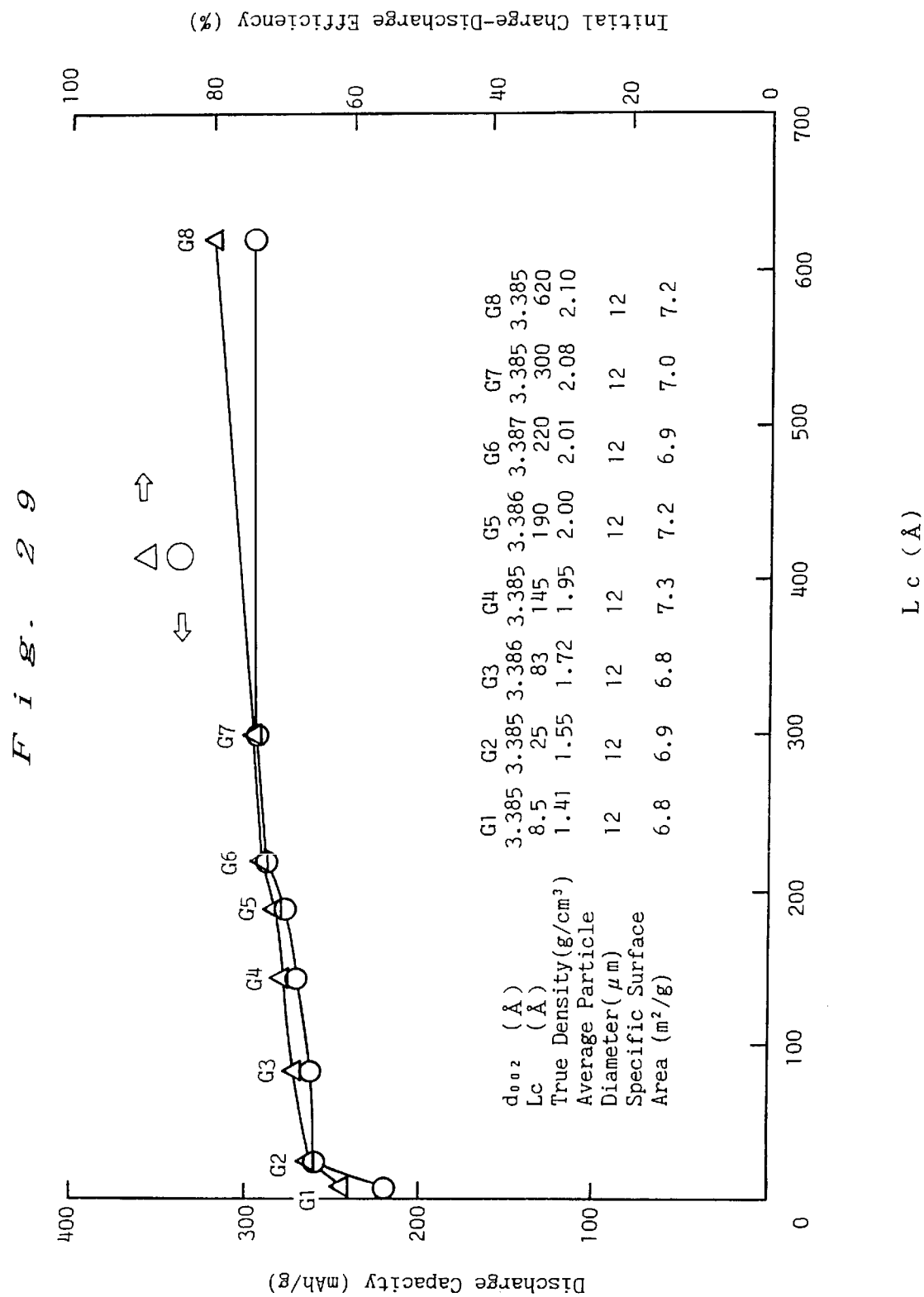
FIG. 29 is a graph showing the relationship between the Lc value of each of the graphites having a d-value of 3.385 or more and less than 3.390 and the discharge capacity and initial charge-discharge efficiency.
Figure 30:
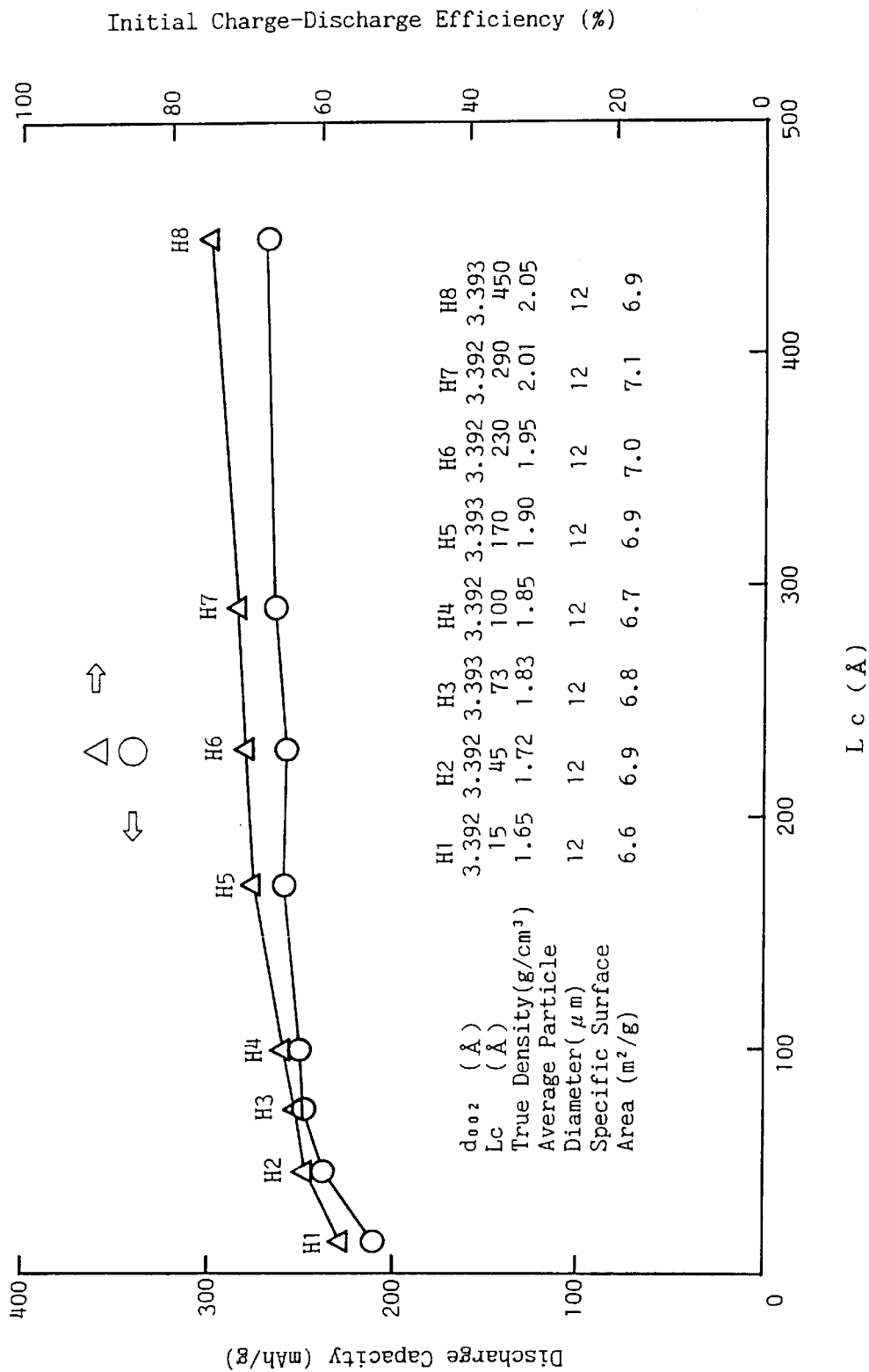
FIG. 30 is a graph showing the relationship between the Lc value of each of the graphites having a d-value of 3.390 or more and less than 3.395 and the discharge capacity and initial charge-discharge efficiency.
Figure 31:
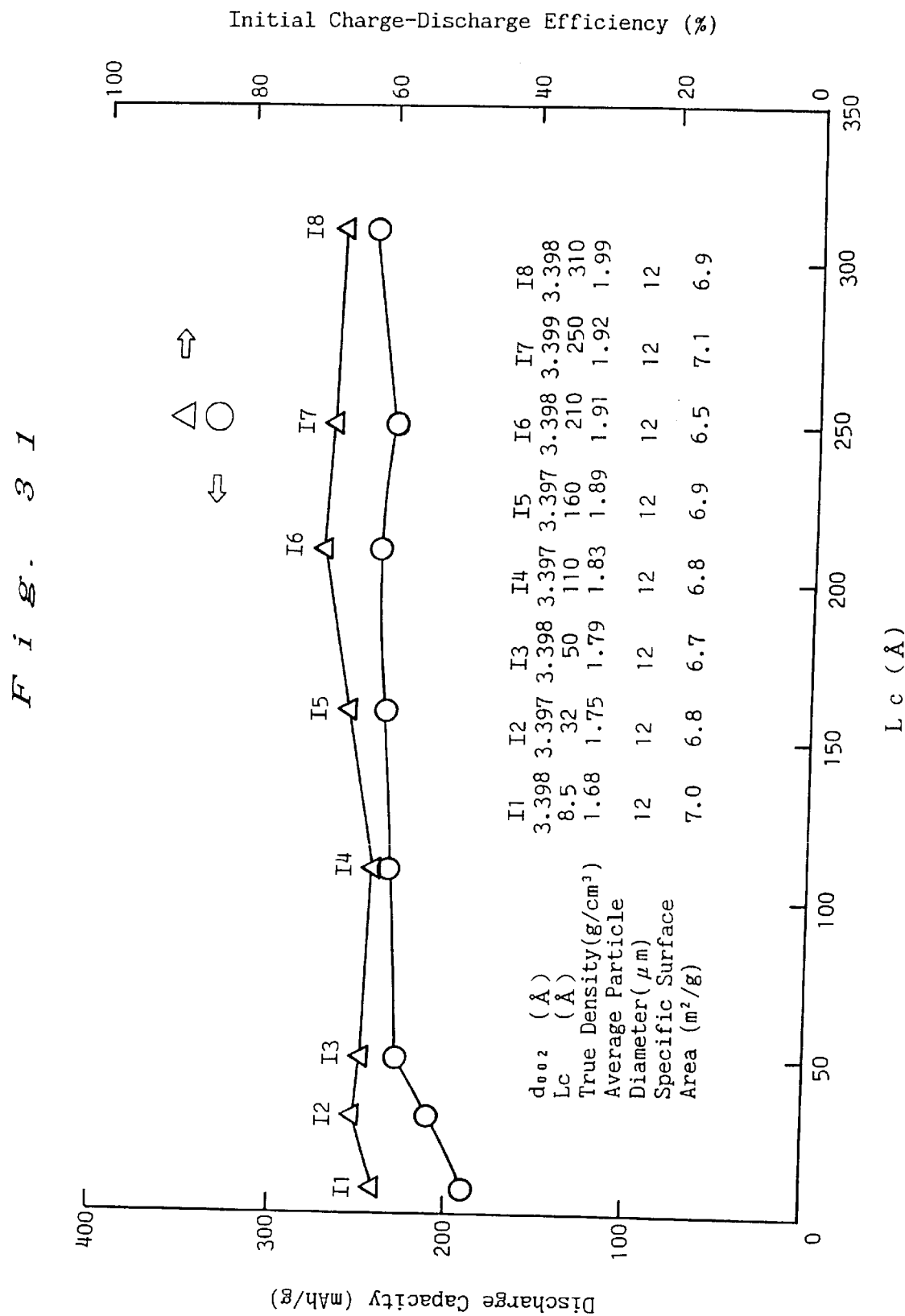
FIG. 31 is a graph showing the relationship between the Lc value of each of the graphites having a d-value of 3.395 or more and less than 3.400 and the discharge capacity and initial charge-discharge efficiency.

FIG. 22 is a graph with the coordinate representing the battery capacity (mAh) and the abscissa the mixing ratio by volume (% by volume). The FIGURE shows that, with discharge at 1 A, the use of a solvent containing 20 to 80% by volume of ethylene carbonate results in remarkably large battery capacity.

Additional Example 1

In this Example, various graphite samples to be used as a negative electrode and having d-values very close to each other were used, and the relationship between the Lc and the discharge capacity per unit weight (mAh/g) or the initial charge-discharge efficiency (%) of graphites was studied. A lithium metal plate was used as a positive electrode and a electrolyte solution of 1 mole /liter $LiPF_6$ in a mixed solvent by the volume mixing ratio of 4:6 of ethylene carbonate and dimethyl carbonate was used as an electrolyte solution. The initial charge-discharge efficiency herein was calculated by a calculation formula: [(discharge capacity at the first cycle)/(charge capacity at the first cycle)]×100. The results are shown in FIGS. 23 through 31, which used graphites having the following properties in Tables 16 through 24.

TABLE 16

|  | A1 | A2 | A3 | A4 | A5 | A6 | A7 | A8 |
|---|---|---|---|---|---|---|---|---|
| $d_{002}$ (Å) | 3.354 | 3.354 | 3.354 | 3.354 | 3.354 | 3.354 | 3.354 | 3.354 |
| Lc (Å) | 6.7 | 127 | 85 | 200 | 230 | 500 | 1000 | 2000 |
| True Density (g/cm$^3$) | 1.42 | 1.62 | 1.80 | 2.20 | 2.22 | 2.23 | 2.25 | 2.25 |
| Average Particle Diameter (μm) | 10 | 12 | 12 | 2 | 12 | 12 | 12 | 12 |
| Specific Surface Area (m$^2$/g) | 7.2 | 6.9 | 7.0 | 7.2 | 7.1 | 7.7 | 7.3 | 7.5 |

TABLE 17

|  | B1 | B2 | B3 | B4 | B5 | B6 | B7 | B8 |
|---|---|---|---|---|---|---|---|---|
| $d_{002}$ (Å) | 3.359 | 3.359 | 3.359 | 3.359 | 3.359 | 3.359 | 3.359 | 3.359 |
| Lc (Å) | 7.3 | 110 | 190 | 210 | 250 | 1000 | 1500 | 2000 |
| True Density (g/cm$^3$) | 1.59 | 1.73 | 1.871 | 1.95 | 2.20 | 2.24 | 2.25 | 2.23 |
| Average Particle Diameter (μm) | 10 | 10 | 10 | 10 | 10 | 11 | 9 | 10 |
| Specific Surface Area (m$^2$/g) | 6.8 | 7.2 | 7.0 | 7.1 | 6.9 | 6.7 | 7.0 | 7.2 |

TABLE 18

|  | C1 | C2 | C3 | C4 | C5 | C6 | C7 |
|---|---|---|---|---|---|---|---|
| $d_{002}$ (Å) | 3.362 | 3.362 | 3.363 | 3.363 | 3.362 | 3.363 | 3.361 |
| Lc (Å) | 5.0 | 145 | 175 | 220 | 980 | 1750 | 1800 |
| True Density (g/cm$^3$) | 1.50 | 1.64 | 1.80 | 2.0 | 2.19 | 2.20 | 2.22 |
| Average Particle Diameter (μm) | 16 | 16 | 16 | 16 | 16 | 16 | 17 |
| Specific Surface Area (m$^2$/g) | 5.0 | 5.9 | 6.0 | 6.1 | 5.8 | 5.7 | 5.5 |

TABLE 19

|  | D1 | D2 | D3 | D4 | D5 | D6 | D7 | D8 |
|---|---|---|---|---|---|---|---|---|
| $d_{002}$ (Å) | 3.366 | 3.367 | 3.366 | 3.367 | 3.367 | 3.367 | 3.366 | 3.368 |
| Lc (Å) | 8.0 | 35 | 116 | 188 | 210 | 750 | 1000 | 2000 |
| True Density (g/cm$^3$) | 1.43 | 1.79 | 1.83 | 1.89 | 2.03 | 2.19 | 2.20 | 2.25 |
| Average Particle Diameter (μm) | 14 | 14 | 14 | 15 | 14 | 13 | 14 | 14 |
| Specific Surface Area (m$^2$/g) | 6.2 | 6.0 | 5.9 | 6.5 | 6.3 | 6.2 | 6.4 | 6.3 |

TABLE 20

|  | E1 | E2 | E3 | E4 | E5 | E6 | E7 | E8 |
|---|---|---|---|---|---|---|---|---|
| $d_{002}$ (Å) | 3.370 | 3.370 | 3.370 | 3.370 | 3.370 | 3.370 | 3.370 | 3.370 |
| Lc (Å) | 9.5 | 50 | 130 | 192 | 215 | 410 | 790 | 1000 |
| True Density (g/cm$^3$) | 1.66 | 1.65 | 1.70 | 1.81 | 1.93 | 2.15 | 2.20 | 2.23 |
| Average Particle Diameter (μm) | 12 | 12 | 12 | 12 | 12 | 12 | 12 | 12 |
| Specific Surface Area (m$^2$/g) | 6.8 | 6.9 | 7.0 | 6.9 | 7.1 | 7.0 | 7.2 | 7.0 |

TABLE 21

|  | F1 | F2 | F3 | F4 | F5 | F6 | F7 | F8 |
|---|---|---|---|---|---|---|---|---|
| $d_{002}$ (Å) | 3.382 | 3.383 | 3.382 | 3.382 | 3.383 | 3.382 | 3.381 | 3.381 |
| Lc (Å) | 6.0 | 18 | 75 | 154 | 181 | 210 | 320 | 720 |
| True Density (g/cm$^3$) | 1.39 | 1.48 | 1.65 | 1.88 | 1.95 | 1.97 | 2.00 | 2.02 |
| Average Particle Diameter (μm) | 12 | 12 | 14 | 12 | 12 | 14 | 14 | 12 |
| Specific Surface Area (m$^2$/g) | 6.9 | 6.8 | 7.0 | 7.1 | 7.2 | 7.0 | 6.9 | 7.0 |

TABLE 22

|  | G1 | G2 | G3 | G4 | G5 | G6 | G7 | G8 |
|---|---|---|---|---|---|---|---|---|
| $d_{002}$ (Å) | 3.385 | 3.385 | 3.386 | 3.385 | 3.386 | 3.387 | 3.385 | 3.385 |
| Lc (Å) | 8.5 | 25 | 83 | 145 | 190 | 220 | 300 | 620 |
| True Density (g/cm$^3$) | 1.41 | 1.44 | 1.72 | 1.95 | 2.00 | 2.0 | 2.08 | 2.10 |
| Average Particle Diameter (μm) | 12 | 12 | 12 | 12 | 12 | 12 | 12 | 12 |
| Specific Surface Area (m$^2$/g) | 6.8 | 6.9 | 6.8 | 7.3 | 7.2 | 6.9 | 7.0 | 7.2 |

TABLE 23

|  | H1 | H2 | H3 | H4 | H5 | H6 | H7 | H8 |
|---|---|---|---|---|---|---|---|---|
| $d_{002}$ (Å) | 3.392 | 3.392 | 3.393 | 3.392 | 3.393 | 3.392 | 3.392 | 3.393 |
| Lc (Å) | 15 | 45 | 73 | 100 | 170 | 230 | 290 | 450 |
| True Density (g/cm$^3$) | 1.65 | 1.72 | 1.83 | 1.85 | 1.90 | 1.95 | 2.01 | 2.05 |
| Average Particle Diameter (μm) | 12 | 12 | 12 | 12 | 12 | 12 | 12 | 12 |
| Specific Surface Area (m$^2$/g) | 6.6 | 6.9 | 6.8 | 6.7 | 6.9 | 7.0 | 7.1 | 6.9 |

TABLE 24

|  | I1 | I2 | I3 | I4 | I5 | I6 | I7 | I8 |
|---|---|---|---|---|---|---|---|---|
| $d_{002}$ (Å) | 3.398 | 3.397 | 3.398 | 3.397 | 3.397 | 3.398 | 3.399 | 3.398 |
| Lc (Å) | 8.5 | 32 | 50 | 110 | 160 | 210 | 250 | 310 |
| True Density (g/cm$^3$) | 1.68 | 1.75 | 1.79 | 1.83 | 1.89 | 1.91 | 1.92 | 1.99 |
| Average Particle Diameter (μm) | 12 | 12 | 12 | 12 | 12 | 12 | 12 | 12 |
| Specific Surface Area (m$^2$/g) | 7.0 | 6.8 | 6.7 | 6.8 | 6.9 | 6.5 | 7.1 | 6.9 |

As shown in FIGS. 23 through 27, where the graphites having a d-value of not more than 3.370 were used as negative electrodes, the discharge capacity and initial charge-discharge efficiency critically changed to a large extent starting at an Lc of 200 Å. Accordingly, in the present invention, the critical d-value of the graphite to be used for the negative electrode has been found to be not more than 3.370 by conducting these experiments.

The above-described critically changing phenomena were not observed with graphites having a d-value exceeding 3.370 (see FIGS. 28 through 31).

That is, as seen from FIGS. 23 through 27, it can be understood that the graphites having a d-value of 3.354 to 3.370 and an Lc of at least 200 Å have a remarkably large discharge capacity and high initial charge-discharge efficiency.

Additional Example 2

In this Example, various graphite samples to be used as a negative electrode and having an Lc of at least 200 Å (according to the present invention) and those having an Lo of less than 200 Å (comparison samples) were used, and the relationship between the d-value and the discharge capacity per unit weight (mAh/g) or the initial charge-discharge efficiency (%) of graphites was studied. The experiment conditions employed here were the same as in Additional Example 1. The results are shown in FIGS. 32 through 35.

Figure 32:
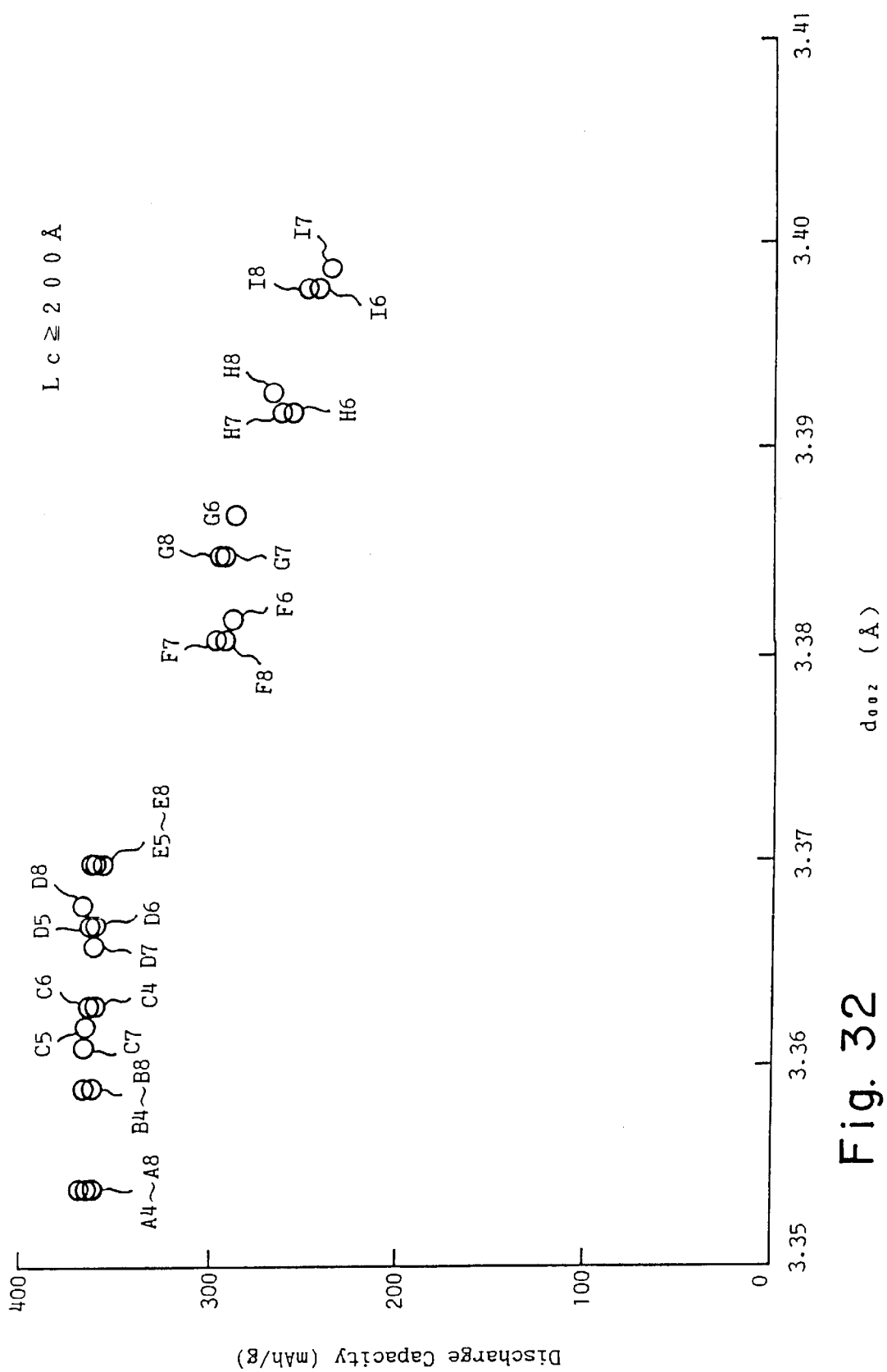
FIG. 32 is a graph showing the relationship between the d-value and the discharge capacity, with the Lc being at least 200 Å.
Figure 33:
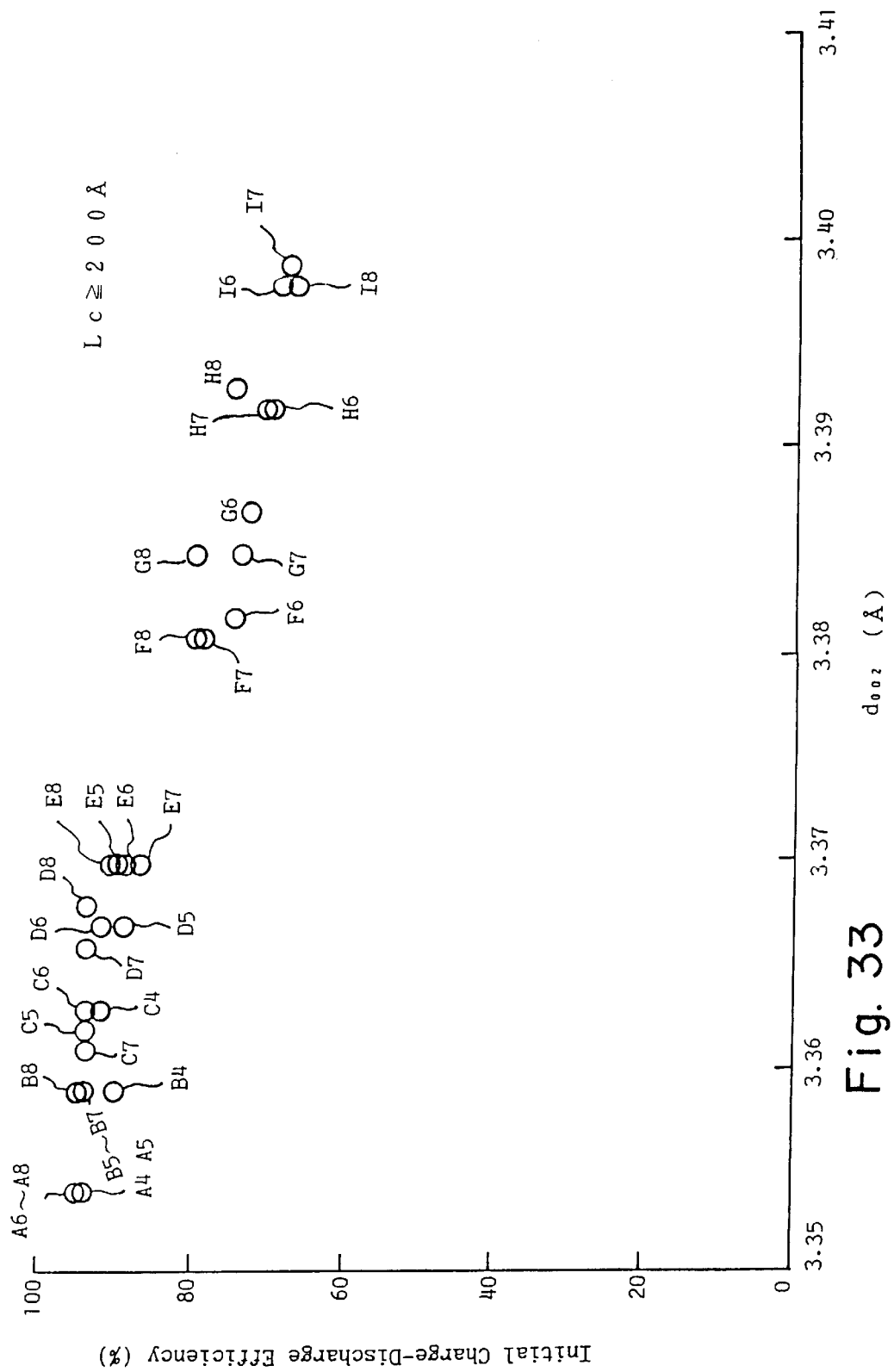
FIG. 33 is a graph showing the relationship between the d-value and the initial charge-discharge efficiency, with the Lc being at least 200 Å.
Figure 34:
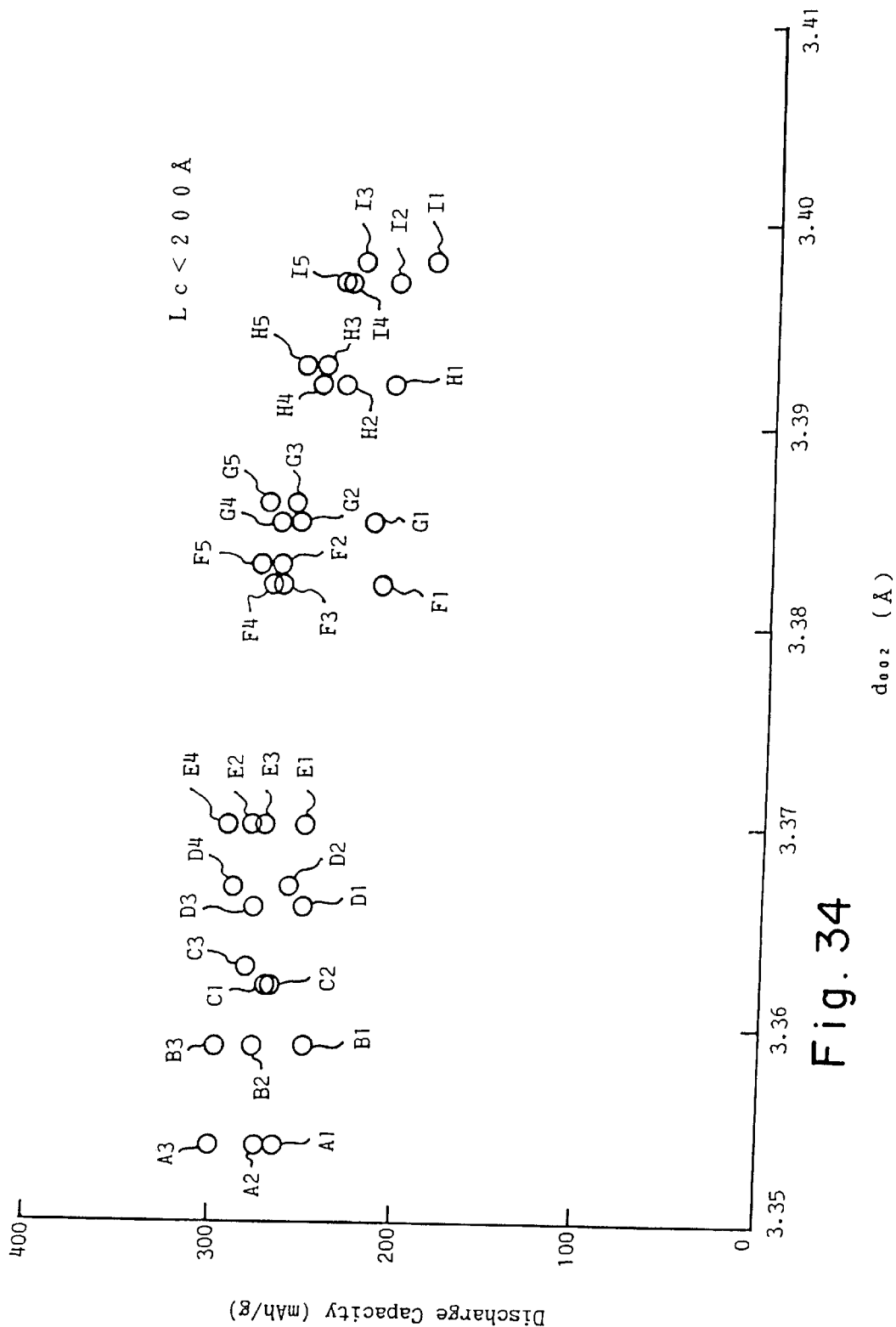
FIG. 34 is a graph showing the relationship between the d-value and the discharge capacity, with the Lc being less than 200 Å.
Figure 35:
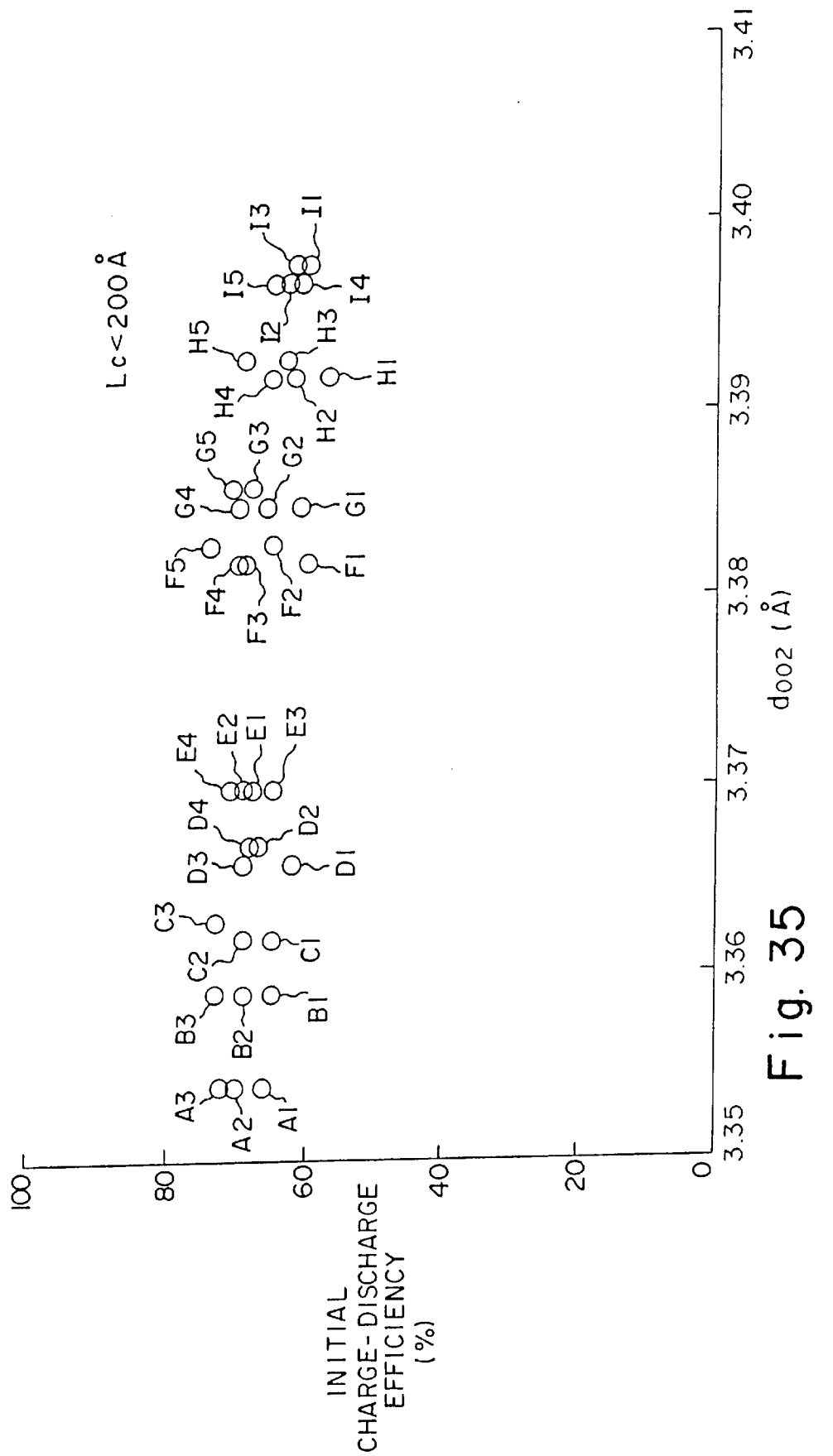
FIG. 35 is a graph showing the relationship between the d-value and the initial charge-discharge efficiency, with the Lc being less than 200 Å.

The abscissa in the graphs of these FIGURES represent the d-value and, the ordinate represent the discharge capacity in FIGS. 32 and 34 and the initial charge-discharge efficiency in FIGS. 33 and 35.

It can be understood from FIGS. 32 and 33 that, where the graphites having an Lc of at least 200 Å were used as a negative electrode, those graphites that have a d-value of less than 3.370 sufficiently maintain at high levels the discharge capacity (see FIG. 32) and the initial charge-discharge efficiency (see FIG. 33).

The above-described critical phenomena, i.e. marked dependency on a d-value of the discharge capacity and initial charge-discharge efficiency, were not observed with the graphites having an Lo of less than 200 Å (see FIGS. 34 and 35).

Thus, it can be understood from FIGS. 32 through 35 that the graphites having an Lo of at least 200 Å and a d-value of not more than 3.370 have a significantly large discharge capacity and remarkably high initial charge-discharge efficiency.

Additional Example 3

Figure 36:
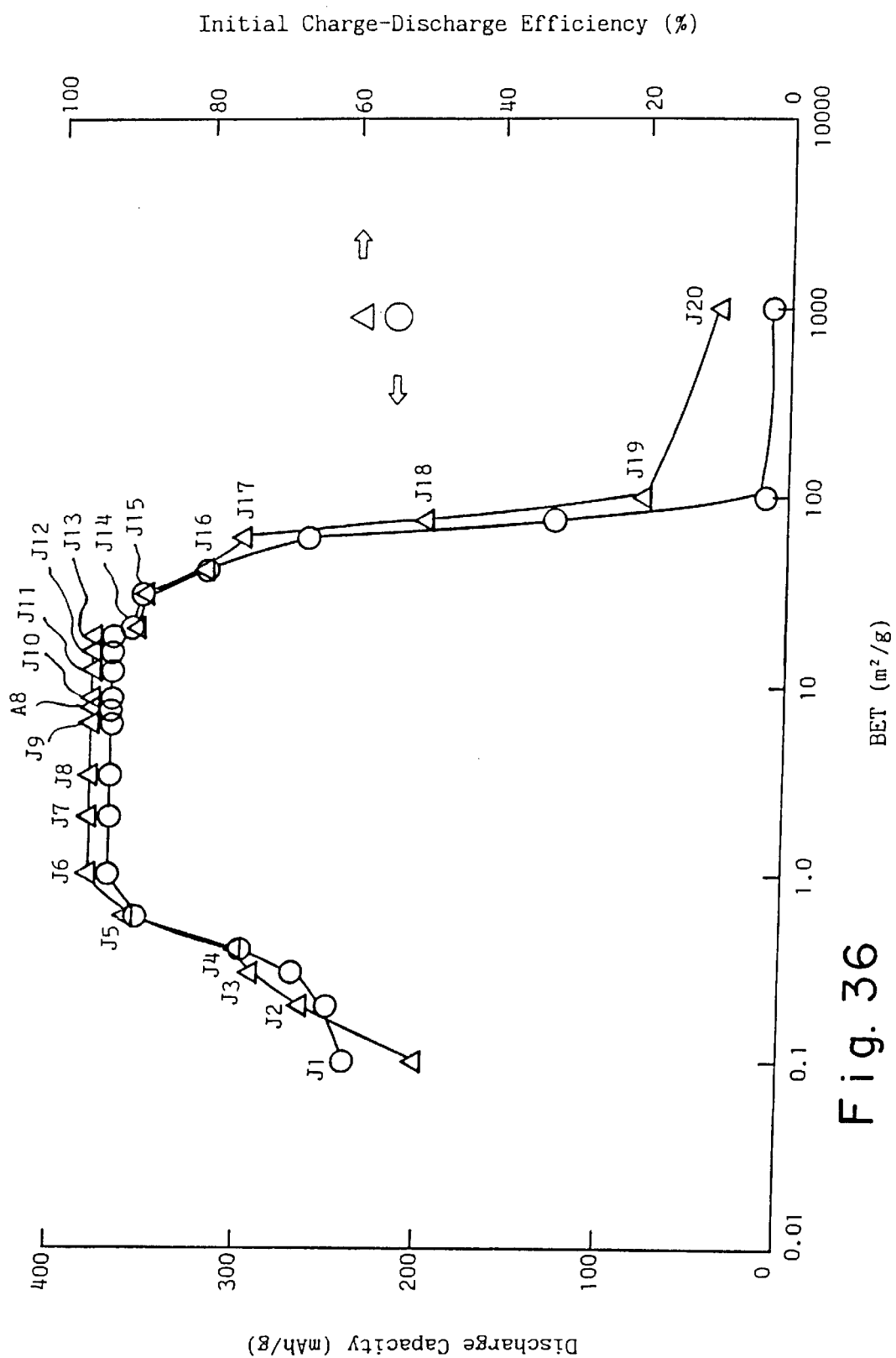
FIG. 36 is a graph showing the relationship between the BET specific surface area and the discharge capacity and initial charge-discharge efficiency.

In this Example, various graphite samples to be used as a negative electrode and having the same d-value (3.354) and Lc (2000 Å) were used, and the relationship between the specific surface area and the discharge capacity per unit weight (mAh/g) or the initial charge-discharge efficiency (%) of the graphites was studied. The experiment conditions employed here were the same as in Additional Example 1. The specific surface area herein was measured by the BET method and expressed in $m^2/g$. The results are shown in FIG. 36, which used graphites having the following properties in Table 25.

0.5 to 50 $m^2/g$ the discharge capacity and the initial charge-discharge efficiency of the graphite critically change and are maintained at high levels.

It can be also understood that with negative electrodes using a graphite having a specific surface area of, in particular, 1.0 to 18 $m^2/g$, still higher levels among the above excellent characteristics are stably maintained.

Here, it has been found that graphites having a specific surface area of less than 0.5 $m^2/g$ tend to be inferior, particularly, in the initial charge-discharge efficiency and those having a specific surface area exceeding, particularly, 50 $m^2/g$ tend to show low discharge capacity.

Thus, it can be understood that, in the present invention, among graphites having a d-value of 3.354 to 3.370 and an Lc of at least 200 Å, selection of those having a specific surface area in a range of 0.5 to 50 $m^2/g$ realizes excellent batteries that maintain the discharge capacity and initial charge-discharge efficiency at high levels.

Additional Example 4

Figure 37:
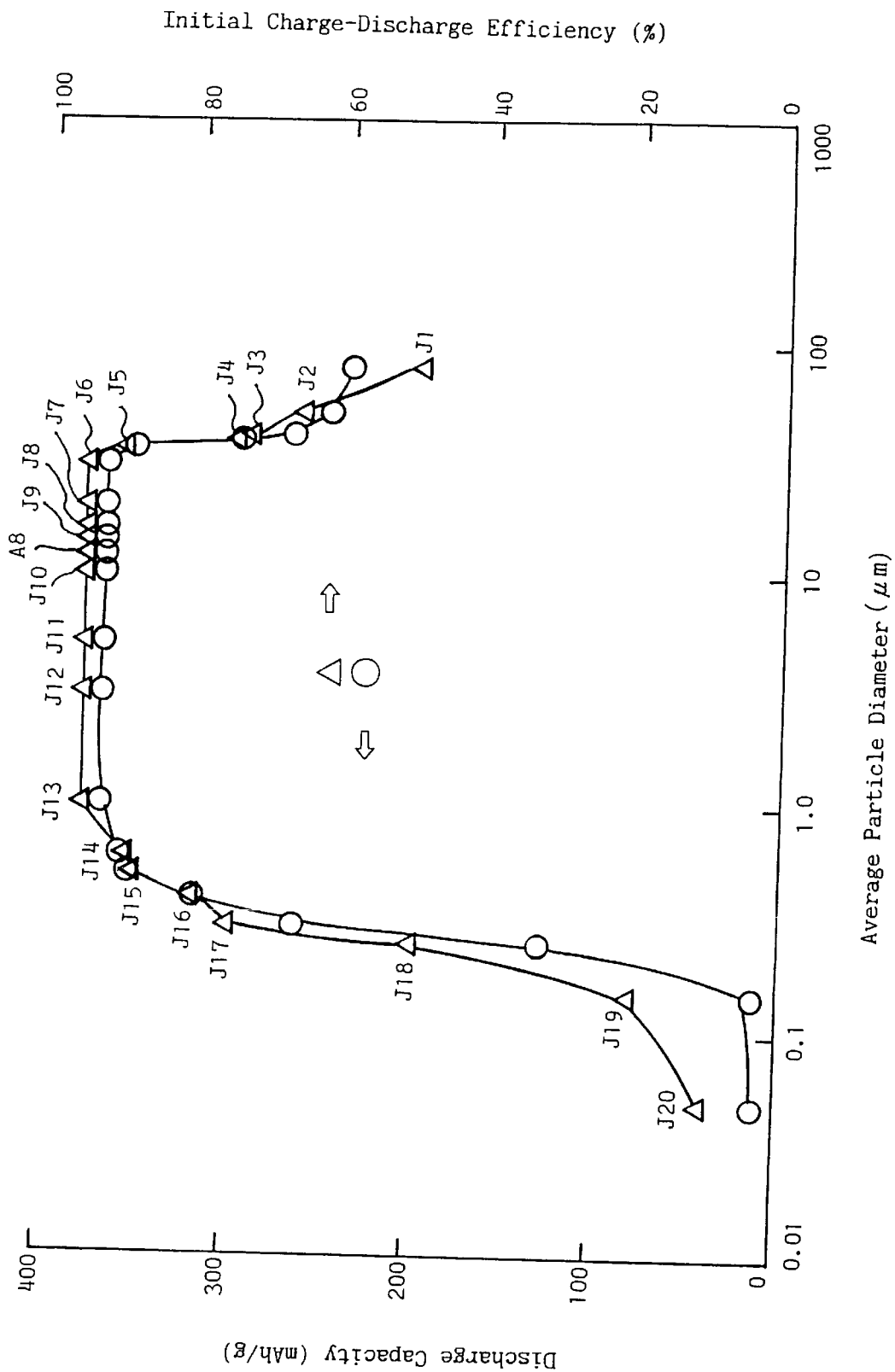
FIG. 37 is a graph showing the relationship between the average particle diameter and the discharge capacity and initial charge-discharge efficiency.

In this Example, various graphite samples to be used as a negative electrode and having the same d-value (3.354) and Lc (2000 Å) were used, and the relationship between the average particle diameter and the discharge capacity per unit weight (mAh/g) or the initial charge-discharge efficiency (%) of graphites was studied. The experiment conditions employed here were the same as in Additional Example 1. The average particle diameter herein is expressed in μm. The results are shown in FIG. 37, which used graphites having the following properties in Table 26.

TABLE 25

|  | J1 | J2 | J3 | J4 | J5 | J6 | J7 | J8 | J9 | J10 |
|---|---|---|---|---|---|---|---|---|---|---|
| Average Particle Diameter (μm) | 80 | 50 | 40 | 38 | 35 | 30 | 20 | 16 | 14 | 10 |
| Specific Surface Area (m²/g) | 0.1 | 0.2 | 0.3 | 0.4 | 0.6 | 1.0 | 2.0 | 3.3 | 6.2 | 8.5 |

|  | J11 | J12 | J13 | J14 | J15 | J16 | J17 | J18 | J19 | J20 | A8 |
|---|---|---|---|---|---|---|---|---|---|---|---|
| Average Particle Diameter (μm) | 5 | 3 | 1 | 0.6 | 0.5 | 0.4 | 0.3 | 0.25 | 0.15 | 0.05 | 1.2 |
| Specific Surface Area (m²/g) | 12 | 15 | 18 | 20 | 30 | 40 | 60 | 75 | 100 | 1000 | 7.5 |

It can be observed from FIG. 36, that with negative electrodes using a graphite having a specific surface area of

TABLE 26

|  | J1 | J2 | J3 | J4 | J5 | J6 | J7 | J8 | J9 | J10 |
|---|---|---|---|---|---|---|---|---|---|---|
| Average Particle Diameter (μm) | 80 | 50 | 40 | 38 | 35 | 30 | 20 | 16 | 14 | 10 |
| Specific Surface Area (m²/g) | 0.1 | 0.2 | 0.3 | 0.4 | 0.6 | 1.0 | 2.0 | 3.3 | 6.2 | 8.5 |

|  | J11 | J12 | J13 | J14 | J15 | J16 | J17 | J18 | J19 | J20 | A8 |
|---|---|---|---|---|---|---|---|---|---|---|---|
| Average Particle Diameter (μm) | 5 | 3 | 1 | 0.6 | 0.5 | 0.4 | 0.3 | 0.25 | 0.15 | 0.05 | 12 |

TABLE 26-continued

| Specific Surface Area (m²/g) | 12 | 15 | 18 | 20 | 30 | 40 | 60 | 75 | 100 | 1000 | 7.5 |
|---|---|---|---|---|---|---|---|---|---|---|---|

It can be observed from FIG. 37, that with negative electrodes using a graphite having an average particle diameter of 1.0 to 30 μm the discharge capacity and the initial charge-discharge efficiency of the graphite critically markedly change and are maintained at high levels.

Here, it has been found that graphites having an average particle diameter of less than 1.0 μm tend to be inferior, particularly, in the discharge capacity and those having an average particle diameter exceeding, particularly, 30 μm tend to be poor both in the discharge capacity and the initial charge-discharge capacity.

Thus, it can be understood that, in the present invention, among graphites having a d-value of 3.354 to 3.370 and an Lc of at least 200 Å, selection of those having an average particle diameter in a range of 1 to 30 μm realizes excellent batteries that maintain the discharge capacity and initial charge-discharge efficiency at high levels.

In the above Examples, the present invention has been described when it is applied to cylindrical batteries. However, the present invention can be applied to batteries of any shape, such as square, flat or the like, and there are no restrictions with respect to the shape of the batteries of the present invention.

Obviously, numerous modifications and variations of the present invention are possible in light of the above teachings. It is therefore to be understood that within the scope of the appended claims, the invention may be practiced otherwise than as specifically described herein.

What is claimed is:

1. A lithium secondary battery comprising:
   a negative electrode composed mainly of a carbon material consisting essentially of a graphite having
      (a) a d-value of the lattice plane (002) obtained by x-ray diffraction thereof of 3.354 to 3.370 and
      (b) a crystallite size in the c-axis direction obtained by x-ray diffraction thereof of at least 200 Å;
   a positive electrode composed mainly of a compound capable of occluding and discharging lithium and which is different from the graphite of the negative electrode;
   a separator between said positive electrode and said negative electrode; and
   an electrolyte solution of an electrolyte solute dissolved in a solvent, said solvent consisting essentially of 20% to 80% by volume of ethylene carbonate and 80% to 20% by volume of at least one of dimethyl carbonate and diethyl carbonate.

2. The lithium secondary battery according to claim 1, wherein said compound capable of occluding and discharging lithium is represented by the formula $Li_xMO_2$ or $Li_yM_2O_4$ wherein M is a transition element, and $0 \leq x \leq 1$ and $0 \leq y \leq 2$.

3. The lithium secondary battery according to claim 1, wherein said electrolyte solute is selected from the group consisting of $LiPF_6$, $LiBF_4$, $LiClO_4$, $LiCF_3SO_3$, $LiC_4F_9SO_3$, $LiN(CF_3SO_2)_2$ and $LiAsF_6$.

4. A lithium secondary battery comprising:
   a negative electrode composed mainly of a carbon material consisting essentially of a graphite having
      (a) a d-value of the lattice plane (002) obtained by x-ray diffraction thereof of 3.354 to 3.370,
      (b) a crystallite size in the c-axis direction obtained by x-ray diffraction thereof of at least 200 Å and
      (c) an average particle diameter of 1 μm to 30 μm;
   a positive electrode composed mainly of a compound capable of occluding and discharging lithium and which is different from the graphite of the negative electrode;
   a separator between said positive electrode and said negative electrode; and
   an electrolyte solution of an electrolyte solute dissolved in a solvent, said solvent consisting essentially of 20% to 80% by volume of ethylene carbonate and 80% to 20% by volume of at least one of dimethyl carbonate and diethyl carbonate.

5. The lithium secondary battery according to claim 4, wherein said compound capable of occluding and discharging lithium is represented by the formula $Li_xMO_2$ or $Li_yM_2O_4$, wherein M is a transition element, and $0 \leq x \leq 1$ and $0 \leq y \leq 2$.

6. The lithium secondary battery according to claim 4, wherein said electrolyte solute is selected from the group consisting of $LiPF_6$, $LiBF_4$, $LiClO_4$, $LiCF_3SO_3$, $LiC_4F_9SO_3$, $LiN(CF_3SO_2)_2$ and $LiAsF_6$.

7. A lithium secondary battery comprising:
   a negative electrode composed mainly of a carbon material consisting essentially of a graphite having
      (a) a d-value of the lattice plane (002) obtained by x-ray diffraction thereof of 3.354 to 3.370,
      (b) a crystallite size in the c-axis direction obtained by x-ray diffraction thereof of at least 200 Å and
      (c) a specific surface area of 0.5 m²/g to 50 m²/g;
   a positive electrode composed mainly of a compound capable of occluding and discharging lithium and which is different from the graphite of the negative electrode;
   a separator between said positive electrode and said negative electrode; and
   an electrolyte solution of an electrolyte solute dissolved in a solvent, said solvent consisting essentially of 20% to 80% by volume of ethylene carbonate and 80% to 20% by volume of at least one of dimethyl carbonate and diethyl carbonate.

8. The lithium secondary battery according to claim 7, wherein said compound capable of occluding and discharging lithium is represented by the formula $Li_xMO_2$ or $Li_yM_2O_4$, wherein M is a transition element, and $0 \leq x \leq 1$ and $0 \leq y \leq 2$.

9. The lithium secondary battery according to claim 7, wherein said electrolyte solute is selected from the group consisting of $LiPF_6$, $LiBF_4$, $LiClO_4$, $LiCF_3SO_3$, $LiC_4F_9SO_3$, $LiN(CF_3SO_2)_2$ and $LiAsF_6$.

10. A lithium secondary battery comprising:
   a negative electrode composed mainly of a carbon material consisting essentially of a graphite having
      (a) a d-value of the lattice plane (002) obtained by x-ray diffraction thereof of 3.354 to 3.370,
      (b) a crystallite size in the c-axis direction obtained by x-ray diffraction thereof of at least 200 Å, (c) an average particle diameter of 1 μm to 30 μm and
(d) a specific surface area of 0.5 m²/g to 50 m²/g;

a positive electrode composed mainly of a compound capable of occluding and discharging lithium and which is different from the graphite of the negative electrode;

a separator between said positive electrode and said negative electrode; and an electrolyte solution of an electrolyte solute dissolved in a solvent, said solvent consisting essentially of 20% to 80% by volume of ethylene carbonate and 80% to 20% by volume of at least one of dimethyl carbonate and diethyl carbonate.

11. The lithium secondary battery according to claim 10, wherein said compound capable of occluding and discharging lithium is represented by the formula $Li_xMO_2$ or $Li_yM_2O_4$, wherein M is a transition element, and $0 \leq x \leq 1$ and $0 \leq y \leq 2$.

12. The lithium secondary battery according to claim 10, wherein said electrolyte solute is selected from the group consisting of $LiPF_6$, $LiBF_4$, $LiClO_4$, $LiCF_3SO_3$, $LiC_4F_9SO_3$, $LiN(CF_3SO_2)_2$ and $LiAsF_6$.

13. The lithium secondary battery according to any one of claims 2, 5, 8 or 11, wherein said compound capable of occluding and discharging lithium is selected from the group consisting of $LiCoO_2$, $LiMnO_2$, $LiNiO_2$, $LiCrO_2$ and $LiMn_2O_4$.

14. The lithium secondary battery according to any one of claims 1, 4, 7 or 10, wherein said d-value is 3.355 or more or less than 3.360.

15. The lithium secondary battery according to any one of claims 1, 4, 7 or 10, wherein said d-value is 3.360 or more or less than 3.365.

16. The lithium secondary battery according to any one of claims 1, 4, 7 or 10, wherein said d-value is 3.365 or more or less than 3.370.

17. The lithium secondary battery according to any one of claims 1, 4, 7 or 10, wherein said solvent consists essentially of 20% to 80% by volume of ethylene carbonate and 80% to 20% by volume of dimethyl carbonate.

18. The lithium secondary battery according to any one of claims 1, 4, 7 or 10, wherein said crystallite size in the c-axis direction obtained by X-ray diffraction is greater than 220 Å.

19. The lithium secondary battery according to any one of claims 2, 3, 5, 6, 8, 9, 11 or 12, wherein said crystallite size in the c-axis direction obtained by X-ray diffraction is greater than 220 Å.

20. The lithium secondary battery according to claim 13, wherein said crystallite size in the c-axis direction obtained by X-ray diffraction is greater than 220 Å.

21. The lithium secondary battery according to claim 14, wherein said crystallite size in the c-axis direction obtained by X-ray diffraction is greater than 220 Å.

22. The lithium secondary battery according to claim 15, wherein said crystallite size in the c-axis direction obtained by X-ray diffraction is greater than 220 Å.

23. The lithium secondary battery according to claim 16, wherein said crystallite size in the c-axis direction obtained by X-ray diffraction is greater than 220 Å.

24. The lithium secondary battery according to claim 17, wherein said crystallite size in the c-axis direction obtained by X-ray diffraction is greater than 220 Å.

* * * * *